United States Patent
Garneau-Tsodikova et al.

(10) Patent No.: US 11,564,394 B2
(45) Date of Patent: Jan. 31, 2023

(54) DISTORTED GOLD (I)-PHOSPHINE COMPLEXES AND AND METHODS FOR USE AS ANTIFUNGAL AGENTS

(71) Applicant: University of Kentucky Research Foundation, Lexington, KY (US)

(72) Inventors: Sylvie Garneau-Tsodikova, Lexington, KY (US); Emily K Dennis, Lexington, KY (US); Jong Hyun Kim, Lexington, KY (US); Samuel G. Awuah, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 99 days.

(21) Appl. No.: 17/118,328

(22) Filed: Dec. 10, 2020

(65) Prior Publication Data
US 2021/0195903 A1 Jul. 1, 2021

Related U.S. Application Data

(60) Provisional application No. 62/946,349, filed on Dec. 10, 2019.

(51) Int. Cl.
*A01N 57/36* (2006.01)
*C07F 9/50* (2006.01)
*C07F 9/6568* (2006.01)

(52) U.S. Cl.
CPC ............ *A01N 57/36* (2013.01); *C07F 9/5045* (2013.01); *C07F 9/65683* (2013.01)

(58) Field of Classification Search
None
See application file for complete search history.

(56) References Cited

U.S. PATENT DOCUMENTS

2009/0156850 A1* 6/2009 Kodama ............ C07F 15/0093
556/18

OTHER PUBLICATIONS

Gonzalez-Arellano et al. "Enantioselective hydrogenation of alkenes and imines by a gold catalyst" Chemical Communications, 2005, pp. 3451-3453.*
Deak et al. "Self-assembly of gold(i) with diphosphine and bitopic nitrogen donor linkers in the presence of trifluoroacetate anion: formation of coordination polymerversus discrete macrocycle" CrystEngComm, 2007, vol. 9, pp. 640-643.*
Dennis, et al., Distorted Gold(I)-Phosphine Complexes as Antifungal Agents, J. Med. Chem., 2020, 63(5), 2455-2469.
Dennis, et al., Distorted Gold(I)-Phosphine Complexes as Antifungal Agents, J. Med. Chem., 2020, 63(5), 2455-2469, supporting information.

* cited by examiner

*Primary Examiner* — Joseph R Kosack
(74) *Attorney, Agent, or Firm* — Stites & Harbison PLLC; Mandy Wilson Decker

(57) ABSTRACT

The presently-disclosed subject matter describes distorted gold (I) phosphine compounds. The presently-disclosed subject matter also describes a method for killing fungus comprising contacting fungus with distorted gold (I) phosphine compounds. The presently-disclosed subject matter further describes a method of preventing or disrupting a biofilm on a surface comprising contacting a surface with distorted gold (I) phosphine compounds.

16 Claims, 30 Drawing Sheets

FIG. 7B

DISTORTED GOLD (I)-PHOSPHINE COMPLEXES AND AND METHODS FOR USE AS ANTIFUNGAL AGENTS

RELATED APPLICATIONS

This application claims priority from U.S. Provisional Patent Application No. 62/946,349 filed on Dec. 10, 2020 the entire disclosure of which is incorporated herein by this reference.

TECHNICAL FIELD

The presently-disclosed subject matter generally relates to antifungals and treatment of fungal infections. More specifically, the presently-disclosed subject matter relates to distorted gold (I) phosphine compounds. The presently-disclosed subject matter also relates to a method for killing fungus comprising contacting fungus with distorted gold (I) phosphine compounds. The presently-disclosed subject matter further relates to a method of preventing or disrupting a biofilm on a surface comprising contacting a surface with distorted gold (I) phosphine compounds.

BACKGROUND

Fungal infections are deadly for patients with conditions that weaken the immune system,[1] as demonstrated by mortality rates exceeding 50% for systemic fungal infections.[2] Those most affected include patients (i) with acquired immune deficiency syndrome, (ii) having received recent chemotherapy, (iii) having had an organ transplant, as well as (iv) with underlying lung disease such as chronic obstructive pulmonary disorder and asthma.$_1$,[2] These systemic fungal infections are primarily caused by only a few fungal genera, specifically *Candida*[3] and *Aspergillus*.[4]

For treatment of fungal infections, there are three classes of antifungal agents that can be used. One class, the polyenes, includes the widely used antifungal therapy, amphotericin B (AmB). While effective in treating a broad spectrum of infections, treatment is often associated with severe side effects. The second class, the azoles, specifically fluconazole (FLC) and voriconazole (VRC), are a first line of defense against fungal infections, but can cause drug-drug interactions. The third class is the echinocandins, which includes caspofungin (CAS). The echinocandins, are narrow-spectrum and can only be administered by intravenous catheter. What is of concern is the ability of fungi to be intrinsically resistant to antifungal agents. Examples include *Candida glabrata*[5] to the echinocandins and the emerging pathogen, *Candida auris*, which in some cases is resistant to all three drug classes.$_6$,[7] *C. auris* is currently attracting attention due to recent outbreaks of resistant *C. auris* infections in the USA.[8-10] In addition, infections can develop decreased susceptibility to antifungal agents during treatment. With a limited armament of antifungal agents, there is a need for new classes of agents.

In agriculture, metal salts (e.g., copper salts[11]) are widely used as fungicides to improve food production. As medicines, inorganic compounds have been predominantly developed as anticancer agents (e.g., cisplatin).[12] These metal complexes typically consist of either platinum, ruthenium, silver, or copper. As anticancer agents, these compounds have been successful, but typically have problems with toxicity[13] and associated acquired resistance.[14] More recently gold(I) phosphine and gold(III) complexes have gained attention as anticancer agents[15] as well as antimicrobial.$_{16,17}$ The arthritis drug, auranofin (FIG. 1), is an exemplary gold complex that has been used in the clinic since 1983. It can be administered orally and has been shown to be well-tolerated at a 6 mg daily dose in patients (www.fda.gov/drugsatfda). Auranofin is believed to block inflammation in arthritis by regulating the secretion levels of various cytokines.[18] In recent years, reports looking at repurposing auranofin as an antimicrobial agent against bacteria[19-22] and fungi have been published.[23-26] In fact, auranofin is currently in clinical trials for cancer, HIV, amoebiasis, and tuberculosis.$_{27}$,[28] As an anticancer and antimicrobial agent, auranofin acts to inhibit thioredoxin reductase.$_{29}$,[30] With no known inorganic antifungals on the market, auranofin speaks to the promise of using gold scaffolds to investigate and develop novel antifungal agents.

The present inventors have an interest the development of antifungal agents and have used different strategies to develop antifungals, including the development of azole analogues,[31-33] combinations of antifungal drugs,[34-36] and synthesis and biological evaluation of new scaffolds.[37-41] The present inventors have also developed gold complexes as potential anticancer agents.42,43 The present inventors contemplated the applications of gold complexes to antifungal activity.

Herein, the antifungal activity of six distorted gold(I)-phosphine complexes, 1-6 (Scheme 1), which are not derived or related in structure to auranofin, against yeast, molds, and yeast biofilms are described. Herein, the activity of the two best complexes, 4 and 6, in time-kill studies, is identified. To evaluate the efficacy of complexes 4 and 6, both cytotoxicity studies against four mammalian cell lines as well as hemolysis assay with both murine and human red blood cells were used. Whole cell uptake assays and development of resistance studies are also presented herein.

The presently-disclosed subject matter includes unique antifungal compounds and methods for use of such compounds against fungal infections. In some embodiments, the compound can be chosen from compounds 1-6.

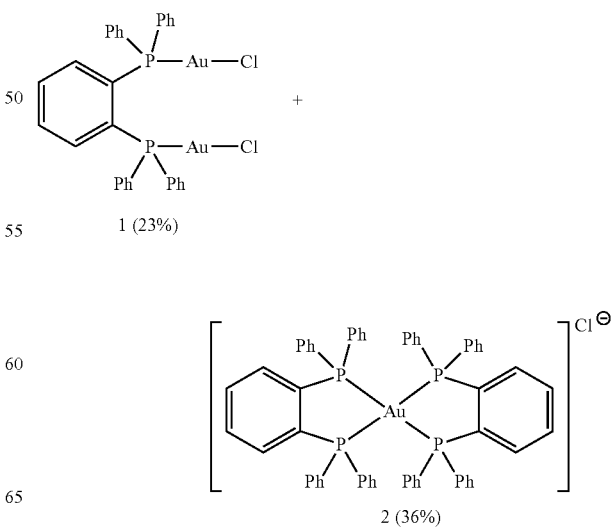

-continued

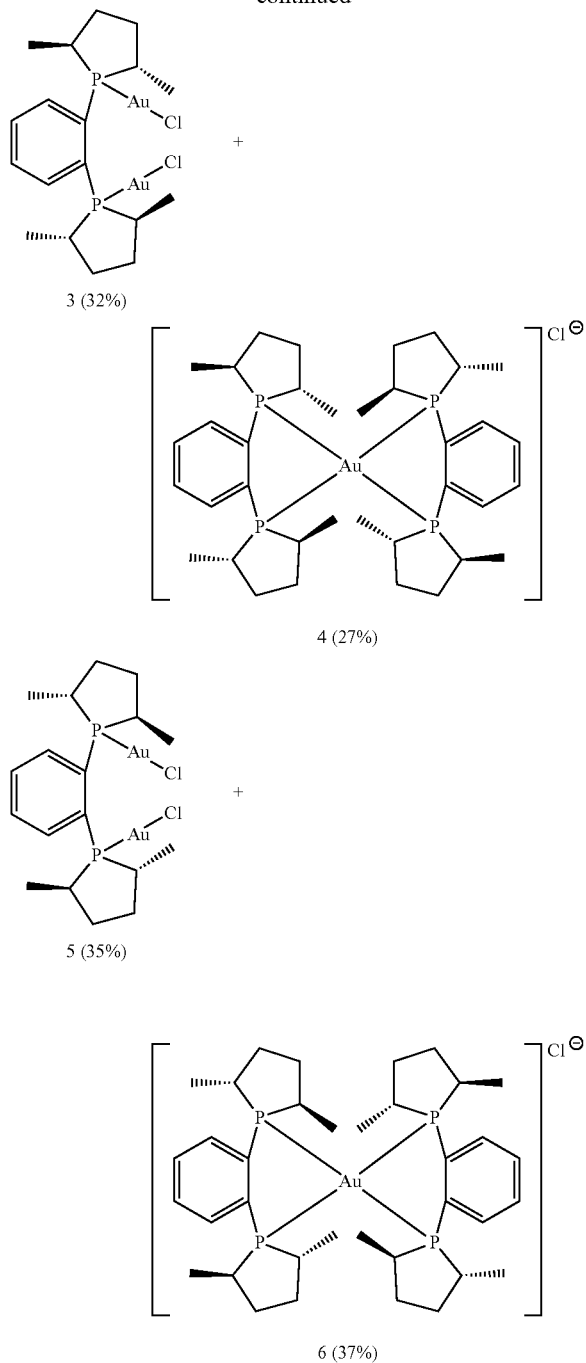

3 (32%)

4 (27%)

5 (35%)

6 (37%)

The gold complexes with square-planar geometry appear to show great promise for use as antifungal agents. As there are currently no metal complexes that have been thoroughly investigated for antifungal activity, the distorted gold(I)-phosphine complexes are innovative in the field of antifungal development.

The presently-disclosed subject matter is further illustrated by the following specific but non-limiting examples. The following examples may include compilations of data that are representative of data gathered at various times during the course of development and experimentation related to the present invention.

SUMMARY

The presently-disclosed subject matter meets some or all of the above-identified needs, as will become evident to those of ordinary skill in the art after a study of information provided in this document.

In accordance with the purpose(s) of the invention, as embodied and broadly described herein, the invention, in one aspect, relates to a compound having the following formula (I) or a pharmaceutically acceptable salt thereof:

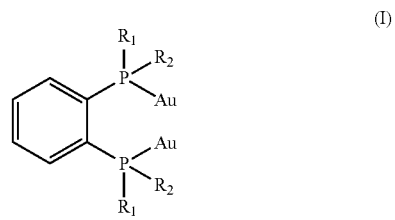

(I)

wherein,

R1 and R2 are selected from substituted or unsubstituted aryl, substituted or unsubstituted cycloalkyl, and R1 and R2 may optionally cyclize to form a 5 or 6 membered cycloalkyl; and the compound is in linear or square planar form.

In a further aspect of the present invention, $R_1$ and $R_2$ are identical. In another aspect of the present invention, $R_1$ and $R_2$ are phenyl. In further aspects of the present invention, $R_1$ and $R_2$ are cyclize to form a 5-membered substituted cycloalkyl. In a further aspect of the present invention, the compound is in linear form and selected from:

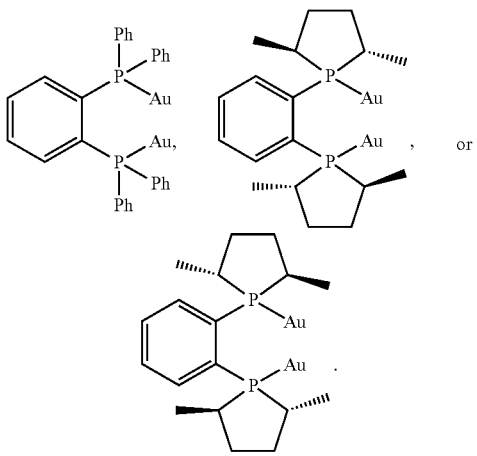

In another aspect of the present invention, the compound is in square planar form and selected from:

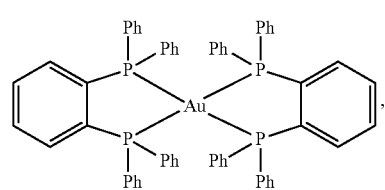

-continued

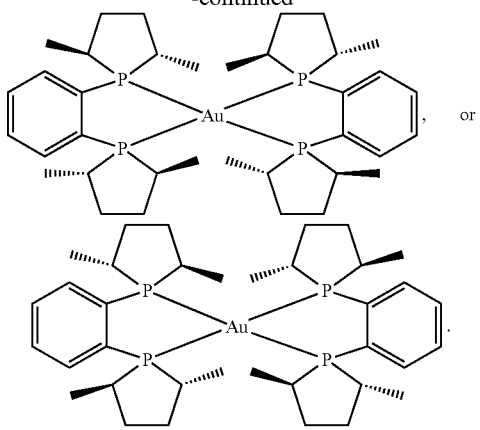
or

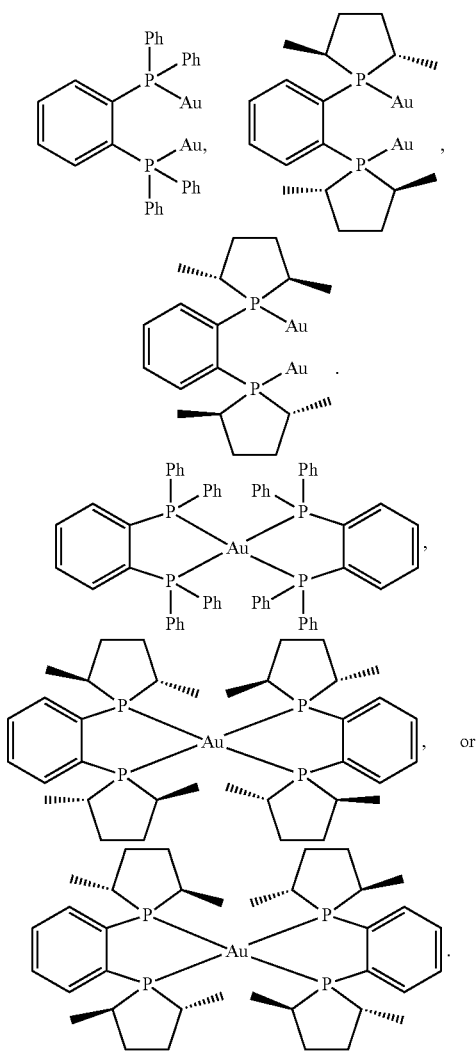

In another aspect of the present invention, the compound is of the following formula or a pharmaceutically acceptable salt thereof:

A further aspect of the present invention relates to a method for killing fungus comprising: contacting the fungus with an effective amount of a compound of a compound of the following formula: wherein,

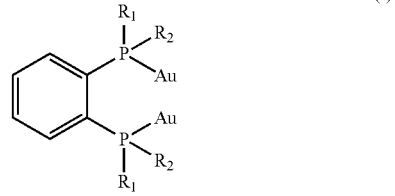
(I)

R1 and R2 are selected from substituted or unsubstituted aryl, substituted or unsubstituted cycloalkyl, and R1 and R2 may optionally cyclize to form a 5 or 6 membered cycloalkyl; and the compound is in linear or square planar form.

In some aspects of the present invention, the fungus is of the genus *Candida*. In other aspects of the present invention, the fungus is of the genus *Cryptococcus*. In further aspects of the present invention, the fungus is of the genus *Aspergillus*. In other aspects of the present invention, the fungus is of the genus *Fusarium*. In further aspects of the present invention, the effective amount is between about 0.12 µg/mL to about 31.3 µg/mL. In other aspects of the invention, the fungus is in a subject. In some aspects of the invention, the subject is a mammal. In further aspects of the present invention, the effective amount is an amount less than about 8 mg/kg.

Some aspects of the present invention relates to a method of preventing or disrupting a fungal biofilm comprising: contacting a surface with an effective amount of a compound having the following formula (I) or a pharmaceutically acceptable salt thereof:

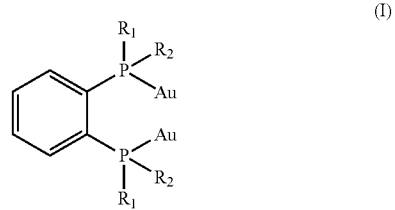
(I)

wherein,

R1 and R2 are selected from substituted or unsubstituted aryl, substituted or unsubstituted cycloalkyl, and R1 and R2 may optionally cyclize to form a 5 or 6 membered cycloalkyl; and the compound is in linear or square planar form.

wherein the surface is at risk of forming a biofilm or has a pre-formed biofilm. In other aspects of the invention, the compound is selected from:

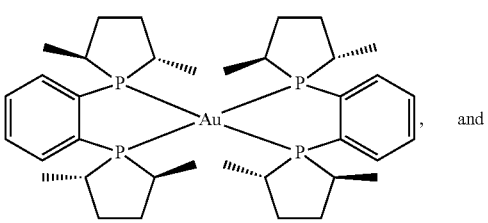
, and

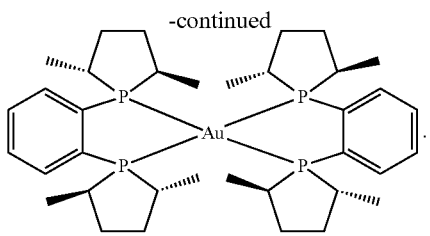

In other aspects of the present invention, the effective amount is between about 0.12 μg/mL to about 31.3 μg/mL. In certain aspects of the present invention, the contact of the compound with the surface occurs for about 3 hours.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "A$^1$," "A$^2$," "A$^3$," and "A$^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, optionally substituted alkyl, cycloalkyl, alkoxy, amino, ether, halide, hydroxy, nitro, silyl, sulfo-oxo, or thiol as described herein.

The term "polyalkylene group" as used herein is a group having two or more $CH_2$ groups linked to one another. The polyalkylene group can be represented by a formula —$(CH_2)_a$—, where "a" is an integer of from 2 to 500.

The terms "alkoxy" and "alkoxyl" as used herein refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by a formula —C(O)H. Throughout this specification "C(O)" is a short hand notation for a carbonyl group, i.e., C=O.

The terms "amine" or "amino" as used herein are represented by a formula $NA^1A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by a formula —C(O)OH.

The term "ester" as used herein is represented by a formula —$OC(O)A^1$ or —$C(O)OA^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by a formula —$(A^1O(O)C-A^2-C(O)O)_a$— or —$(A^1O(O)C-A^2-OC(O))_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500.

"Polyester" is as the term used to describe a group that is produced by the reaction between a compound having at least two carboxylic acid groups with a compound having at least two hydroxyl groups.

The term "ether" as used herein is represented by a formula $A^1OA^2$, where $A^1$ and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by a formula $—(A^1O-A^2O)_a—$, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by a formula —OH.

The term "ketone" as used herein is represented by a formula $A^1C(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by a formula $—N_3$.

The term "nitro" as used herein is represented by a formula $—NO_2$.

The term "nitrile" as used herein is represented by a formula —CN.

The term "silyl" as used herein is represented by a formula $—SiA^1A^2A^3$, where $A^1$, $A^2$, and $A^3$ can be, independently, hydrogen or an optionally substituted alkyl, cycloalkyl, alkoxy, alkenyl, cycloalkenyl, alkynyl, cycloalkynyl, aryl, or heteroaryl group as described herein.

The term "sulfo-oxo" as used herein is represented by a formulas $—S(O)A^1$, $—S(O)_2A^1$, $—OS(O)_2A^1$, or $—OS(O)_2OA^1$, where $A^1$ can be hydrogen or an optionally substituted alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by a formula $—S(O)_2A^1$, where $A^1$ can be hydrogen or an optionally substituted alkyl, cycloalkyl, alkenyl, cycloalkenyl, alkynyl, cycloalkynyl, aryl, or heteroaryl group as described herein. The term "sulfone" as used herein is represented by a formula $A^1S(O)_2A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein. The term "sulfoxide" as used herein is represented by a formula $A^1S(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "thiol" as used herein is represented by a formula —SH.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms The term "pharmaceutically acceptable" describes a material that is not biologically or otherwise undesirable, i.e., without causing an unacceptable level of undesirable biological effects or interacting in a deleterious manner.

As used herein, the term "derivative" refers to a compound having a structure derived from the structure of a parent compound (e.g., a compounds disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers. Additionally, unless expressly described as "unsubstituted", all substituents can be substituted or unsubstituted.

In some aspects, a structure of a compound can be represented by a formula:

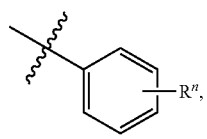

which is understood to be equivalent to a formula:

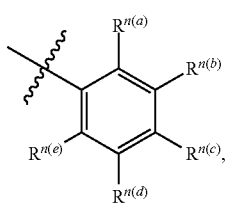

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance. Likewise, when a group R is defined as four substituents, R is understood to represent four independent substituents, $R^a$, $R^b$, $R^c$, and $R^d$. Unless indicated to the contrary, the substituents are not limited to any particular order or arrangement.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

Figure 7B:
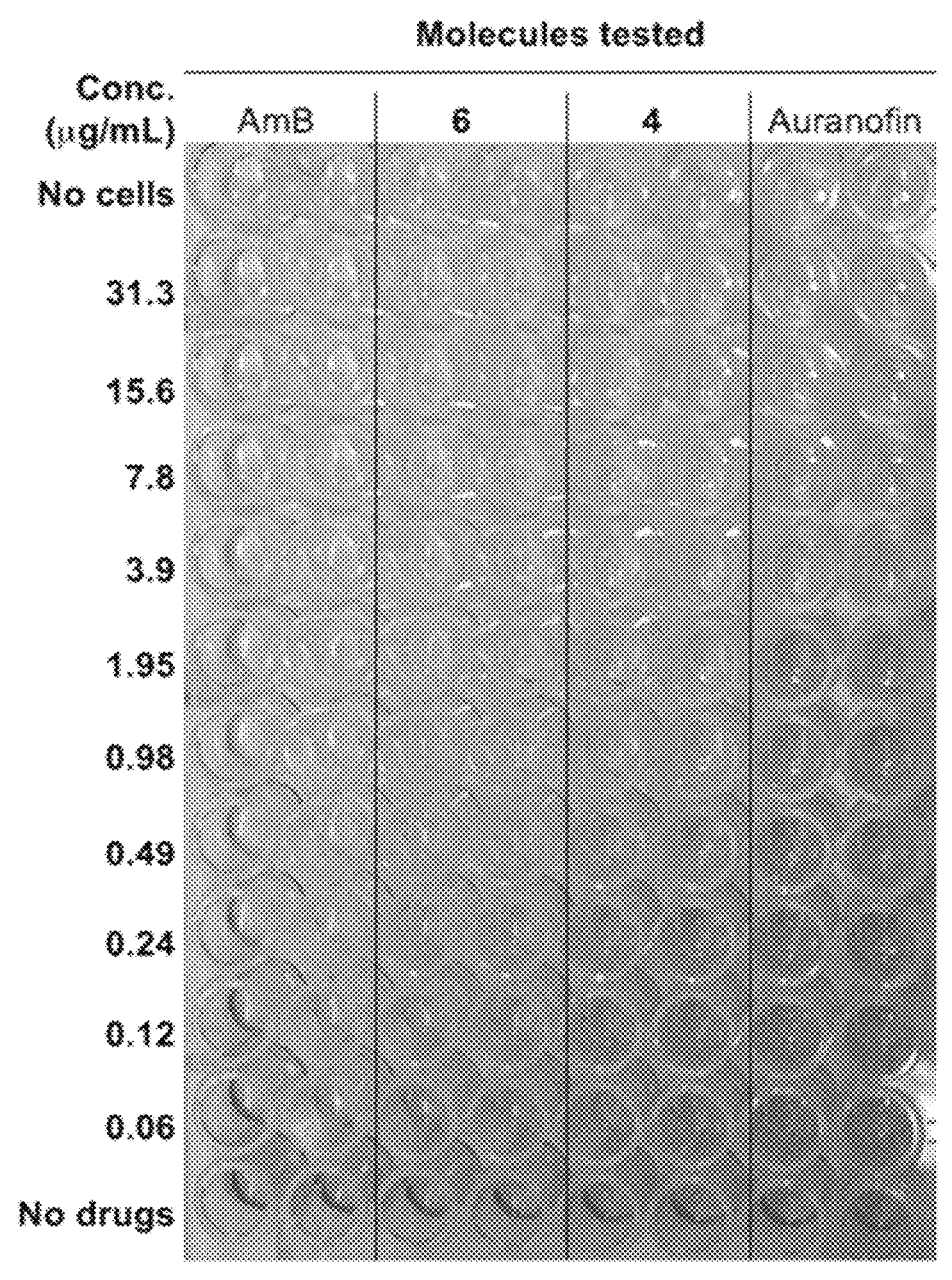

FIG. 7B shows Prevention of biofilm formation of C. glabrata ATCC 2001 (strain H), treated at 0 h with auranofin, 6, 4, and AmB. XTT dye is metabolized by fungal cells to produce an orange color. The corresponding data are presented in Table 3.

Figure 1:
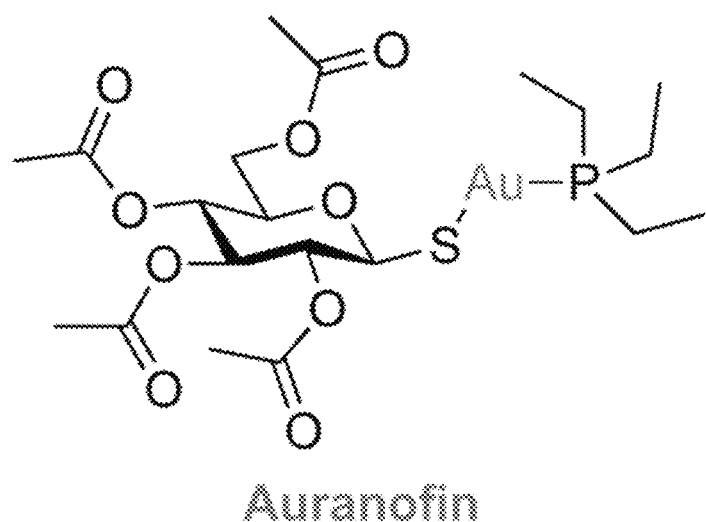
FIG. 1 shows the structure of auranofin.
Figure 2A:
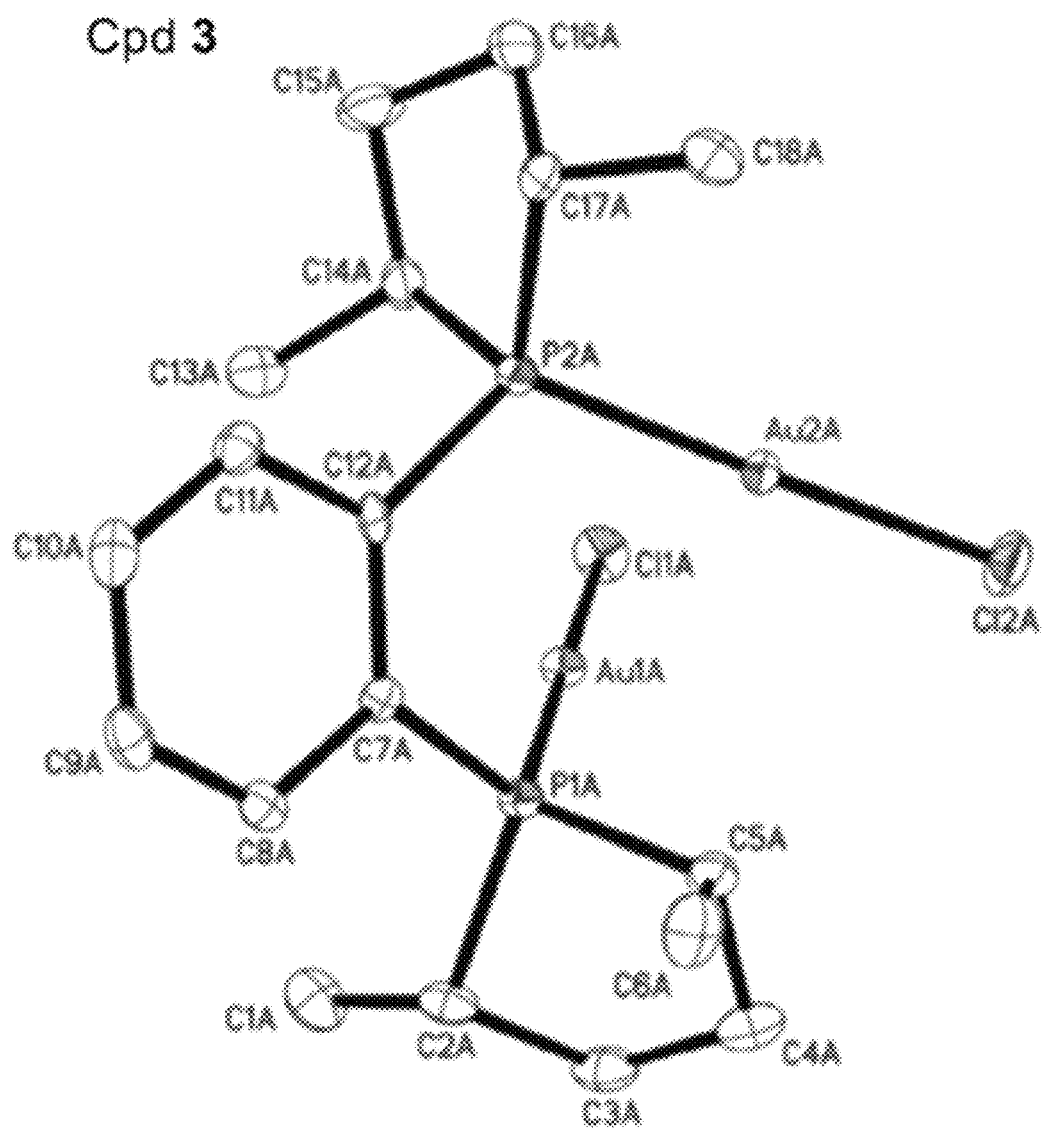
FIG. 2A shows X-ray crystal structures of compound 3. Ellipsoids are drawn at 50% probability level. Hydrogen atoms bound to carbon atoms are omitted for clarity.
Figure 2B:
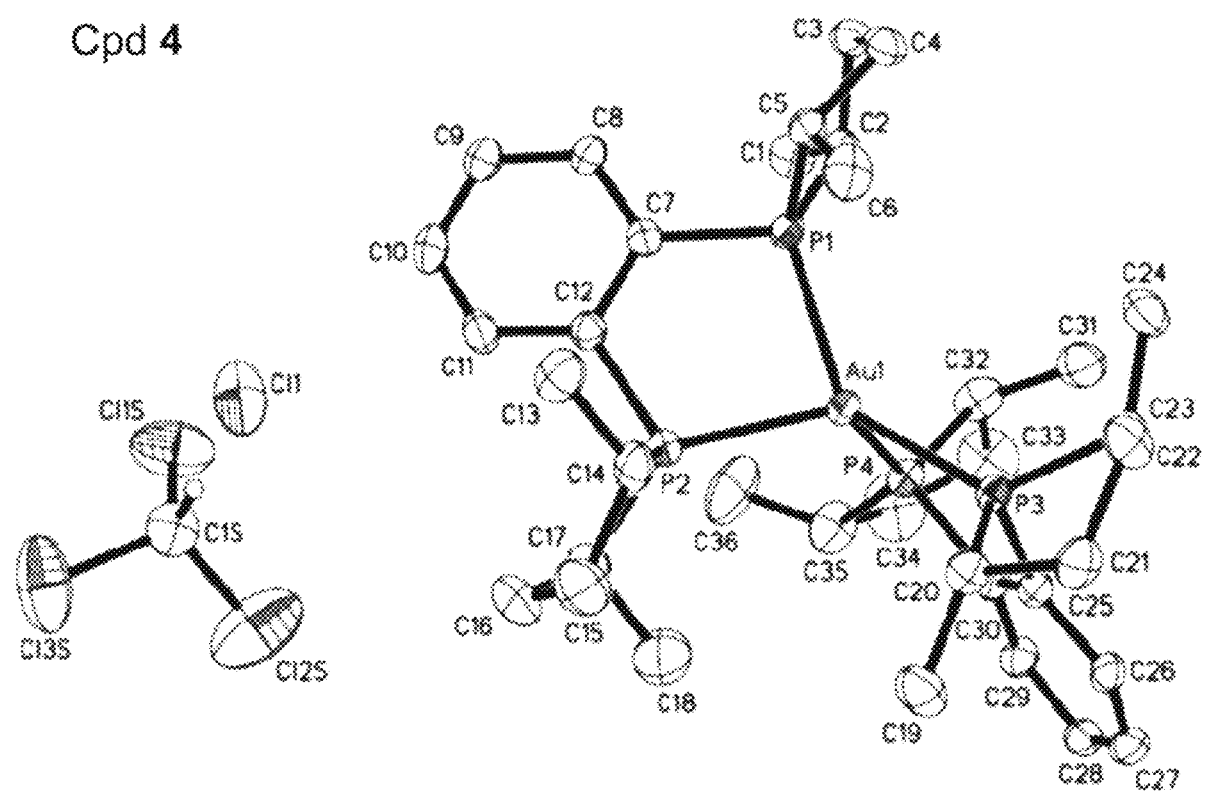
FIG. 2B shows X-ray crystal structures of compound 4. Ellipsoids are drawn at 50% probability level. Hydrogen atoms bound to carbon atoms are omitted for clarity. The molecule co-crystallized with a molecule of $CHCl_3$.
Figure 2C:
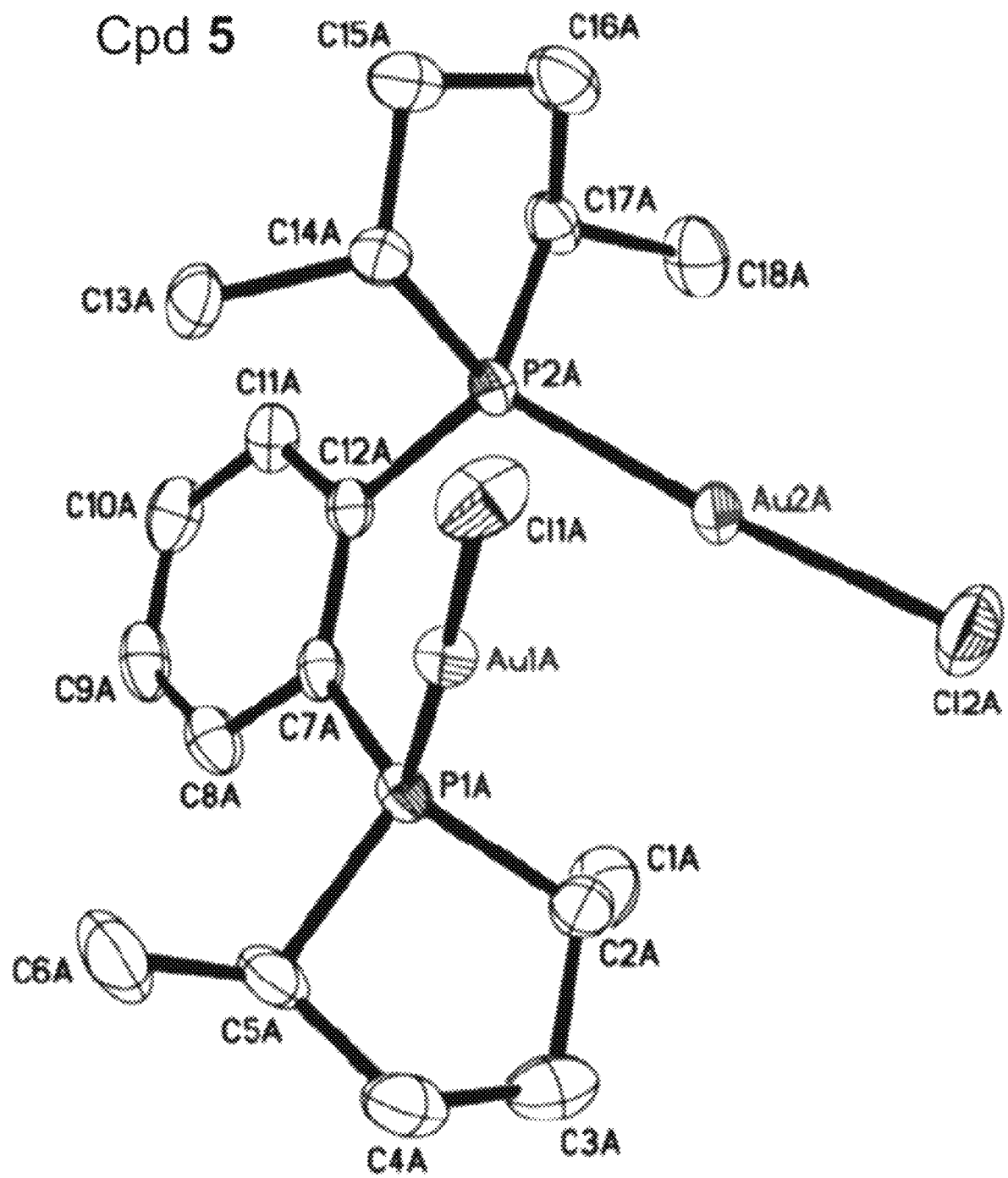
FIG. 2C shows X-ray crystal structures of compound 5. Ellipsoids are drawn at 50% probability level. Hydrogen atoms bound to carbon atoms are omitted for clarity.
Figure 2D:
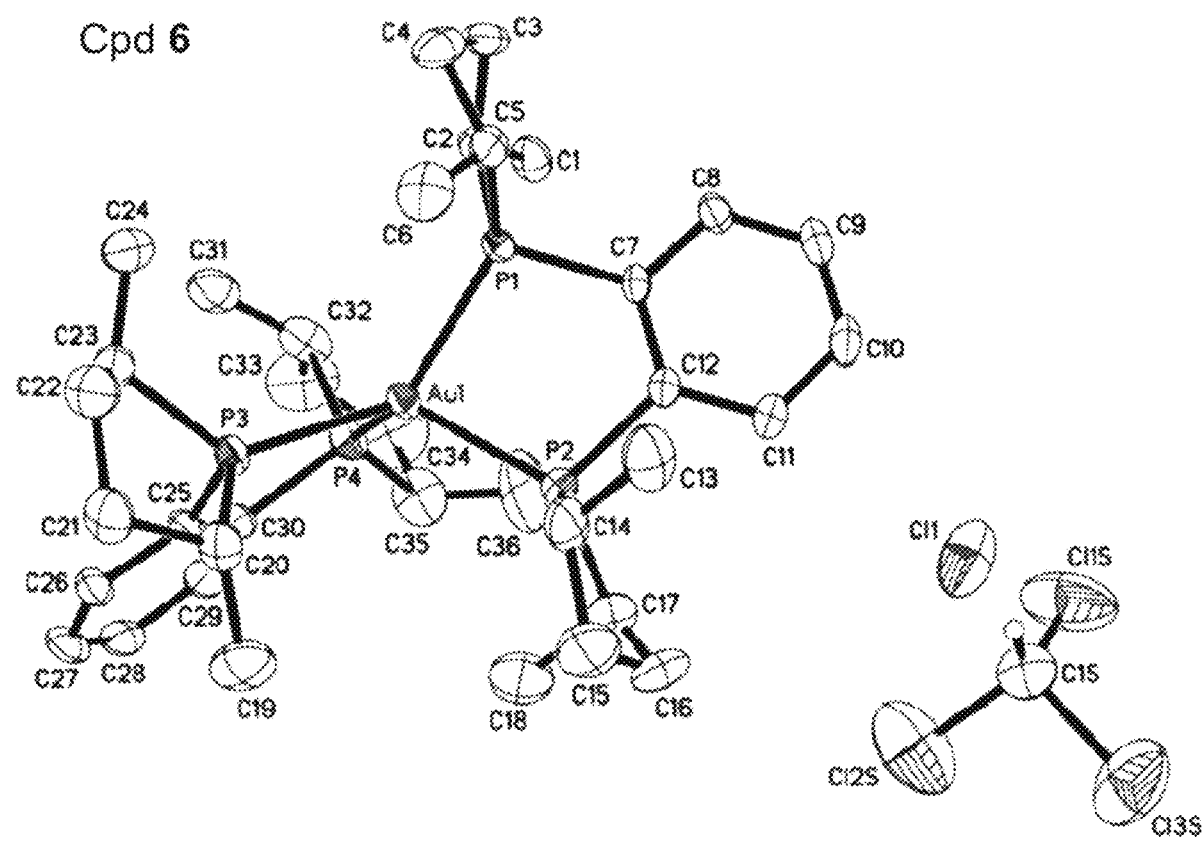
FIG. 2D shows X-ray crystal structures of compound 6. Ellipsoids are drawn at 50% probability level. Hydrogen atoms bound to carbon atoms are omitted for clarity. The molecule co-crystallized with a molecule of $CHCl_3$.
Figure 3A:
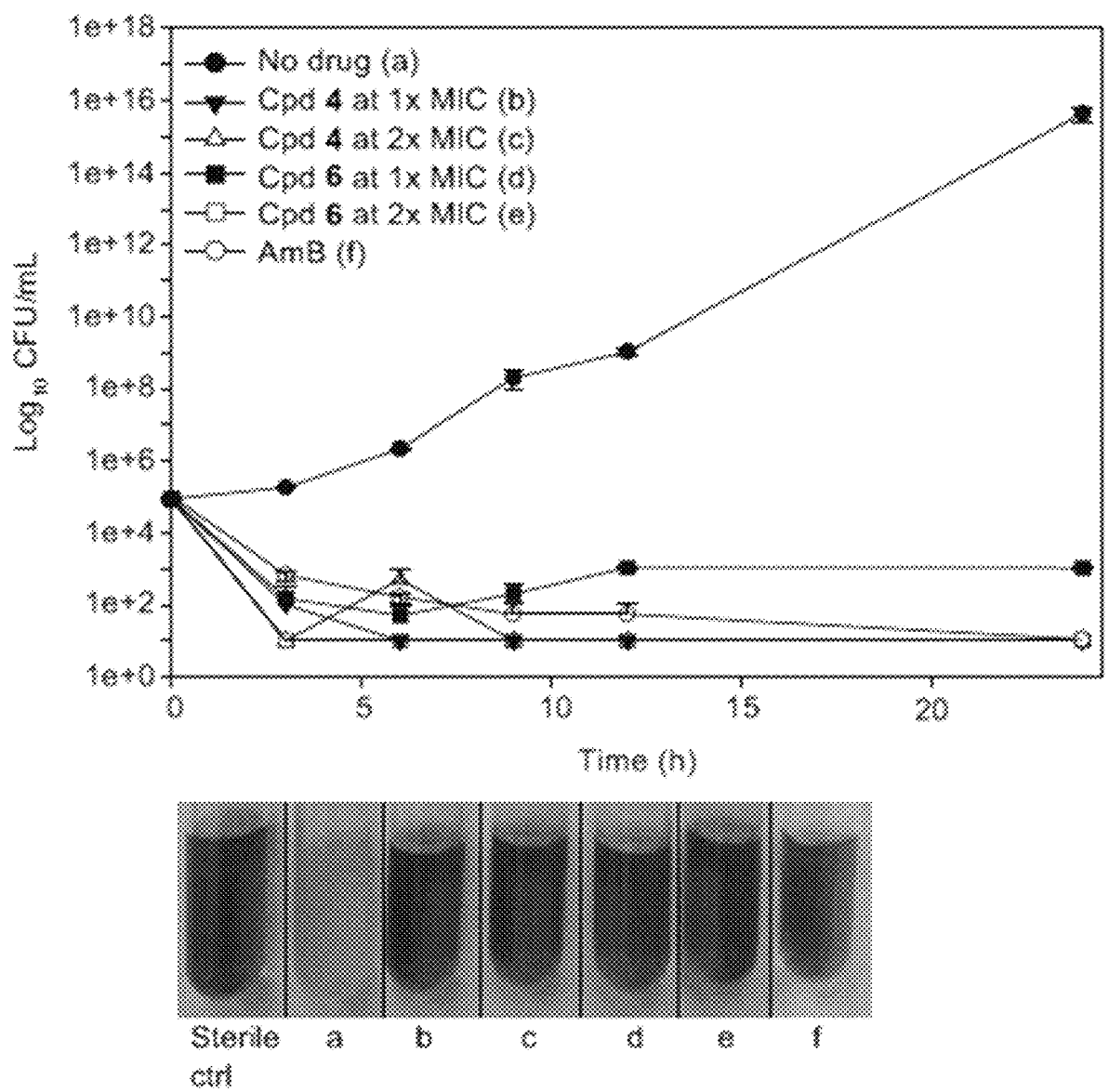
FIG. 3A shows Representative time-kill curves for compounds 4, 6, and AmB against *C. albicans* ATCC 10231 (strain B) Fungal strains were treated with no drug (black circles), compound 4 at 1×MIC (black triangle), compound 4 at 2×MIC (white triangle), compound 6 at 1×MIC (black square), compound 6 at 2×MIC (white square), and AmB at 1×MIC (white circle). At the 24-hour end point, resazurin was added to the cultures to qualitatively measure the CFU/mL. Resazurin, which is a blue-purple color (dark solution in figure), is metabolized by viable cells to produce resorufin, which has a pink-orange color (light solution in the figure). Cultures with little to no cells remain a blue-purple color while dense cultures appear pink or orange.
Figure 3B:
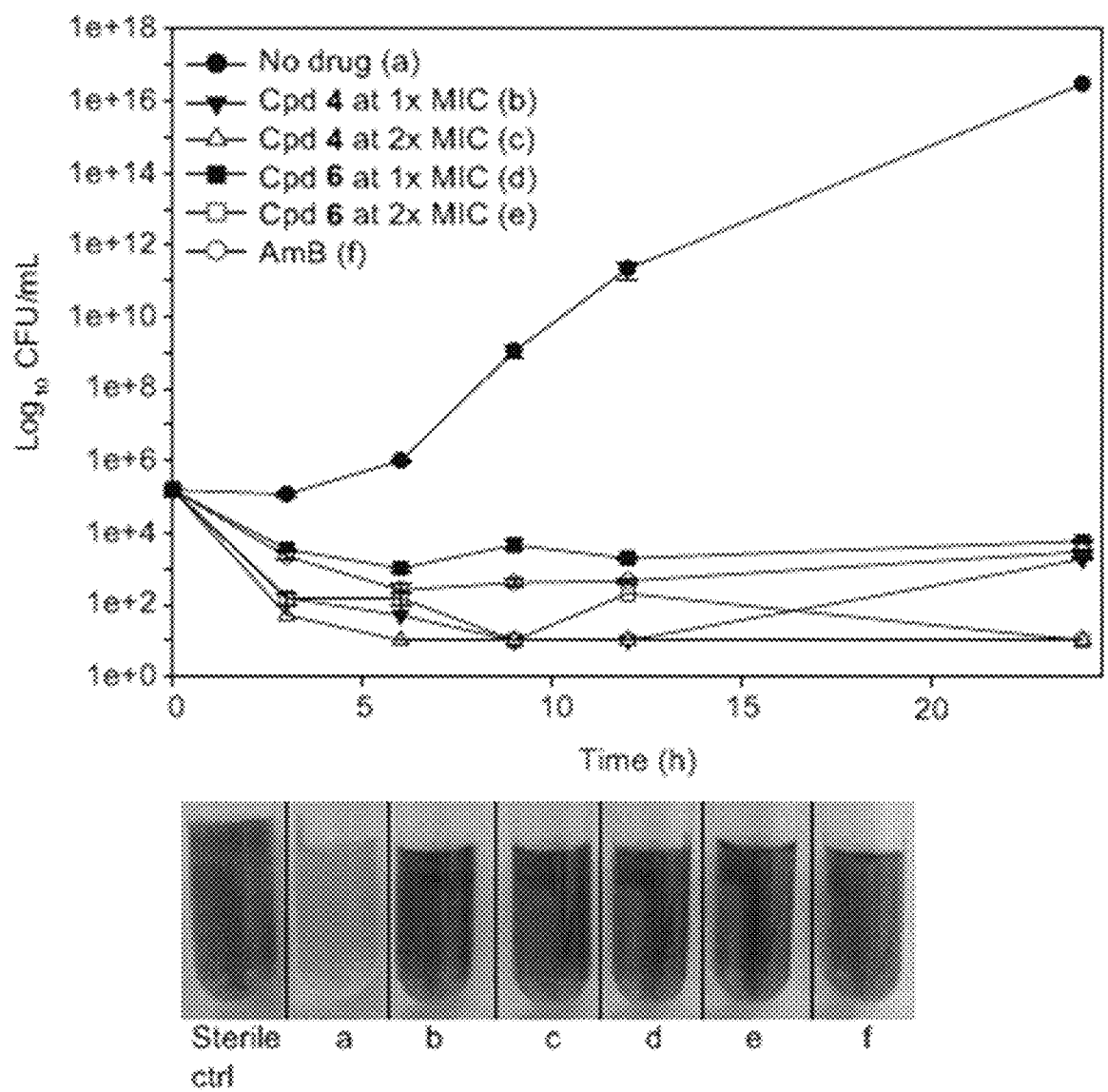
FIG. 3B shows Representative time-kill curves for compounds 4, 6, and AmB against *C. glabrata* ATCC 2001 (strain H), Fungal strains were treated with no drug (black circles), compound 4 at 1×MIC (black triangle), compound 4 at 2×MIC (white triangle), compound 6 at 1×MIC (black square), compound 6 at 2×MIC (white square), and AmB at 1×MIC (white circle). At the 24-hour end point, resazurin was added to the cultures to qualitatively measure the CFU/mL. Resazurin, which is a blue-purple color (dark solution in figure), is metabolized by viable cells to produce resorufin, which has a pink-orange color (light solution in the figure). Cultures with little to no cells remain a blue-purple color while dense cultures appear pink or orange.
Figure 3C:
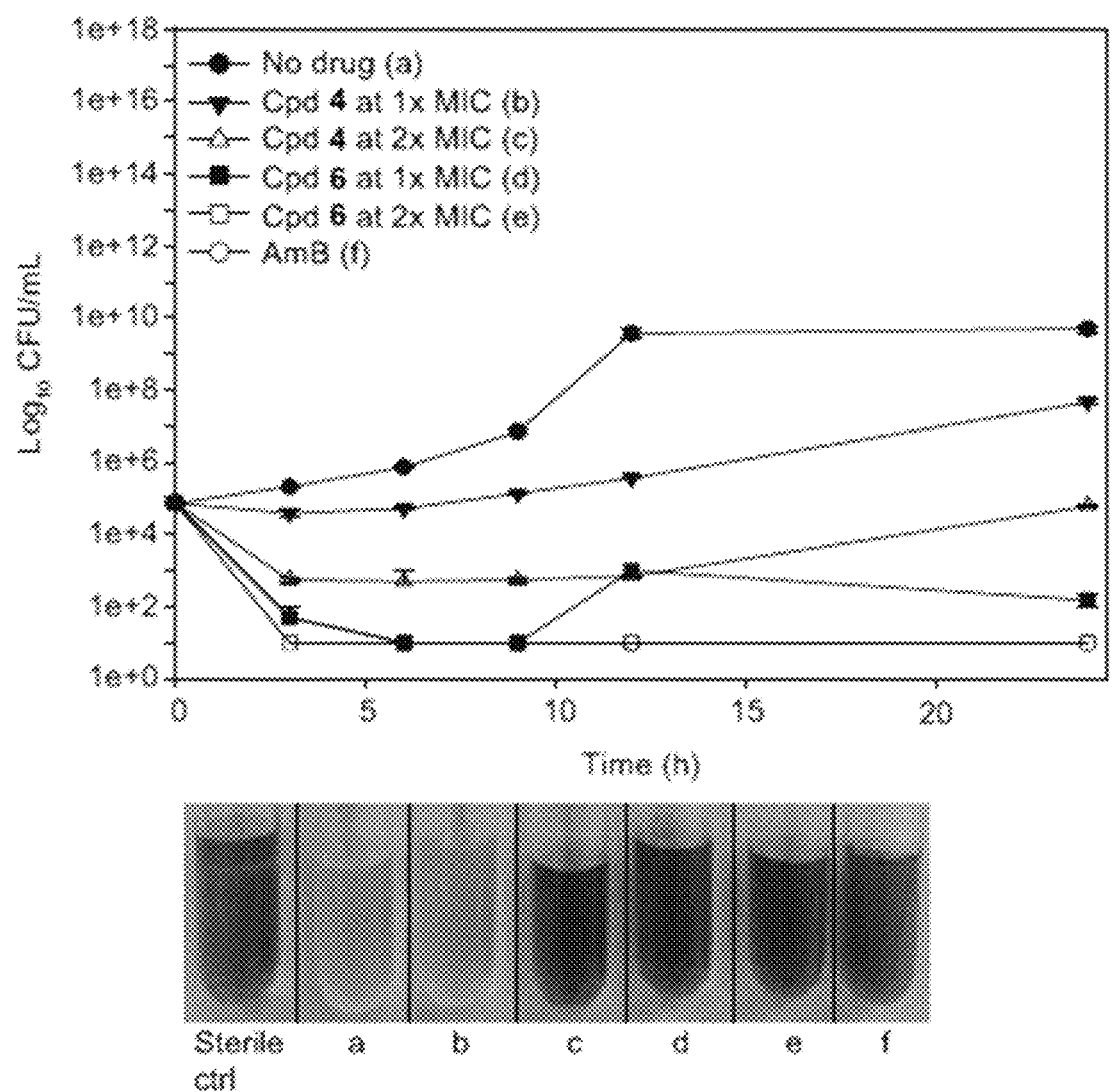
FIG. 3C shows Representative time-kill curves for compounds 4, 6, and AmB against C. *C. auris* AR Bank #0384 (strain K). Fungal strains were treated with no drug (black circles), compound 4 at 1×MIC (black triangle), compound 4 at 2×MIC (white triangle), compound 6 at 1×MIC (black square), compound 6 at 2×MIC (white square), and AmB at 1×MIC (white circle). At the 24-hour end point, resazurin was added to the cultures to qualitatively measure the CFU/mL. Resazurin, which is a blue-purple color(dark solution in figure), is metabolized by viable cells to produce resorufin, which has a pink-orange color(light solution in the figure). Cultures with little to no cells remain a blue-purple color while dense cultures appear pink or orange.
Figure 3D:
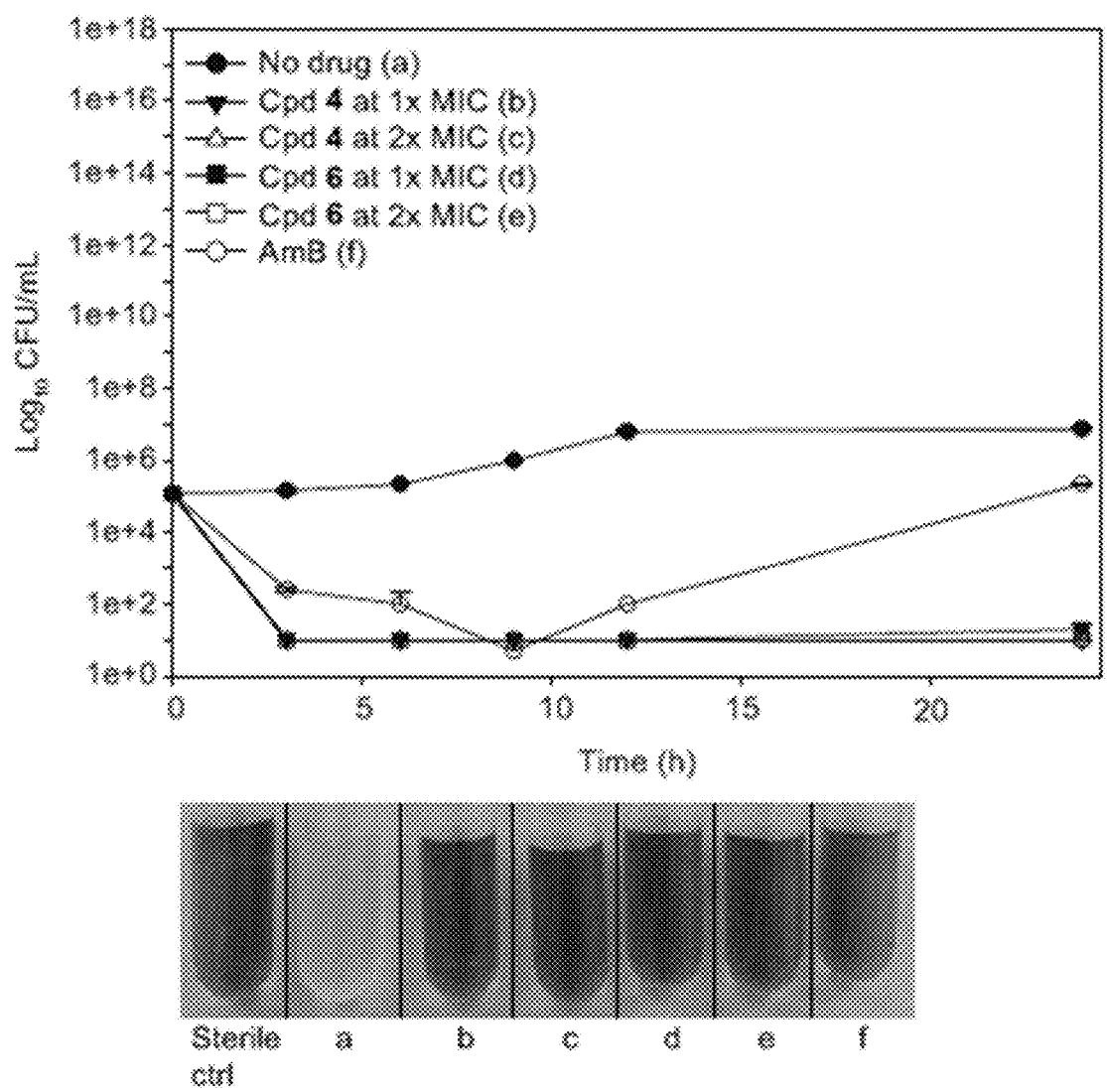
FIG. 3D shows Representative time-kill curves for compounds 4, 6, and AmB against C. auris AR Bank #0390 (strain L). Fungal strains were treated with no drug (black circles), compound 4 at 1×MIC (black triangle), compound 4 at 2×MIC (white triangle), compound 6 at 1×MIC (black square), compound 6 at 2×MIC (white square), and AmB at 1×MIC (white circle). At the 24-hour end point, resazurin was added to the cultures to qualitatively measure the CFU/mL. Resazurin, which is a blue-purple color (dark solution in figure), is metabolized by viable cells to produce resorufin, which has a pink-orange color(light solution in the figure). Cultures with little to no cells remain a blue-purple color while dense cultures appear pink or orange.
Figure 4A:
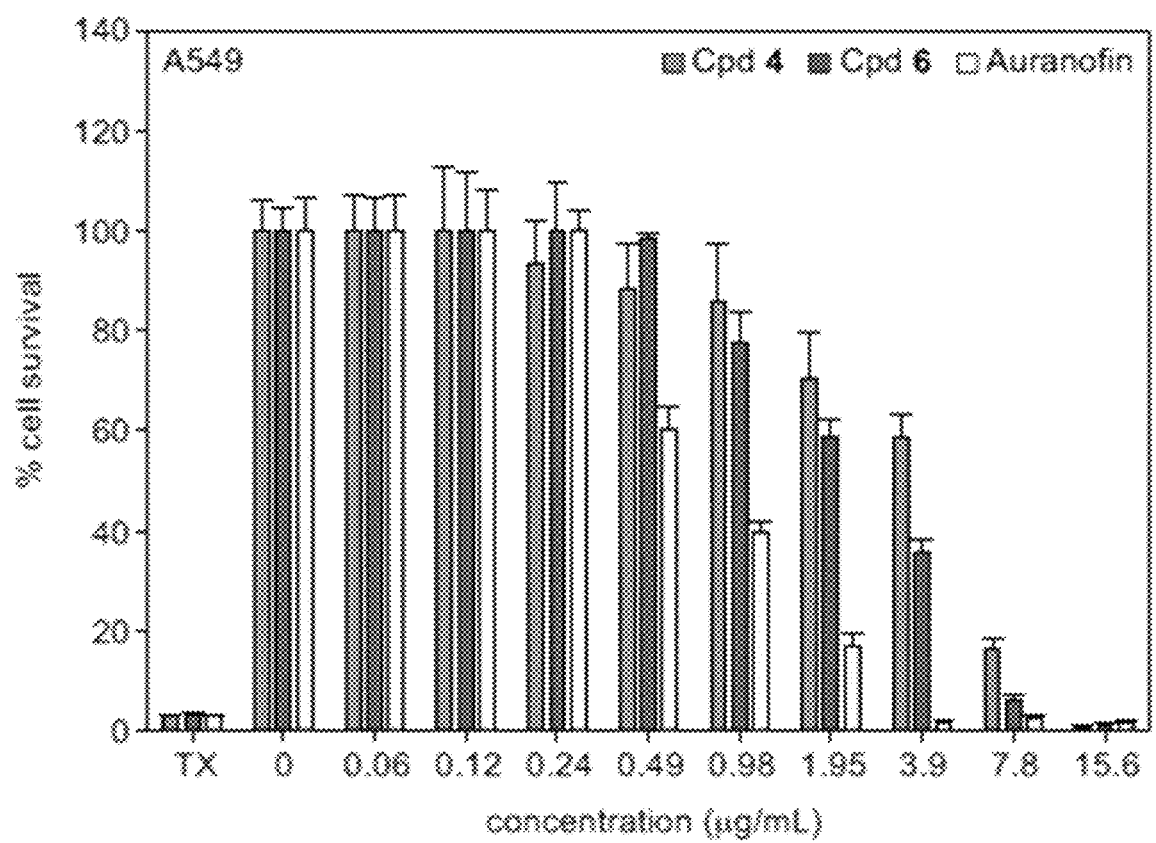
FIG. 4A shows Evaluation of cytotoxicity for compound 4 (light grey), compound 6 (dark grey), and auranofin (white) with A549 cell lines. Controls include treatment with Triton-X® (TX, 1% v/v, positive control) and 0.5% DMSO (negative control). Note: values >100% were normalized to 100%.
Figure 4B:
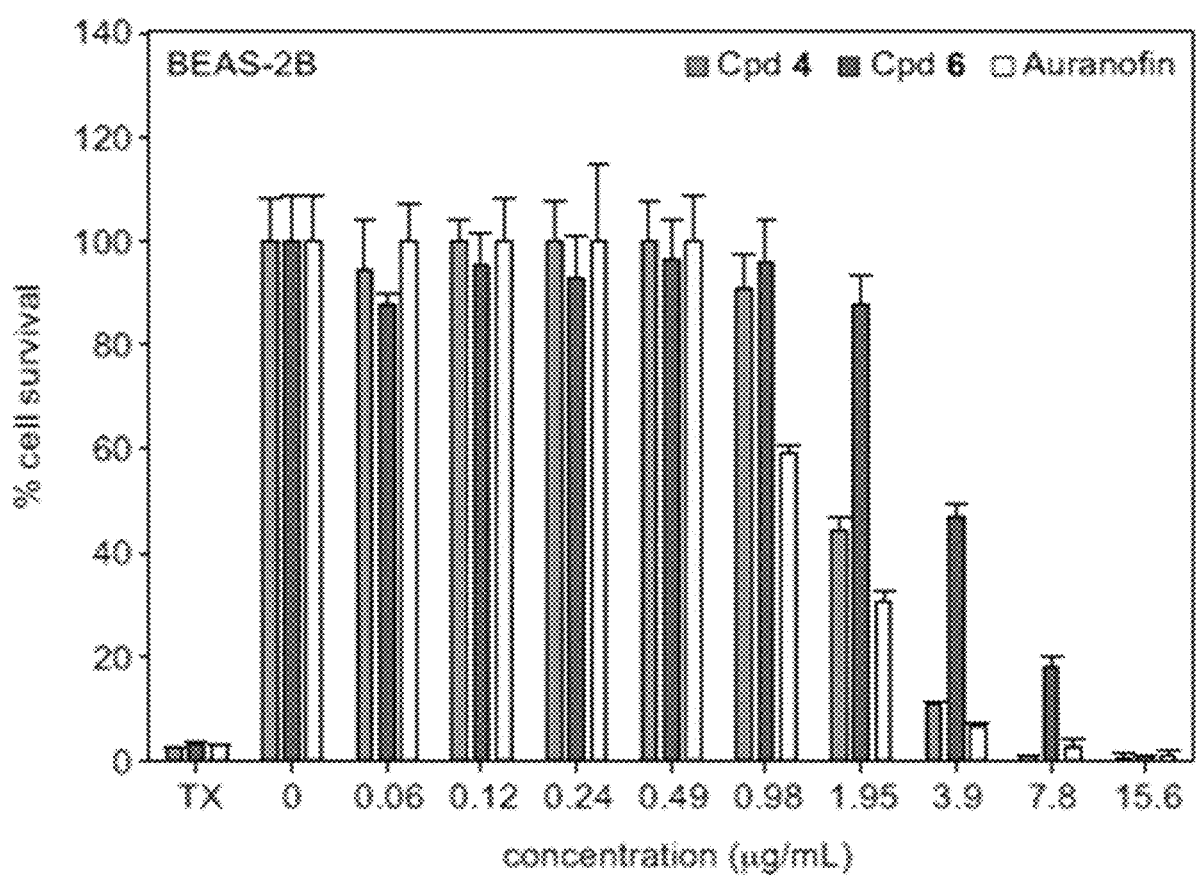
FIG. 4B shows Evaluation of cytotoxicity for compound 4 (light grey), compound 6 (dark grey), and auranofin (white) with BEAS-2B, cell lines. Controls include treatment with Triton-X® (TX, 1% v/v, positive control) and 0.5% DMSO (negative control). Note: values >100% were normalized to 100%.
Figure 4C:
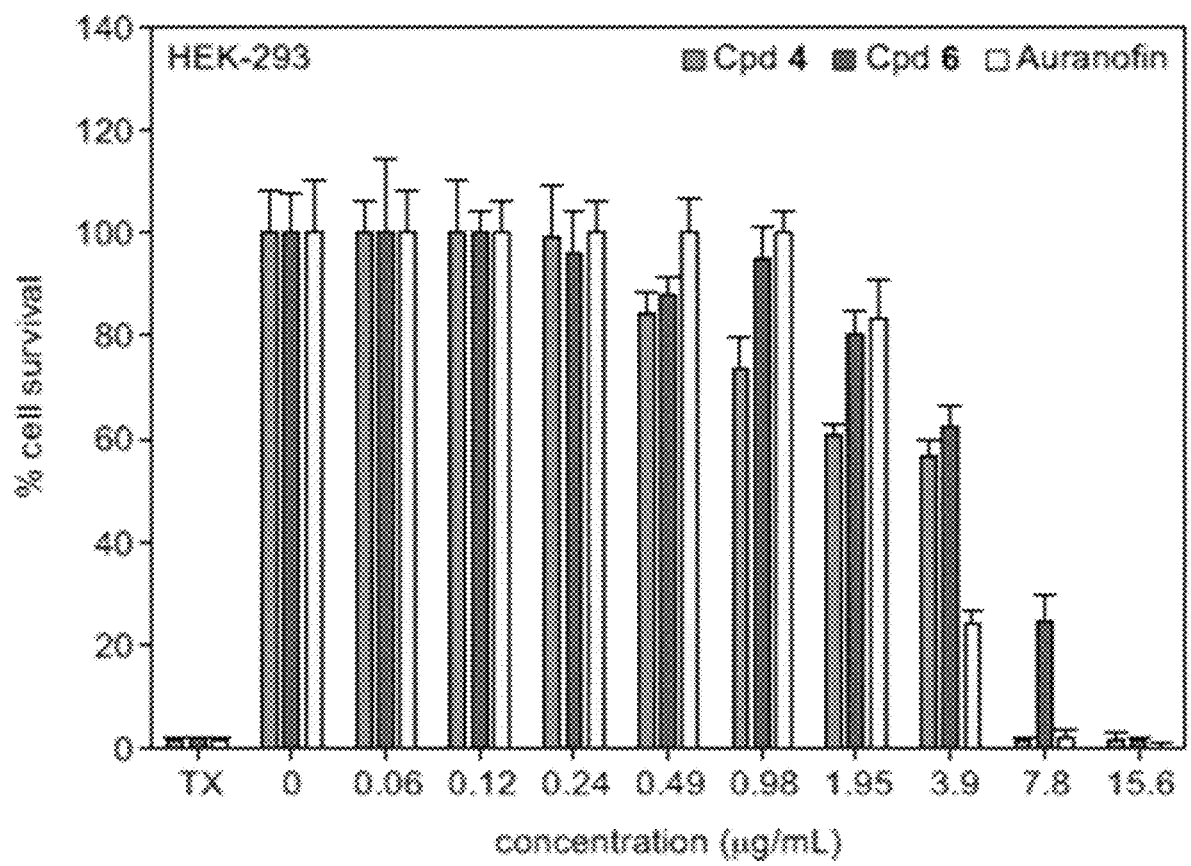
FIG. 4C shows Evaluation of cytotoxicity for compound 4 (light grey), compound 6 (dark grey), and auranofin (white) with HEK-293, cell lines. Controls include treatment with Triton-X® (TX, 1% v/v, positive control) and 0.5% DMSO (negative control). Note: values >100% were normalized to 100%.
Figure 4D:
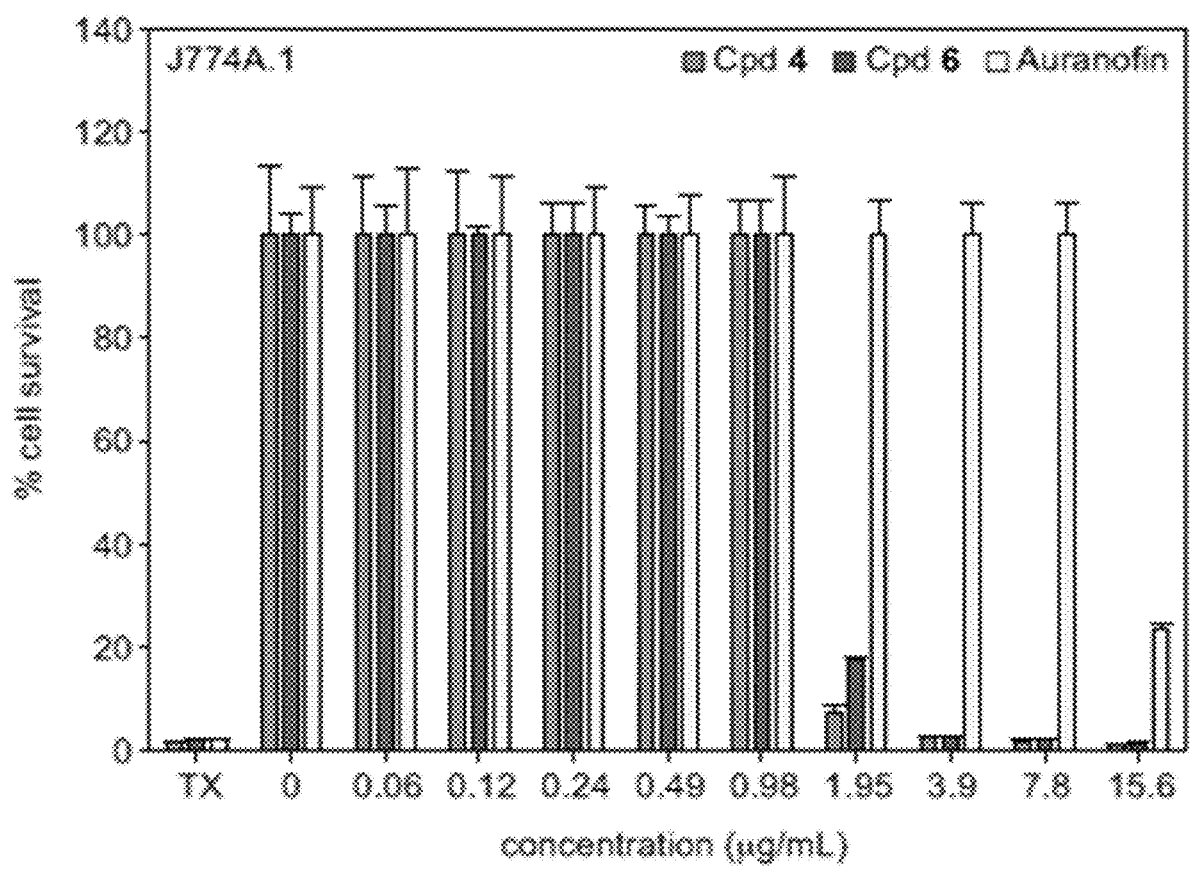
FIG. 4D shows Evaluation of cytotoxicity for compound 4 (light grey), compound 6 (dark grey), and auranofin (white) with J774A.1 cell lines. Controls include treatment with Triton-X® (TX, 1% v/v, positive control) and 0.5% DMSO (negative control). Note: values >100% were normalized to 100%.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

Following long-standing patent law convention, the terms "a", "an", and "the" refer to "one or more" when used in this application, including the claims. Thus, for example, reference to "a biomarker" includes a plurality of such biomarkers, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, width, length, height, concentration or percentage is meant to encompass variations of in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "subject" refers to a target of administration. The subject of the herein disclosed methods can be a mammal. Thus, the subject of the herein disclosed methods can be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. A "patient" refers to a subject afflicted with a disease or disorder. The term "patient" includes human and veterinary subjects.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

The term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level if or any particular patient will depend upon a variety of factors including the disorder being treated and the severity of the disorder; the specific composition employed; the age, bodyweight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products.

EXAMPLES

Example 1: Fungi cause serious nosocomial infections including candidiasis and aspergillosis, some of which display reduced susceptibility to current antifungals. Inorganic compounds have been found beneficial against various medical ailments, but have yet to be applied to fungal infections. Here, we explore the activity of linear and square-planar gold(I) phosphine complexes against a panel of twenty-eight fungal strains including *Candida* spp., *Cryptococcus* spp., *Aspergillus* spp., and *Fusarium* spp. Notably, two square-planar gold(I) complexes with excellent broad-spectrum activity display potent antifungal effects against strains of *Candida auris*, an emerging multidrug-resistant fungus that presents a serious global health threat. To characterize the biological activity of these gold(I) complexes, a series of time-kill studies, cytotoxicity and hemolysis assays, as well as whole cell uptake and development of resistance studies were used.

Results and Discussion

Design, chemical synthesis, and X-ray crystallography. For this study we wanted to create gold(I) complexes that could be easily prepared in a single synthetic step (Scheme 1). The reaction of three commercially available phosphorus ligands with AuCl(THT) (prepared by the reaction of tetrahydrothiophene and tetrachloroauric acid (HAuCl$_4$·3H$_2$O))[44] in chloroform at room temperature afforded mixtures of linear gold(I) complexes 1, 3, and 5 and their square-planar gold(I) complex counterparts 2, 4, and 6 in 23-37% yield, which could be easily separated by silica gel flash chromatography. To expand the availability of chiral gold(I) complexes, which are limited and underexplored for biological applications, we used both the achiral bis(diphenylphosphino)benzene ligand and chiral ligands such as the 1,2-bis[(2S,5S)-2,5-dimethylpholano]benzene and 1,2-bis[(2R,5R)-2,5-dimethylpholano]benzene. The structures of compounds 1-6 were confirmed by $^1$H, $^{13}$C, and $^{31}$P NMR spectroscopy, mass spectrometry, as well as RP-HPLC for purity determination. Additionally, the structures of compounds 3, 4, 5, and 6 were confirmed by X-ray crystallography. Single crystals of complexes were grown by vapor diffusion (FIG. 2A-D). Crystal structures for the known compounds 1[45] and 2[46] had already been solved. The structures of complexes 3 and 5 were consistent with linear geometry for classical gold(I) complexes. Furthermore, complexes 4 and 6 were characterized by a distorted square-planar arrangement around the gold(I) center as observed in gold complexes with bisphosphine ligands. In all cases, the gold(I) center is coordinated to bidentate ligands with phosphorus donors; 3 and 5 have one chloride ion bound to the gold(I) center, while 4 and 6 have all donors as phosphorus atoms. Typically, Au—P distances vary from 2.229-2.239 Å and Au—Cl distances are in the range of 2.286-2.292 Å.

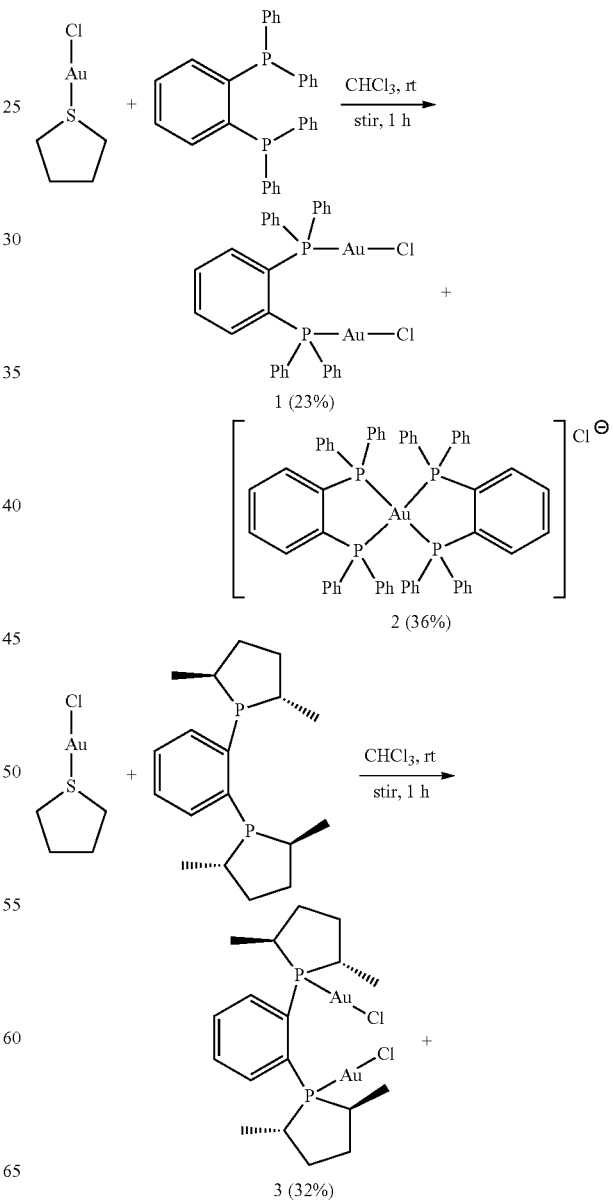

Scheme 1. Synthetic schemes showing the preparation of the Au complexes 1-6.

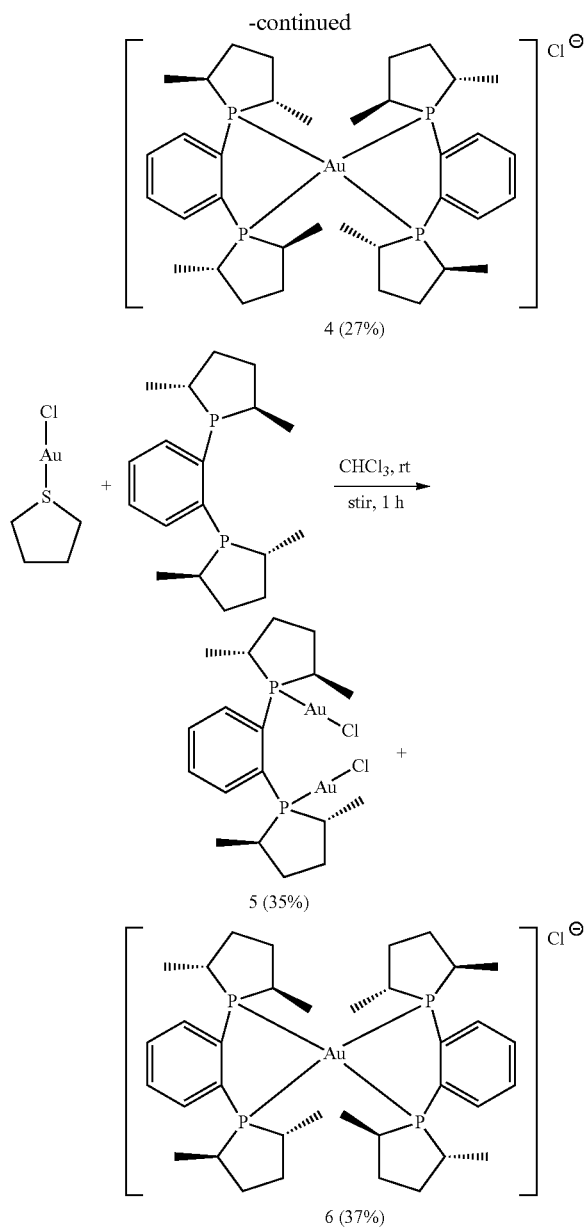

Example 2: Determination of minimum inhibitory concentration (MIC) values of compounds 1-6 against twenty-eight fungal strains. For all biological studies, auranofin was used as a control as it is one of the only metal complexes that is an FDA-approved drug, is well-tolerated in patients, and has some reported antimicrobial activity, and may have a similar cellular target at the gold(I) phosphine complexes. As there are currently no metal complexes that have been thoroughly investigated for antifungal activity, our distorted gold(I)-phosphine complexes are innovative in the field of antifungal development. For most biological assays, the current FDA-approved antifungal AmB was used as a positive control.

Compounds 1-6 were first tested in MIC value determination assays against a panel of twenty fungal strains (Table 1). The panel consisted of seven *Candida albicans* (strains A-G), five non-*albicans Candida* (one *C. glabrata* (strain H), one *C. krusei* (strain I), one *C. parapsilosis* (strain J), and two *C. auris* (strains K and L)), four *Cryptococcus neoformans* (strains M-P), three *Aspergillus* (strains Q-S), as well as one *Fusarium graminearum* (strain T). These strains were chosen as they represent pathogens causing systemic infections. Furthermore, this panel includes many (five out of seven) *C. albicans* strains designated as fluconazole-resistant by the American Type Culture Collection (ATCC, see legend of Table 1). Auranofin had no antifungal activity against *Candida* spp., while it displayed MIC values of 0.06 to 7.8 µg/mL against all four *C. neoformans* and two of the three *Aspergillus* strains tested, which agrees with other reports of its activity.[24] Compounds 4 and 6 displayed excellent activity against *Candida* spp. and *Cryptococcus* spp. with MIC values against seventeen strains in the range of 0.06 to 1.95 µg/mL, which were generally better than MIC values for AmB. Compounds 4 and 6 also displayed good to excellent activity (MIC values of 1.95 to 7.8 µg/mL) against all filamentous fungi, the *Aspergillus* spp. and *Fusarium* spp., which was much better than that of AmB (MIC values 7.8-31.3 µg/mL). Compound 3, on the other hand, was found to be completely inactive against all fungal strains tested, except for *C. neoformans* (strain M). Compounds 1, 2, and 5 were inactive against both *Aspergillus* spp. and *Fusarium* spp. and most of the non-*albicans Candida* strains tested, whereas they displayed some activity in the range of 0.12 to 7.8 µg/mL against a few strains of *C. albicans* and *C. neoformans*. From these data, linear gold(I) complexes (i.e., 1, 3, and 5) and achiral square-planar gold(I) complexes (i.e., 2) were poor antifungals that should not be further pursued, whereas the chiral square-planar gold(I) complexes (i.e., 4 and 6) showed great promise as antifungals and deserved further investigation.

TABLE 1

MIC values in µg/mL (Note: MIC values are also provided µM into parentheses) for compounds 1-6, auranofin, and AmB against various fungal strains.

| Strains | | 1 | 2 | 3 | 4 | 5 | 6 | Auranofin | AmB |
|---|---|---|---|---|---|---|---|---|---|
| *Candida* | A | 3.9 (4.3) | 15.6 (13.9) | 31.3 (40.6) | 0.98 (1.2) | 3.9 (5.1) | 0.49 (0.6) | >31.3 (>46.1) | 0.98 (1.1) |
| *albicans* | B | | 15.6 (13.9) | >31.3 (40.6) | 1.95 (2.3) | | 0.98 (1.2) | >31.3 (>46.1) | 1.95 (2.1) |
| | C | 15.6 (17.1) | | | | 31.3 (40.6) | | | |
| | D | 0.49 (5.4) | 15.6 (13.9) | >31.3 (40.6) | 0.98 (1.2) | 15.6 (20.2) | 0.98 (1.2) | >31.3 (>46.1) | 3.9 (4.2) |
| | E | 7.8 (8.6) | 7.8 (6.9) | 31.3 (40.6) | 0.98 (1.2) | 7.8 (10.1) | 0.49 (0.6) | >31.3 (>46.1) | 7.8 (8.4) |
| | F | 7.8 (8.6) | 7.8 (6.9) | 31.3 (40.6) | 0.98 (1.2) | 15.6 (20.2) | 0.49 (0.6) | >31.3 (>46.1) | 3.9 (4.2) |
| | G | 7.8 (8.6) | 7.8 (6.9) | 31.3 (40.6) | 0.98 (1.2) | 15.6 (20.2) | 0.49 (0.6) | >31.3 (>46.1) | 3.9 (4.2) |
| | | 7.8 (8.6) | 7.8 (6.9) | 31.3 (40.6) | 0.98 (1.2) | 7.8 (10.1) | 0.49 (0.6) | >31.3 (>46.1) | 0.98 (1.1) |

TABLE 1-continued

MIC values in μg/mL (Note: MIC values are also provided μM into parentheses) for compounds 1-6, auranofin, and AmB against various fungal strains.

| Strains | | 1 | 2 | 3 | 4 | 5 | 6 | Auranofin | AmB |
|---|---|---|---|---|---|---|---|---|---|
| Non-*albicans* *Candida* | H | 7.8 (8.6) | 7.8 (6.9) | >31.3 (>40.6) | 1.95 (2.3) | 15.6 (20.2) | 0.98 (0.6) | >31.3 (>46.1) | 3.9 (4.2) |
| | I | | | >31.3 (>40.6) | 1.95 (2.3) | 31.3 (40.6) | 0.98 (0.6) | 31.3 (46.1) | 3.9 (4.2) |
| | J | 15.6 (17.1) | 15.6 (13.9) | | | | | | |
| | K | 15.6 (17.1) | 7.8 (6.9) | >31.3 (>40.6) | 0.98 (1.2) | 15.6 (20.2) | 0.49 (0.6) | >31.3 (>46.1) | 3.9 (4.2) |
| | L | >31.3 (>34.3) | >31.3 (>27.8) | >31.3 (>40.6) | 3.9 (4.6) | >31.3 (>40.6) | 1.95 (2.3) | >31.3 (>46.1) | 1.95 (2.1) |
| | | >31.3 (>34.3) | >31.3 (>27.8) | >31.3 (>40.6) | 7.8 (9.2) | >31.3 (>40.6) | 1.95 (2.3) | >31.3 (>46.1) | 1.95 (2.1) |
| *Cryptococcus* | M | 0.98 (1.1) | 3.9 (3.5) | 1.95 (2.5) | 0.98 (1.2) | 0.12 (0.2) | 0.25 (0.3) | ≤0.06 (≤0.1) | >31.3 (>33.9) |
| | N | 3.9 (4.3) | 3.9 (3.5) | >31.3 (>40.6) | 0.98 (1.2) | 15.6 (20.2) | 0.49 (0.6) | 3.9 (5.7) | 0.98 (1.1) |
| | O | 3.9 (4.3) | 3.9 (3.5) | 31.3 (40.6) | 0.98 (1.2) | 7.8 (10.1) | 0.49 (0.6) | 7.8 (11.5) | 1.95 (2.1) |
| | P | 15.6 (17.1) | 3.9 (3.5) | >31.3 (>40.6) | 0.98 (1.2) | 7.8 (10.1) | 0.49 (0.6) | 3.9 (5.7) | 0.98 (1.1) |
| *Aspergillus* | Q | >31.3 (>34.3) | >31.3 (>27.8) | >31.3 (>40.6) | 3.9 (4.6) | >31.3 (>40.6) | 3.9 (4.6) | 3.9 (5.7) | 15.6 (16.9) |
| | R | >31.3 (>34.3) | >31.3 (>27.8) | >31.3 (>40.6) | 1.95 (2.3) | >31.3 (>40.6) | 3.9 (4.6) | 7.8 (11.5) | 7.8 (8.4) |
| | S | >31.3 (>34.3) | >31.3 (>27.8) | >31.3 (>40.6) | 7.8 (9.2) | >31.3 (>40.6) | 7.8 (9.2) | >31.3 (>46.1) | 31.3 (33.8) |
| *Fusarium* | T | >31.3 (>34.3) | 31.3 (27.8) | >31.3 (>40.6) | 3.9 (4.6) | >31.3 (>40.6) | 3.9 (4.6) | >31.3 (>46.1) | 7.8 (8.4) |

*Candida albicans* strains: A = *C. albicans* ATCC MYA-1003(R), B = *C. albicans* ATCC 10231(R), C = *C. albicans* ATCC MYA-1237(R), D = *C. albicans* ATCC MYA-2310(S), E = *C. albicans* ATCC MYA-2876(S), F = *C. albicans* ATCC 64124(R), G = *C. albicans* ATCC 90819(R).
NOTE:
(S) and (R) are indicating strains that are reported to be sensitive (S) and resistant (R) to fluconazole by the ATCC.
Non-*albicans* *Candida* strains: H = *C. glabrata* ATCC 2001, I = *C. krusei* ATCC 6258, J = *C. parapsilosis* ATCC 22019, K = *C. auris* AR Bank # 0384, L = *C. auris* AR Bank # 0390.
*Cryptococcus* strains: M = *C. neoformans* ATCC MYA-85, N = *C. neoformans* CN1, O = *C. neoformans* CN2, P = *C. neoformans* CN3.
*Aspergillus* strains: Q = *A. nidulans* ATCC 38163, R = *A. terreus* ATCC MYA-3633, S = *A. flavus* ATCC MYA-3631.
*Fusarium* strain: T = *F. graminearum* 053.
Abbreviations: AmB = amphotericin B; MIC = minimum inhibitory concentration.
MIC ≤1.95 μg/mL (excellent antifungal activity)
MIC = 3.9-7.8 μg/mL (good antifungal activity)
MIC ≥15.6 μg/mL (poor antifungal activity)

As *C. auris* is an emerging drug-resistant pathogen, two *C. auris* strains were included in an initial panel (strains K and L) (Table 1). As compounds 4 and 6 displayed good and excellent activity against these two *C. auris* strains, respectively, the panel was expanded and tested compounds 4 and 6, and AmB with an additional eight *C. auris* strains (strains I-VIII) from the Centers for Disease Control (CDC) Antibiotic Resistance Bank[47] (Table 2). Both compounds 4 and 6 had excellent antifungal activity (MIC values 0.98 to 1.95 μg/mL) against almost all *C. auris* strains.

TABLE 2

MIC values in μg/mL (Note: MIC values are also provided in μM into parentheses) for compounds 4, 6, and AmB against a panel of *C. auris* strains.

| Strains | 4 | 6 | AmB | CAS | FLC† | VRC† |
|---|---|---|---|---|---|---|
| I | 0.98 (1.2) | 0.98 (1.2) | 1.95 (2.1) | <0.98 (<0.9) | 0.49 (1.6) | 0.06 (0.2) |
| II | 1.95 (2.3) | 0.98 (1.2) | 0.98 (1.1) | <0.98 (<0.9) | 0.49 (1.6) | 0.06 (0.2) |
| III | 1.95 (2.3) | 3.9 (4.6) | 1.95 (2.1) | 1.95 (1.8) | 62.5 (204.1) | 1.95 (5.6) |
| IV | 1.95 (2.3) | 1.95 (2.3) | 1.95 (2.1) | <0.98 (<0.9) | >62.5 (>204.1) | |
| V | 1.95 (2.3) | | 1.95 (2.1) | | >62.5 (>204.1) | 3.9 (11.2) |
| VI | 1.95 (2.3) | 3.9 (4.6) | 1.95 (2.1) | 7.8 (7.1) | | 3.9 (11.2) |
| VII | 1.95 (2.3) | 1.95 (2.3) | 1.95 (2.1) | 31.3 (28.6) | 0.98 (3.2) | 0.06 (0.2) |
| VIII | 1.95 (2.3) | 1.95 (2.3) | 1.95 (2.1) | 31.3 (28.6) | >62.5 (>204.1) | 0.49 (1.4) |
| K* | | 1.95 (2.3) | 1.95 (2.1) | 7.8 (7.1) | >62.5 (>204.1) | 0.98 (2.8) |
| L* | | 1.95 (2.3) | 1.95 (2.1) | | 31.3 (102.2) | 0.24 (0.7) |
| | 3.96 (4.6) | 1.95 (2.3) | | 1.95 (1.8) | >62.5 (>204.1) | 0.49 (1.4) |
| | 7.8 (9.2) | | | 7.8 (7.1) | | |

*C. auris* strains: I = *C. auris* AR Bank # 0381, II = *C. auris* AR Bank # 0382, III = *C. auris* AR Bank # 0383, IV = *C. auris* AR Bank # 0385, V = *C. auris* AR Bank # 0386, VI = *C. auris* AR Bank # 0387, VII = *C. auris* AR Bank # 0388, VIII = *C. auris* AR Bank # 0389, K = *C. auris* AR Bank # 0384, L = *C. auris* AR Bank # 0390.
Abbreviations: AmB = amphotericin B; CAS = caspofungin; FLC = fluconazole; MIC = minimum inhibitory concentration; VRC = voriconazole.
*Note:
values presented for strains K and L, which are new to this manuscript, are also presented in Table 1, but are also displayed here for ease of comparison.
†MIC-2 values are presented for azoles. MIC-0 values are presented for all other compounds.
MIC ≤1.95 μg/mL (excellent antifungal activity)
MIC = 3.9-7.8 μg/mL (good antifungal activity)
MIC ≥15.6 μg/mL (poor antifungal activity)

Time-kill assays for compounds 4 and 6. With the very promising antifungal activity results for compounds 4 and 6, their killing kinetics were next examined. Time-kill assays were done with four representative Candida strains, one C. albicans (strain B), one C. glabrata (strain H), and two C. auris (strains K and L) (FIG. 3A-D). Compounds 4 and 6 were tested at both their 1× and 2×MIC values, and AmB at 1×MIC was used as a known fungicidal control. Both compounds significantly decreased fungal colony forming units (CFU) by 102 CFU/mL by the 3 h time point and did not increase over the 24 h time period, which indicated that compounds 4 and 6 are fungicidal. This pattern was very similar to AmB. With C. albicans (strain B), compound 4 at 1×MIC reached the limit of detection at 9 h and compound 6 at 2×MIC at 3 h. With C. glabrata (strain H), both compounds at 2×MIC were at the limit of detection by 24 h. For C. auris (strain K), compound 4 failed to reach the limit of detection by 24 h, but compound 6 at 1×MIC reached the limit at 6 h. However, with C. auris (strain L) both compounds 4 and 6 at 1×MIC reached the limit of detection by 3 h and remained under the limit of detection, while AmB reached the limit of detection at 9 h before the CFU/mL began to return to the original yeast cell concentration.

Prevention of biofilm formation and disruption of pre-formed biofilm assays for compounds 4 and 6. It is well known that any surface may be at risk of forming biofilms. Surfaces at risk of forming biofilms merely need exposure to a strain of bacteria or fungi known to form biofilms. Biofilms are well-known in the world of bacteria to cause difficult to treat and reoccurring infections by a multitude of species including Staphylococcus aureus, Escherichia coli, and Pseudomonas aeruginosa.[48,49] There is an extensive number of fungal strains known to form biofilms, but biofilm formation on catheters, prostheses, and other medical devices in healthcare associated infections are mainly limited to Candida spp.[50-53] The ability of compounds 4 and 6 to both prevent and disrupt biofilm formation is important for prophylactic treatment and to stop the spread of a fungal infection. However, it is regarded that it is more challenging to disrupt a pre-formed biofilm as the large, sugary extra-cellular matrix that is the key characteristic of biofilms, can prevent many drugs from reaching the fungal cells.[54] Furthermore, in biofilms, fungal cells can upregulate efflux pumps to prevent the action of any drugs that do reach the fungal cells through the extracellular matrix.[55] The ability of compounds 4 and 6, auranofin, and AmB to both prevent biofilm formation and to disrupt pre-formed biofilms of C. albicans (strain B), C. glabrata (strain H), and C. auris (strains K and L) (Table 3 and FIGS. 7A-D and 8A-D) were measured. As the biofilm assay is a colorimetric assay and it is difficult to achieve 100% disruption of biofilms, the sessile MIC90 (SMIC90), which is the concentration of compound at which there is a 90% decrease in metabolic activity as compared to untreated biofilm is reported. Both compounds 4 and 6 showed similar results with both fungal strains tested. SMIC90 values in prevention of biofilm formation assays were 1- to 2-fold higher than with planktonic cells. When tested against a pre-formed biofilm, compound 4 had a SMIC90 of 7.8 µg/mL with both strains and compound 6 had a SMIC90 of 3.9 µg/mL with both strains. These SMIC90 results were 4-fold higher than the MIC results for the same Candida strains with planktonic cells. Interestingly, auranofin with C. albicans (strain B) achieved the same SMIC90 as compound 4, but was inactive against C. glabrata (strain H). These values for auranofin are similar to a value reported for auranofin against the biofilm of one C. albicans strain.[23] In contrast, AmB had SMIC90 values of 7.8 µg/mL and 31.3 µg/mL against C.glabrata (strain H) and C. albicans (strain B), respectively, which were 2- and 32-fold higher than its MIC values against the same strains in liquid culture.

It is promising that both compounds 4 and 6 have good activity against biofilms of Candida spp. There have been reports that compared planktonic and sessile MIC values of other FDA-approved antifungal agents, which demonstrate the reduced susceptibility of biofilms to antifungal agents.[52,56] Of the currently used antifungal agents, AmB and echinocandins have the best efficacy with biofilms with SMIC90 in the range of 0.5-128 µg/mL (4- to 128-fold increase from MIC) and 0.03-8 µg/mL (2- to 16-fold increase from MIC), respectively. For the azoles, itraconazole and posaconazole have some efficacy against biofilms with 1- to 256-fold increases in MIC against biofilms. However, VRC and FLC have no efficacy with SMIC$_{90}$ exceeding 512 µg/mL. Additionally, new investigational antifungal molecules that have been reported to be active against C. albicans biofilms, include azole derivatives and benzimidazole containing compounds. For the azole derivatives, seven econazole derivatives were reported with minimum biofilm inhibiting concentrations at or near 8 µg/mL[57] (2- to 16-fold increase in MIC) and alkylated azole derivatives displayed SMIC$_{80}$ values of 15.6-31.3 µg/mL.[32] Other investigational molecules with activity against biofilms included three neomycin B-benzimidazole hybrid molecules with SMIC80 values of 7.8-15.6 µg/mL[32,58] (2- to 4-fold increase in MIC). Candida biofilms are known to be key virulence factors in mucosal membrane infections (i.e., thrush and vulvovaginal infections)[59-61] and Candida clinical isolates from bloodstream infections can form biofilms as well. Of the bloodstream isolates, it is estimated that approximately 20% of C. albicans strains were able to form biofilm in vitro, with that percentage increasing to near 70% for non-albicans Candida.[62-64]

With few other antifungals displaying anti-biofilm activity, the 4-fold difference that observed in the instant invention is highly promising.

TABLE 3

Prevention of biofilm formation and disruption of a pre-formed biofilm by compounds 4, 6, auranofin, and AmB against four fungal strains.

| Strain | Compound | Biofilm prevention SMIC$_{90}$ (µg/mL) | Pre-formed biofilm SMIC$_{90}$ (µg/mL) |
|---|---|---|---|
| B | 4 | 3.9 | 7.8 |
|   | 6 | 0.98 | 3.9 |
|   | Auranofin | 7.8 | 7.8 |
|   | AmB | 0.98 | 31.3 |
| H | 4 | 3.9 | 7.8 |
|   | 6 | 1.95 | 3.9 |
|   | Auranofin | 31.3 | >31.3 |
|   | AmB | 0.98 | 7.8 |
| K | 4 | 3.9 | 7.8 |
|   | 6 | 3.9 | 7.8 |
|   | Auranofin | >31.3 | >31.3 |
|   | AmB | 1.95 | 1.95 |
| L | 4 | 3.9 | 15.6 |
|   | 6 | 3.9 | 7.8 |
|   | Auranofin | >31.3 | >31.3 |
|   | AmB | 1.95 | 7.8 |

Strains: B = C. albicans ATCC 10231, H = C. glabrata ATCC 2001, K = C. auris AR Bank # 0384, L = C. auris AR Bank # 0390.

Mammalian cytotoxicity assays for compounds 4 and 6. For the gold complexes to progress further into the drug development process, the gold complex activity should be specific to fungal cells and not be toxic to mammalian cells.

Therefore, we tested compounds 4 and 6 as well as the control auranofin against four mammalian cell lines: human adenocarcinoma (A549), bronchial epithelial (BEAS-2B), human embryonic kidney (HEK-293), and murine macrophage (J774A.1) (FIG. 4A-D). Excluding auranofin with J774A.1, we observed <50% cell survival at 7.8 µg/mL with no cell survival at 15.6 µg/mL for both compounds 4 and 6 and auranofin. Auranofin, displayed $IC_{50}$ values of 0.5-3.0 µM against A549, BEAS-2B, and HEK-293 cell lines, which agrees with other published values against cisplatin-sensitive cell lines.[42] For J774A.1, the $IC_{50}$ value for auranofin was significantly higher at 16.2 µM. As J774A.1 is a macrophage cell line, auranofin may have had an anti-inflammatory effect that stimulated cell metabolism, which could account for the higher $IC_{50}$ value. There is interest in repurposing auranofin as an antimicrobial, however, auranofin does not appear to be promising as an antifungal. Auranofin displayed poor activity against *Candida* spp. (MIC >31.3 µg/mL) and only good activity against two *Aspergillus* spp. (MIC=3.9 and 7.8 µg/mL). For compound 4, $IC_{50}$ values were very similar for BEAS-2B, HEK-293, and J774A.1 (1.5-2.0 µM) and somewhat higher for A549 (4.5 µM). The MIC values for compounds 4 and 6 against eighteen of the *Candida* spp. are in the range of 0.49-1.95 µg/mL, which are concentrations at which there is toxicity observed for the mammalian cells. Overall, compounds 4 and 6 displayed somewhat better selectivity to kill fungi over mammalian cells than the FDA approved drug, auranofin. Despite this result, there is room to improve these gold complexes to increase the therapeutic window by reducing mammalian cell toxicity.

Reports have suggested that gold complexes bind to thioredoxin reductase in bacteria and mammalian cells,[29,30] but there is some evidence to suggest that gold complexes could inhibit mitochondrial function in fungi.[26] Future studies for the gold complexes, out of scope for this proof-of-concept work, should seek to answer whether these square planar gold complexes bind thioredoxin reductase or mitochondrial enzymes, which if so, could lead to more in depth structure activity studies to decrease cytotoxicity. For other reported gold complexes which were investigated for anticancer activity, ICso values for complexes comprised of (1R,2R)-(+)-1,2-diaminocyclohexane ligands ranged from 1.2-14.8 µM against cancer cell lines, and were >100 µM against a human normal lung fibroblast cell line, MRCS.[42] Another square-planar gold(I) diphosphine complex displayed $IC_{50}$ values of 0.3-9.2 µM.[65] In this report, $IC_{50}$ values ranged from 0.55-0.83 µM against two cancer cell lines for both compounds 4 and 6. Interestingly, an achiral version of these complexes was reported to be insoluble. Furthermore, in a preliminary study with a xenograft model, compounds 4 and 6 were tolerated in mice at a dose of 2 mg/kg (100% survival) or 8 mg/kg (83% and 67% survival, respectively), which suggests an acceptable level of toxicity at lower doses.

TABLE 4

$IC_{50}$ (µM) for mammalian cell lines.

| Compound # | A549 | BEAS-2B | HEK-293 | J774A.1 |
|---|---|---|---|---|
| 4 | 4.5 ± 0.6 | 2.0 ± 0.3 | 1.9 ± 0.7 | 1.5 ± 0.1 |
| 6 | 2.5 ± 0.2 | 4.9 ± 0.3 | 5.7 ± 0.5 | 1.5 ± 0.1 |
| Auranofin | 0.5 ± 0.1 | 1.3 ± 0.1 | 3.0 ± 0.2 | 16.2 ± 0.9 |

Figure 5A:
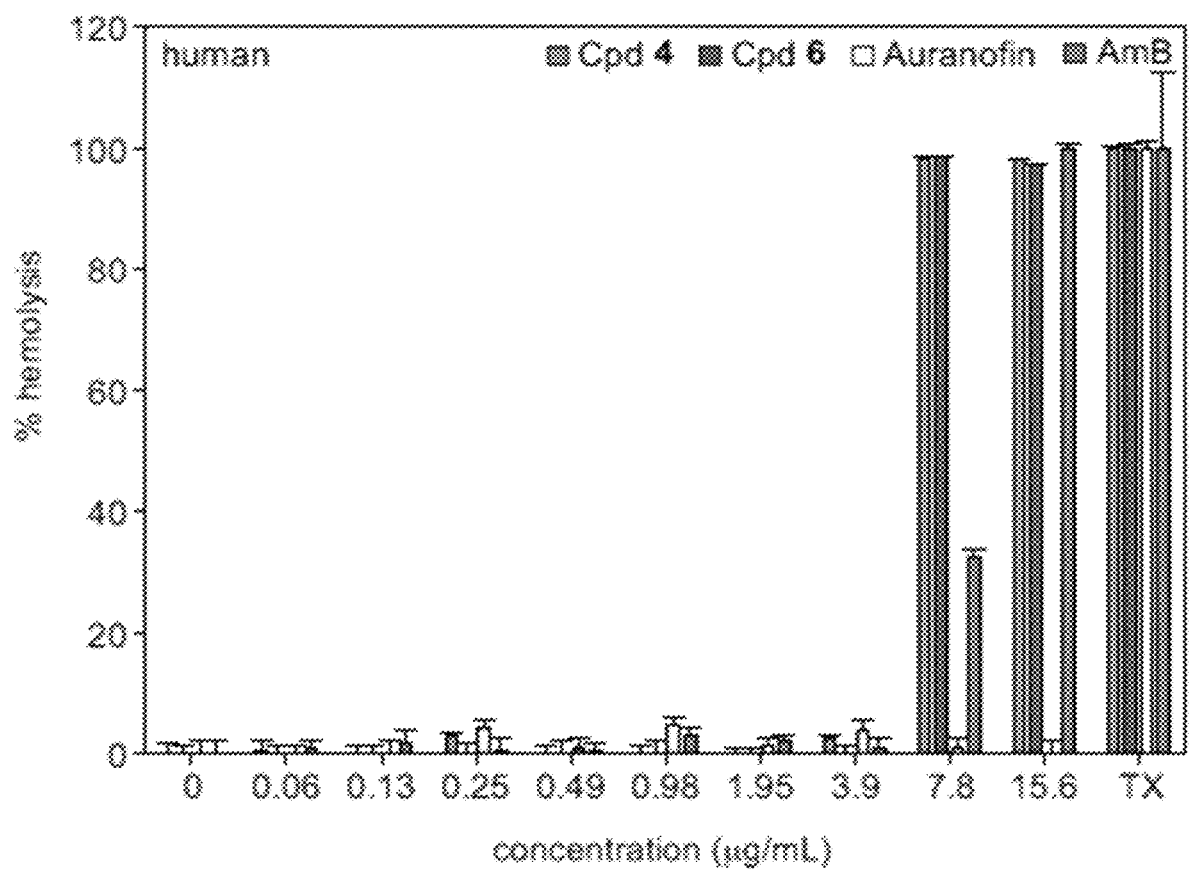
FIG. 5A shows Hemolytic activity of compound 4 (light grey), compound 6 (dark grey), auranofin (white), and AmB (grey) against human red blood cells. Positive control is Triton-X® (TX, 1% v/v).
Figure 5B:
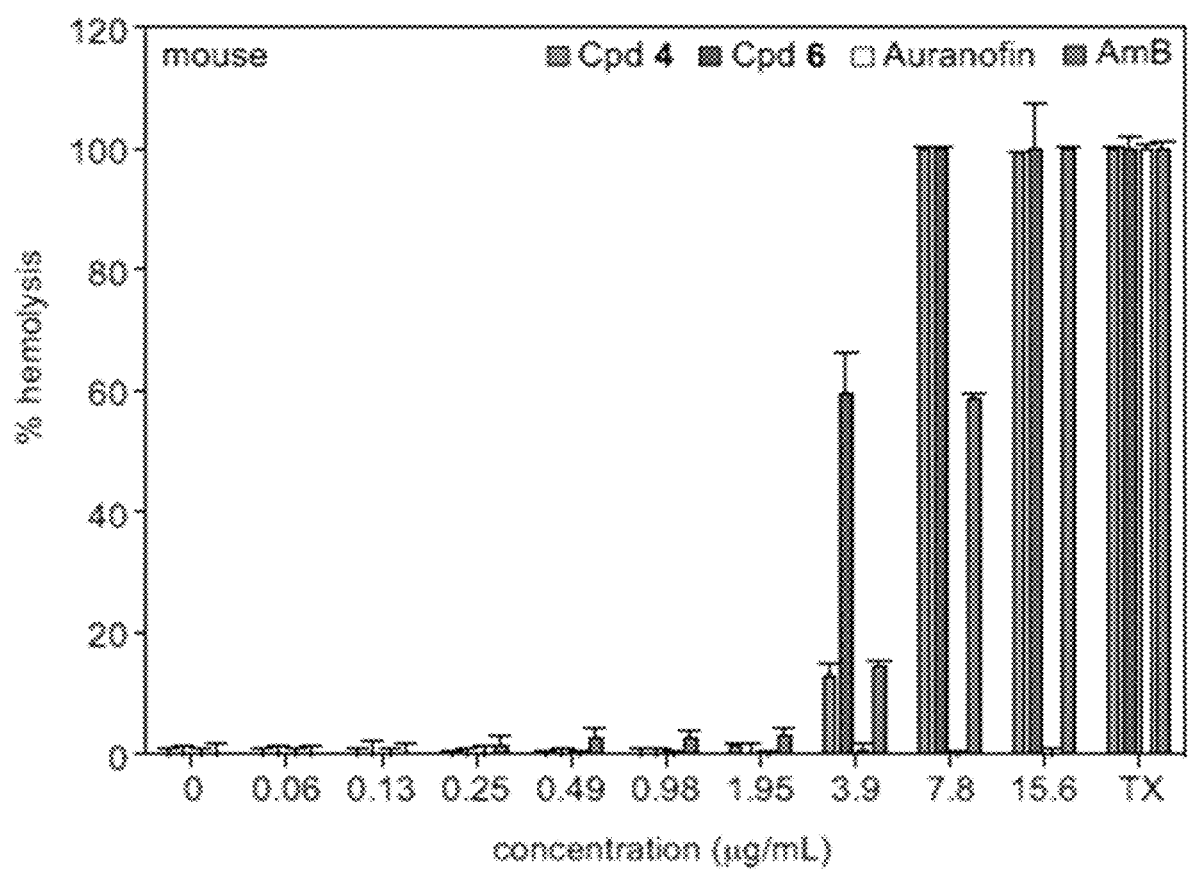
FIG. 5B shows Hemolytic activity of compound 4 (light grey), compound 6 (dark grey), auranofin (white), and AmB (grey) against murine red blood cells. Positive control is Triton-X® (TX, 1% v/v).

Measurement of hemolysis for compounds 4 and 6. To expand upon the cytotoxicity results, we obtained both murine and human red blood cells (RBCs) to evaluate the hemolytic activity of compounds 4 and 6 as compared to both auranofin and AmB, as well as to the detergent, Triton-X® (positive control) (FIG. 5A-B). Some drugs, especially those containing both hydrophobic and hydrophilic components, can disrupt cell membranes to cause hemolysis.[66] Examples of drugs that are known to be hemolytic include AmB as well as cisplatin. With AmB, to minimize hemolytic activity a lipid formulation has been developed.[67] The results are similar for both murine and human RBCs, however, the murine RBCs appear more prone to hemolysis as compounds 4 and 6 displayed 13% and 60% hemolysis, respectively, at 3.9 mg/mL and less than 5% with human RBCs. We observed that both compounds 4 and 6 displayed hemolytic activity at 7.8 µg/mL. AmB exhibited somewhat better values with 30-60% hemolysis at 7.8 µg/mL and 100% hemolysis at 15.6 µg/mL. In contrast, auranofin displayed no hemolytic activity at 15.6 µg/mL. With MIC values for compounds 4 and 6 typically in the range of 0.49-1.95 µg/mL for *Candida* spp., there is a 1- to 2-fold therapeutic window, which is not perfect when comparing to the desired 10-fold therapeutic window.

Figure 6:
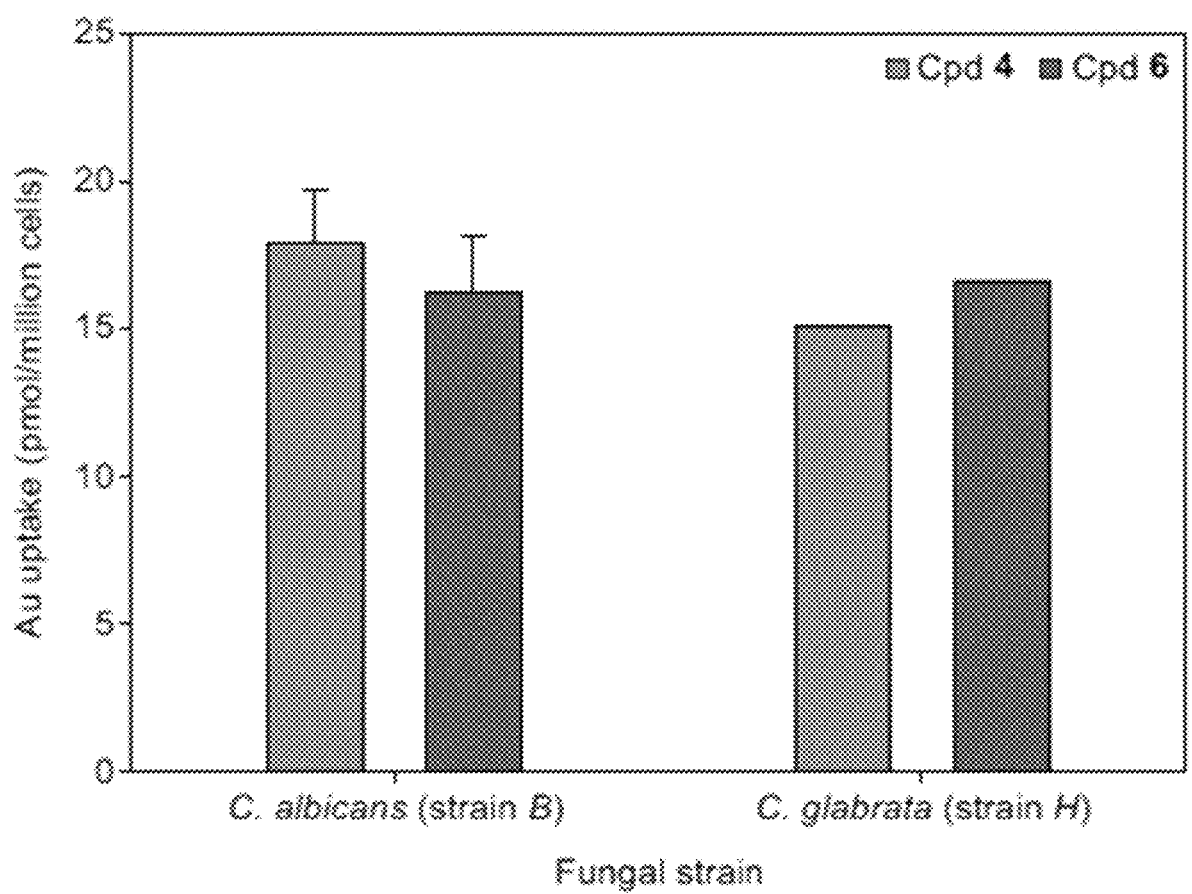
FIG. 6 shows Whole cell uptake of 10 μM of compound 4 (left bars) and compound 6 (right bars) by C. albicans ATCC 10231 (strain B) after 30 min treatment and C. glabrata ATCC 2001 (strain H) after 30 min treatment.
Figure 7A:
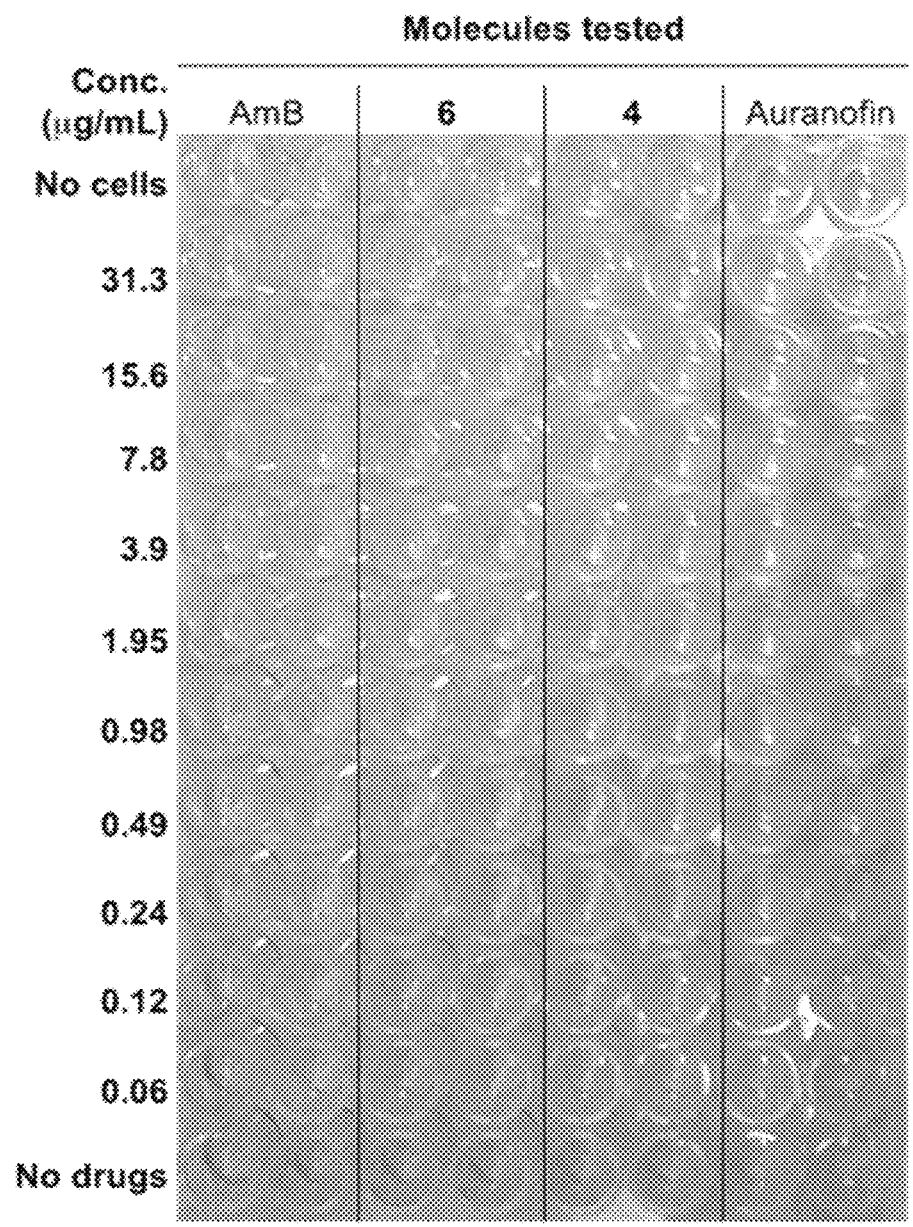
FIG. 7A shows Prevention of biofilm formation of C. albicans ATCC 10231 (strain B). treated at 0 h with auranofin, 6, 4, and AmB. XTT dye is metabolized by fungal cells to produce an orange color. The corresponding data are presented in Table 3.
Figure 7C:
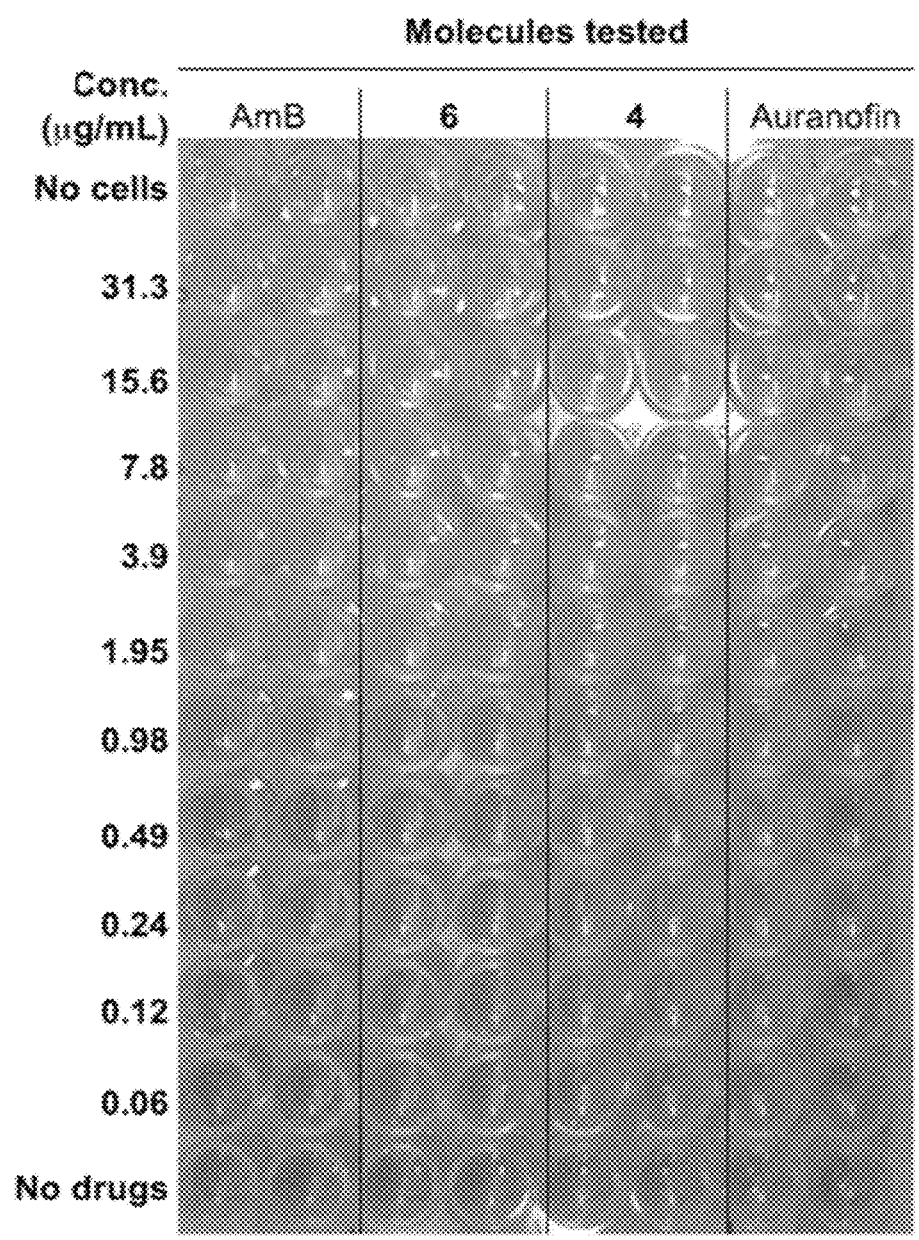
FIG. 7C shows Prevention of biofilm formation of C. auris AR Bank #0384 (strain K), treated at 0 h with auranofin, 6, 4, and AmB. XTT dye is metabolized by fungal cells to produce an orange color. The corresponding data are presented in Table 3.
Figure 7D:
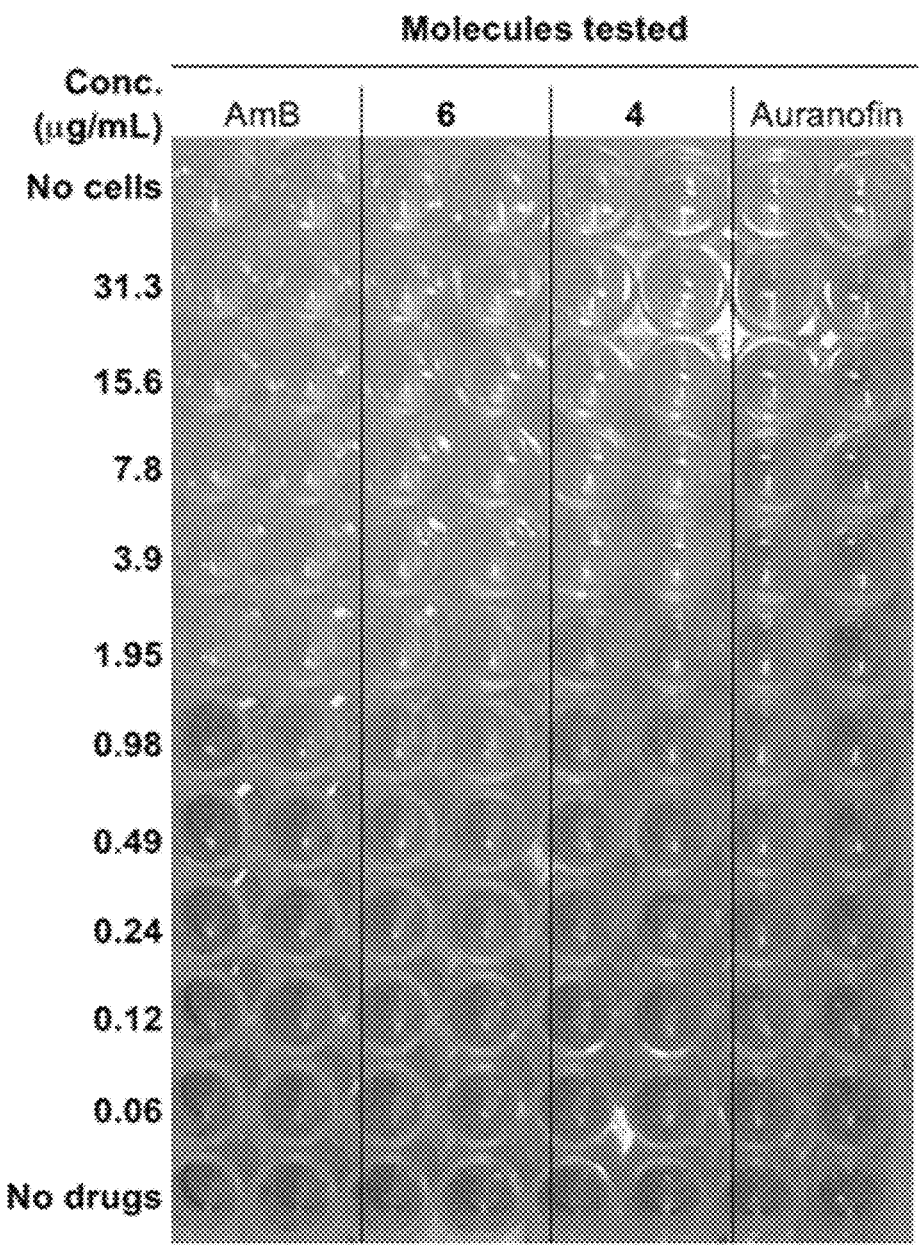
FIG. 7D shows Prevention of biofilm formation of C. auris AR Bank #0390 (strain L), treated at 0 h with auranofin, 6, 4, and AmB. XTT dye is metabolized by fungal cells to produce an orange color. The corresponding data are presented in Table 3.
Figure 8A:
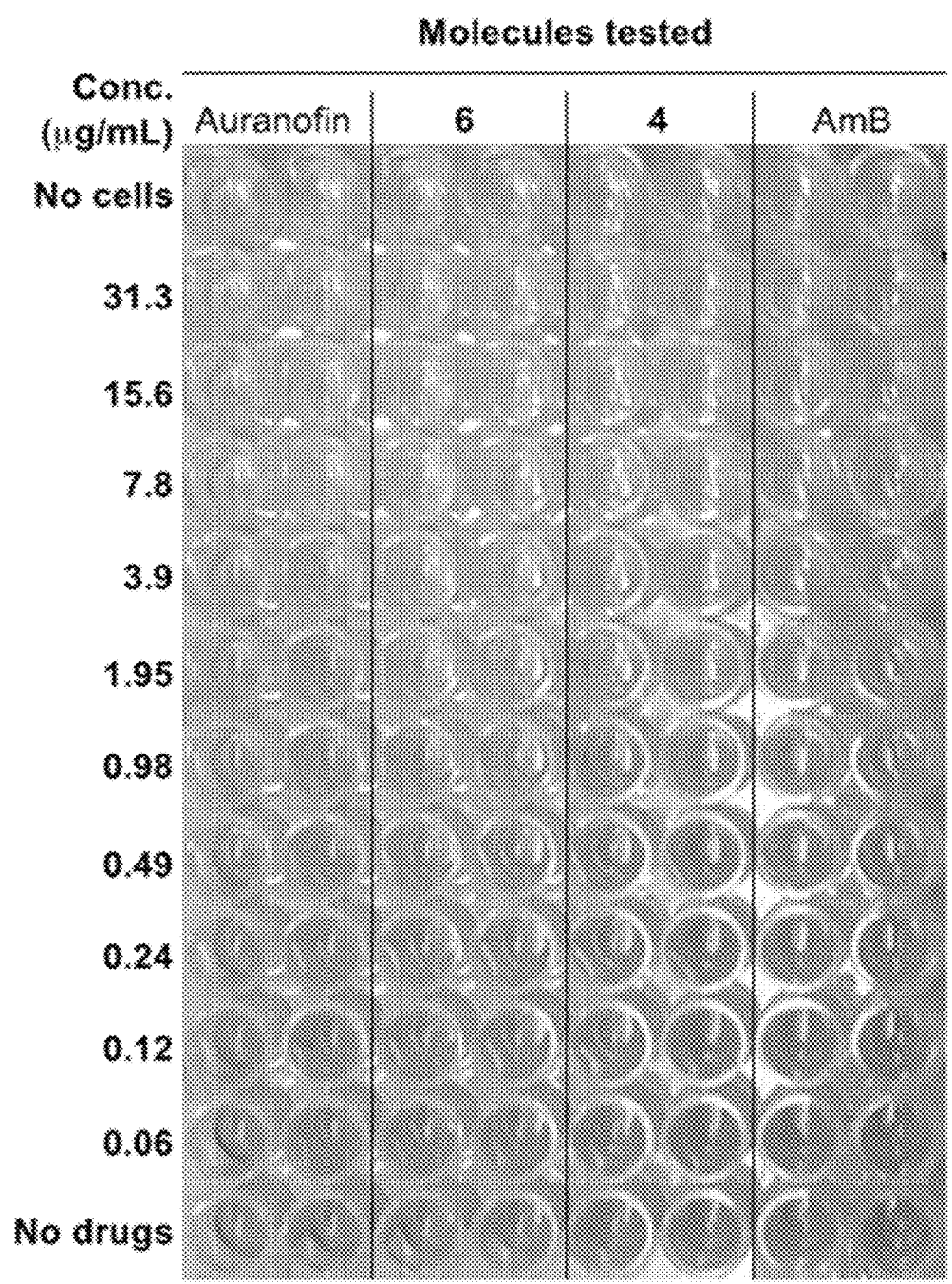
FIG. 8A shows Disruption of pre-formed biofilms of A. C. albicans ATCC 10231 (strain B), B. C. glabrata ATCC 2001 (strain H), C. C. auris AR Bank #0384 (strain K), and D. C. auris AR Bank #0390 (strain L) treated at 24 h with auranofin, 6, 4, and AmB. XTT dye is metabolized by fungal cells to produce an orange color. The corresponding data are presented in Table 3.
Figure 8B:
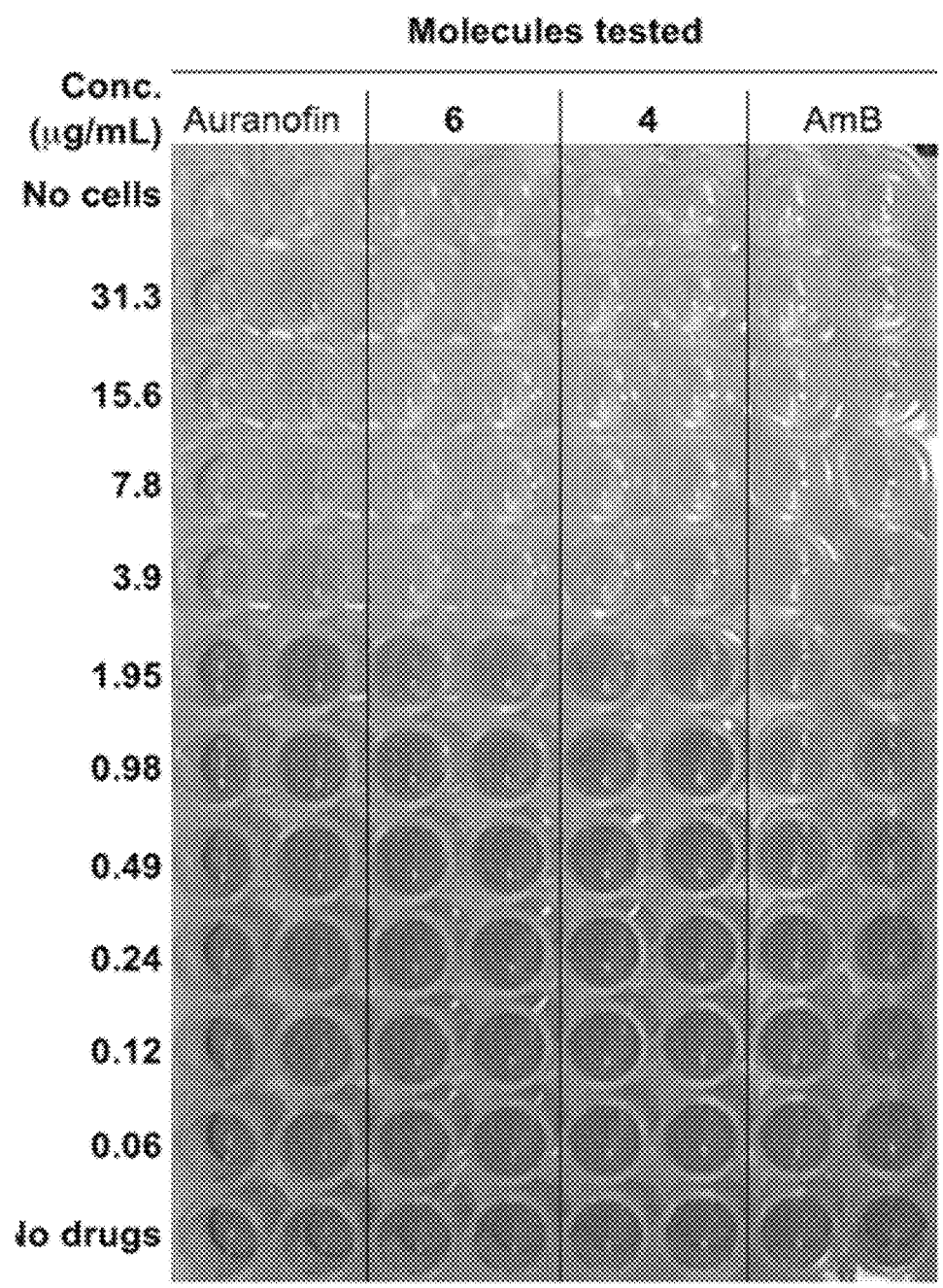
FIG. 8B shows Disruption of pre-formed biofilms of A. C. albicans ATCC 10231 (strain B), B. C. glabrata ATCC 2001 (strain H), C. C. auris AR Bank #0384 (strain K), and D. C. auris AR Bank #0390 (strain L) treated at 24 h with auranofin, 6, 4, and AmB. XTT dye is metabolized by fungal cells to produce an orange color. The corresponding data are presented in Table 3.
Figure 8C:
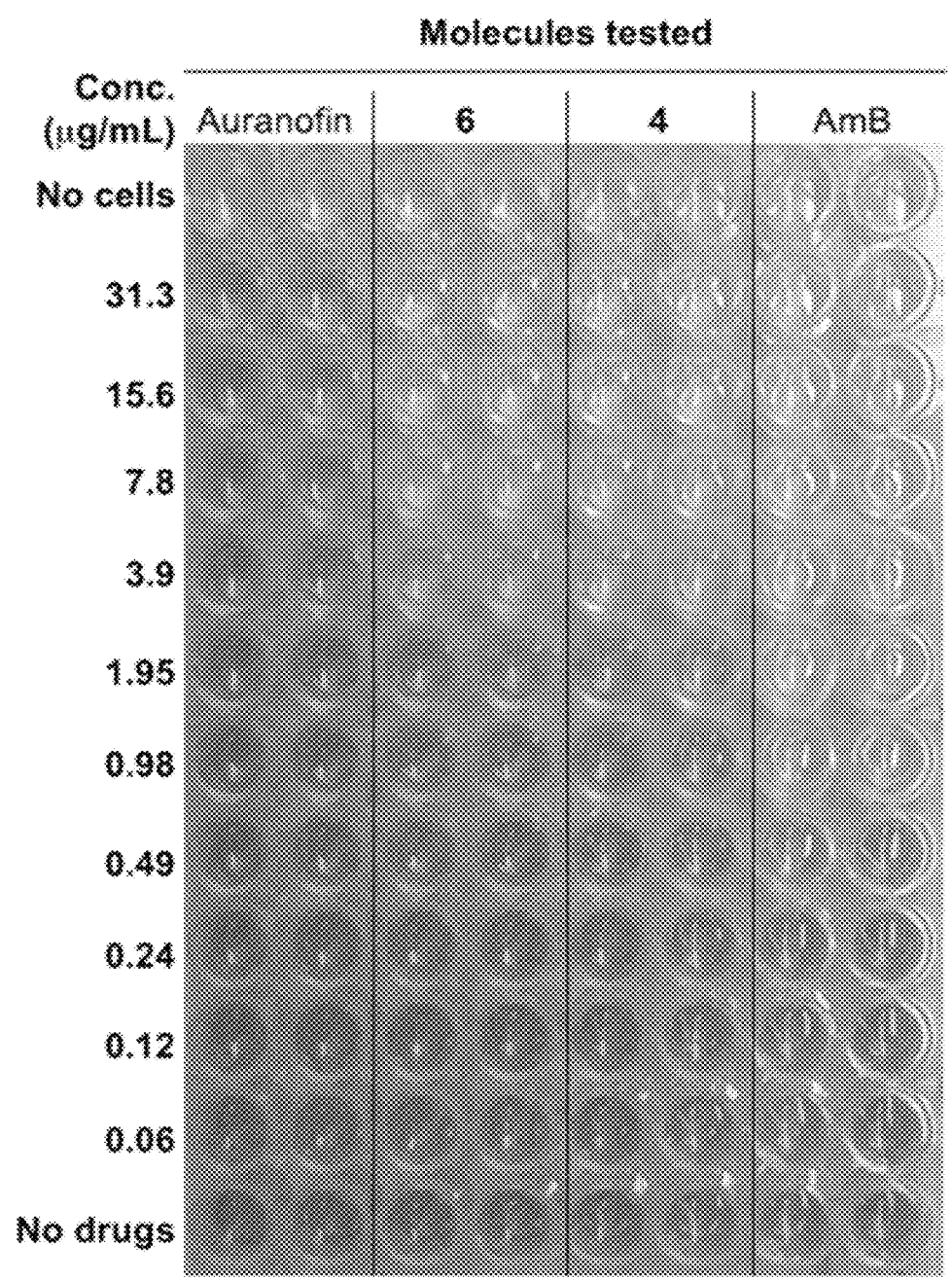
FIG. 8C shows Disruption of pre-formed biofilms of C. auris AR Bank #0384 (strain K) treated at 24 h with auranofin, 6, 4, and AmB. XTT dye is metabolized by fungal cells to produce an orange color. The corresponding data are presented in Table 3.
Figure 8D:
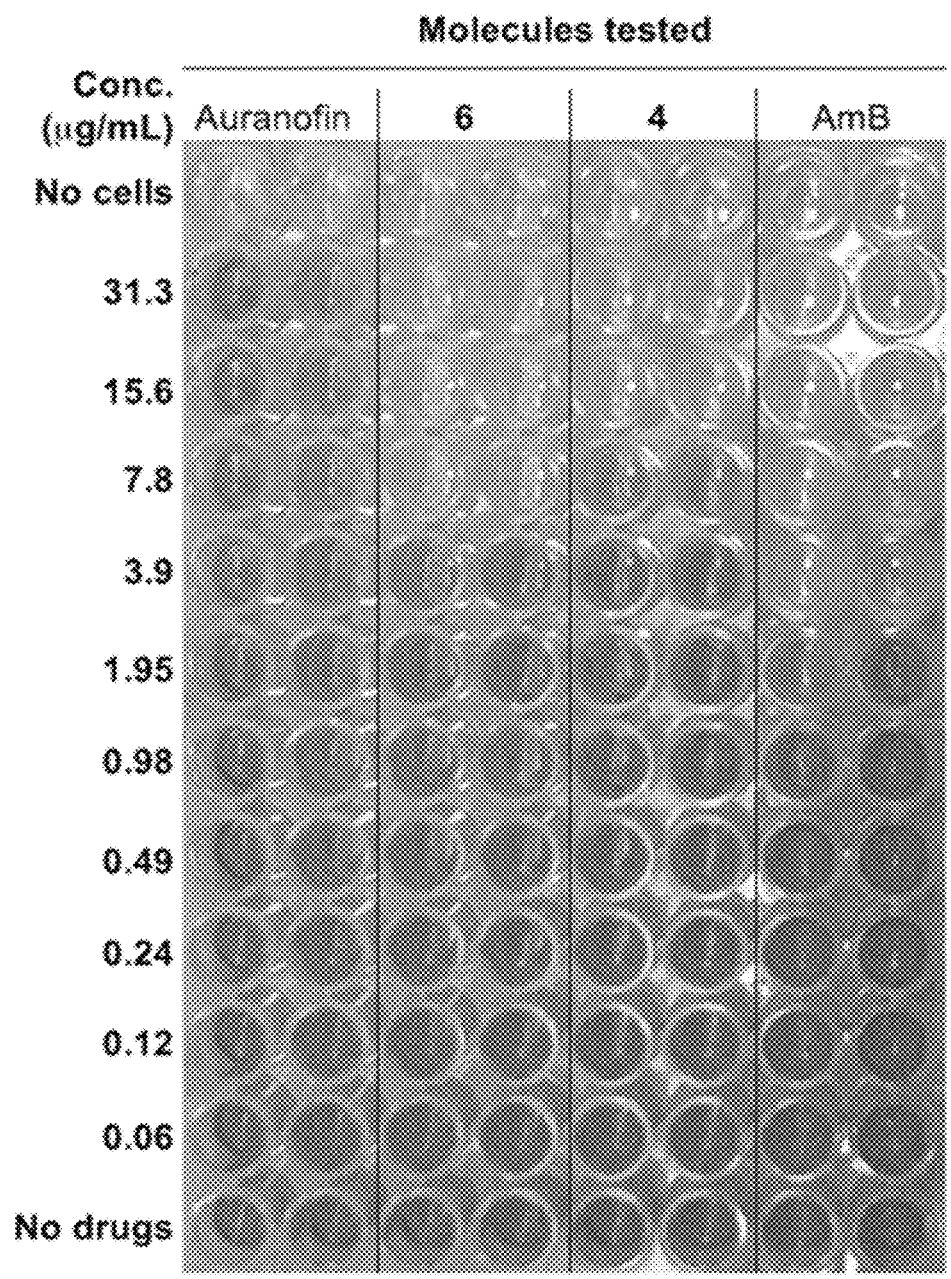
FIG. 8D shows Disruption of pre-formed biofilms of C. auris AR Bank #0390 (strain L) treated at 24 h with auranofin, 6, 4, and AmB. XTT dye is metabolized by fungal cells to produce an orange color. The corresponding data are presented in Table 3.
Figure 9A:
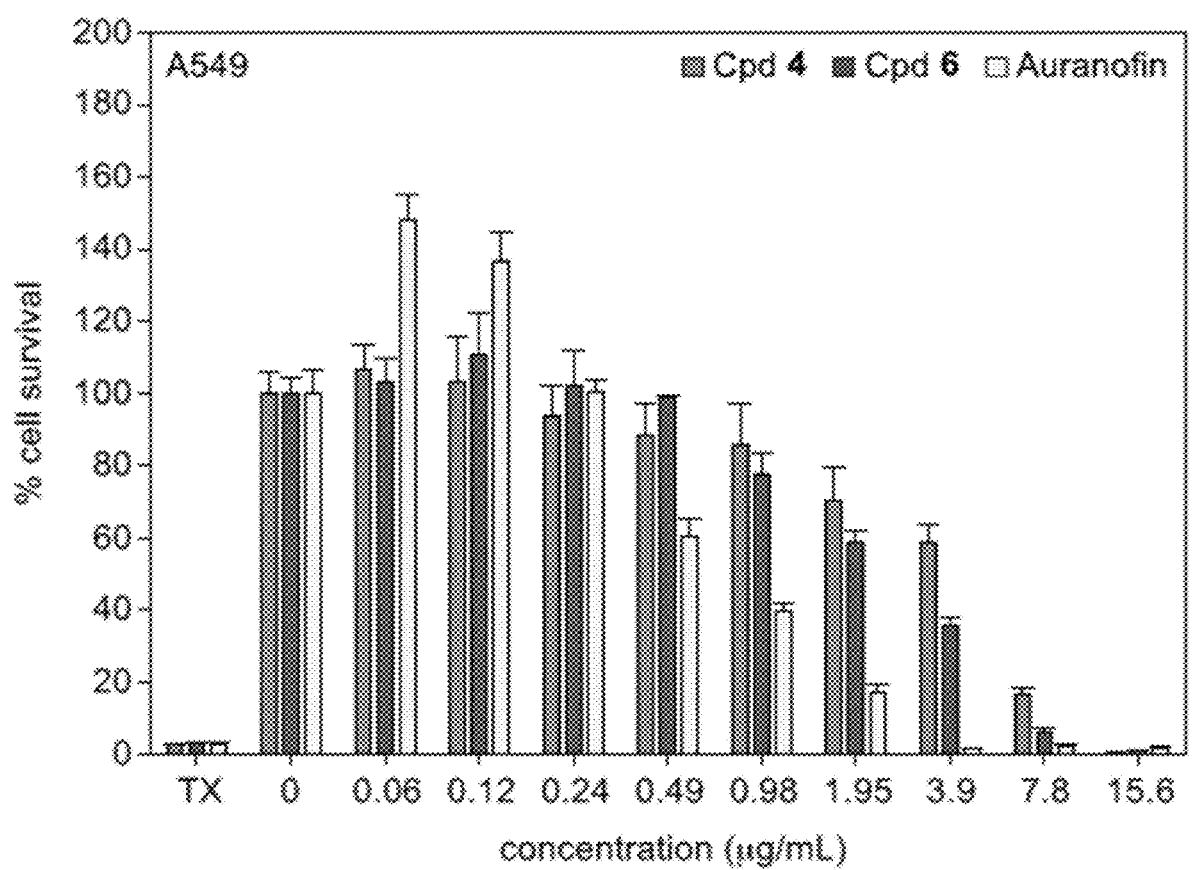
FIG. 9A shows Evaluation of cytotoxicity for compound 4 (light grey), compound 6 (dark grey), and auranofin (white) with A549 cell line, Controls include treatment with Triton-X® (TX, 1% v/v, positive control) and 0.5% DMSO (negative control).
Figure 9B:
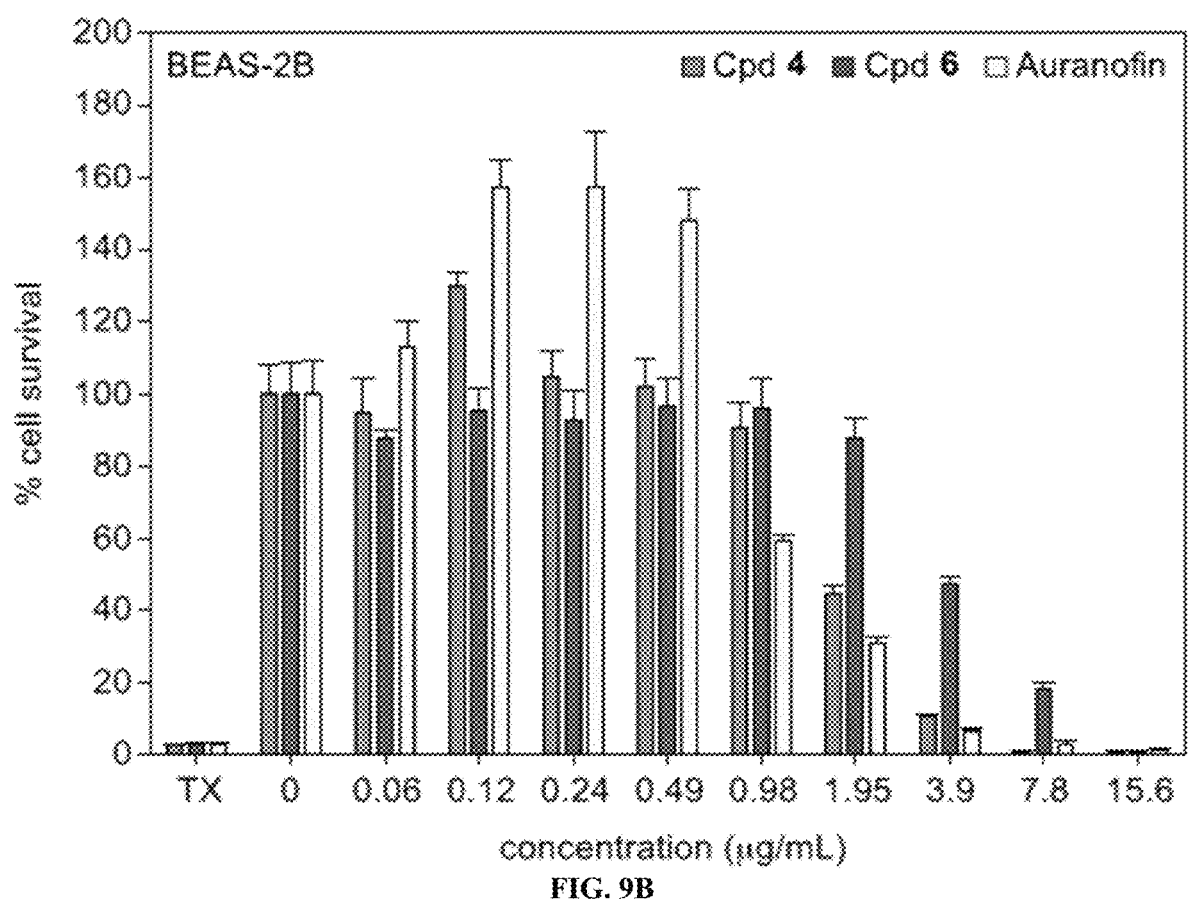
FIG. 9B shows Evaluation of cytotoxicity for compound 4 (light grey), compound 6 (dark grey), and auranofin (white) with BEAS-2B, cell line. Controls include treatment with Triton-X® (TX, 1% v/v, positive control) and 0.5% DMSO (negative control).
Figure 9C:
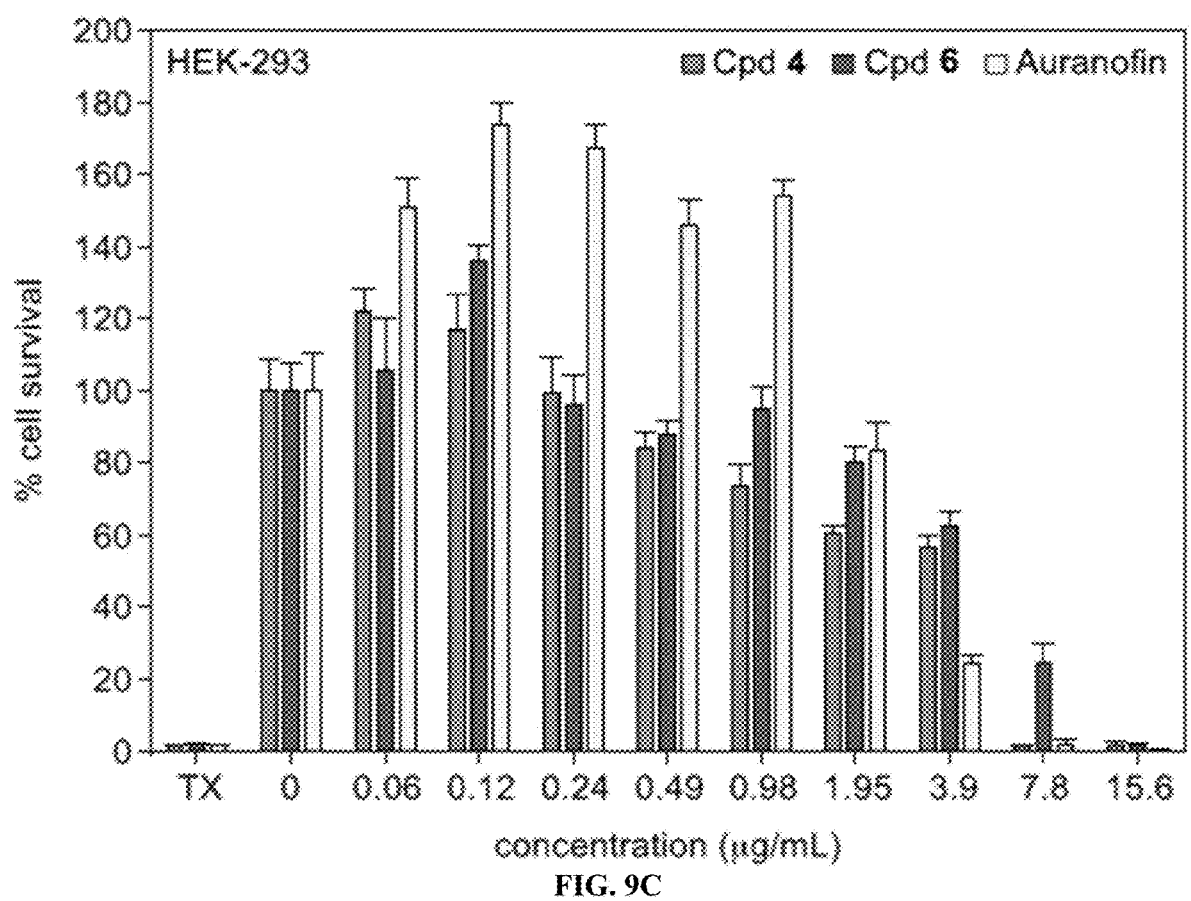
FIG. 9C shows Evaluation of cytotoxicity for compound 4 (light grey), compound 6 (dark grey), and auranofin (white) with HEK-293 cell line. Controls include treatment with Triton-X® (TX, 1% v/v, positive control) and 0.5% DMSO (negative control).
Figure 9D:
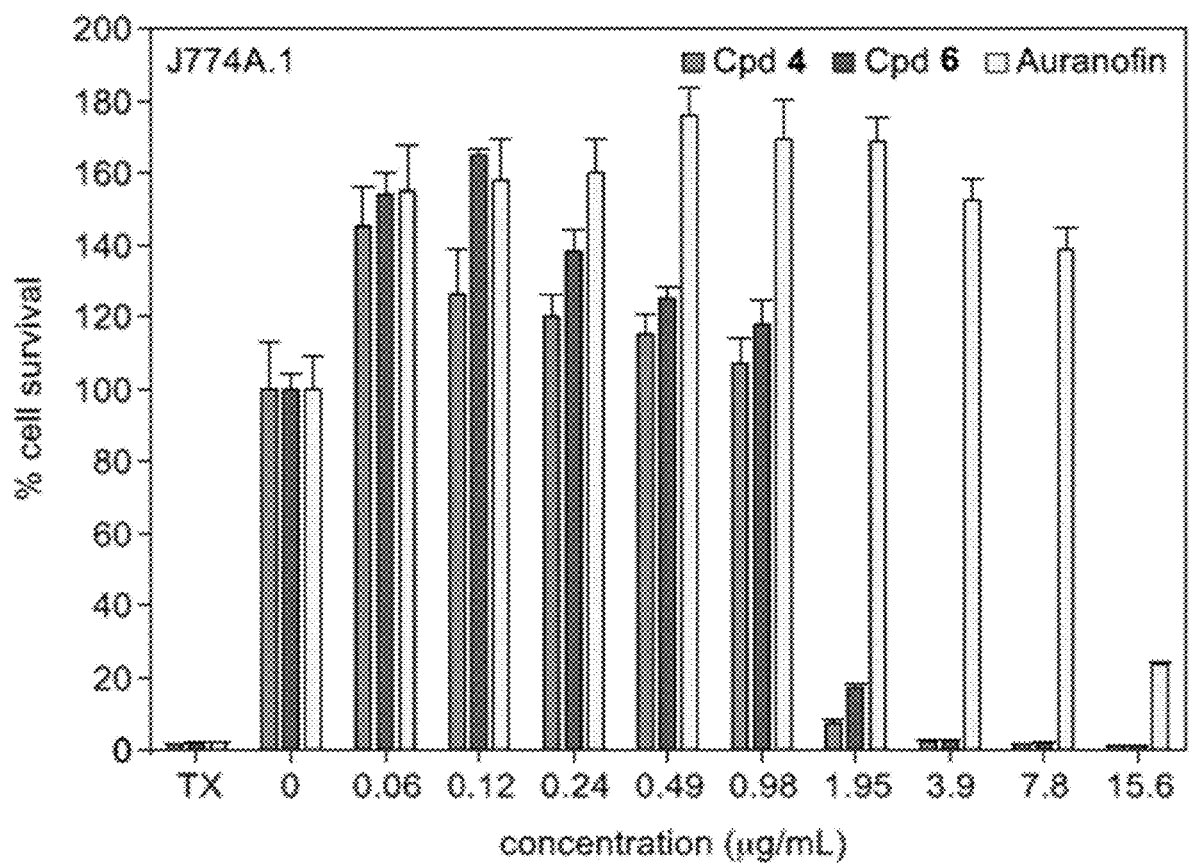
FIG. 9D shows Evaluation of cytotoxicity for compound 4 (light grey), compound 6 (dark grey), and auranofin (white) with J774A.1 cell lines. Controls include treatment with Triton-X® (TX, 1% v/v, positive control) and 0.5% DMSO (negative control).

Whole cell uptake assay for compounds 4 and 6. To gain some insight into whether compounds 4 and 6 have an intracellular or extracellular target, the uptake of gold into the cell was measured using Inductively Coupled Plasma Optical Emission Spectroscopy (ICP-OES, FIG. 6). Uptake was measured with 100 million yeast cells (Note: this is 2-3× more cells than in MIC and time-kill studies) after 30 minutes treatment with 10 µM (~5×MIC for compounds 4 and 6 against strain B and H, respectively; ~10×MIC for compounds 4 and 6 against strain H and B, respectively) compound. These conditions were chosen to have a significant number of cells for analysis, a saturating amount of compound (note that 10 µM was required to achieve saturation), and at a time-point within the doubling time of the yeast. Both compounds exhibited very similar uptake by *C. albicans* (strain B) and *C. glabrata* (strain B) of ~17 µmol/million cells. However, the uptake when 5×MIC was used was higher than when 10×MIC was used. With the values for gold uptake in the pmol/million cells range, there appears to be a relatively low amount of gold uptake per cell, but there are no reports of similar uptake studies in yeast to compare to. However, we do observe uptake and these values correspond to approximately 15% and 20% of total gold content for compounds 4 and 6, respectively. It is possible that by the 30-minute end point there is some lysis of the fungal cells, especially with 10×MIC, which would decrease uptake values. These results do suggest that the compounds enter the yeast cell by facilitated diffusion or active transport as with passive diffusion higher dosing of compound (e.g., saturating amount) corresponds to greater cell uptake. We previously published gold(III) complexes that we investigated as anticancer agents, where we measured gold uptake in OVCAR8 cells.[42] We found that gold(III) complexes that included a single chloride anion had improved uptake over similar complexes with perchlorate anions, with relative uptake of ~300-400 and ~200 µmol/million cells, respectively. These values were significantly lower than the 1300 µmol/million cells uptake of auranofin in the OVCAR8 cell. The uptake values for compounds 4 and 6 in fungi appear significantly lower than the values measured for other complexes with the mammalian cells, but are similar when the difference in cell volume and incubation time between yeast and mammalian cells is considered.[68,69] Therefore, it is still unclear, but within reason for the gold complexes to have an intracellular target.

Conceivably, the structurally complex cell wall of fungus composed of chitin, glucans, and glycoproteins may contribute to the limited uptake of the cationic gold complexes investigated. Further studies will focus on developing neutral complexes and complexes that benefit from active transport.

Figure 10A:
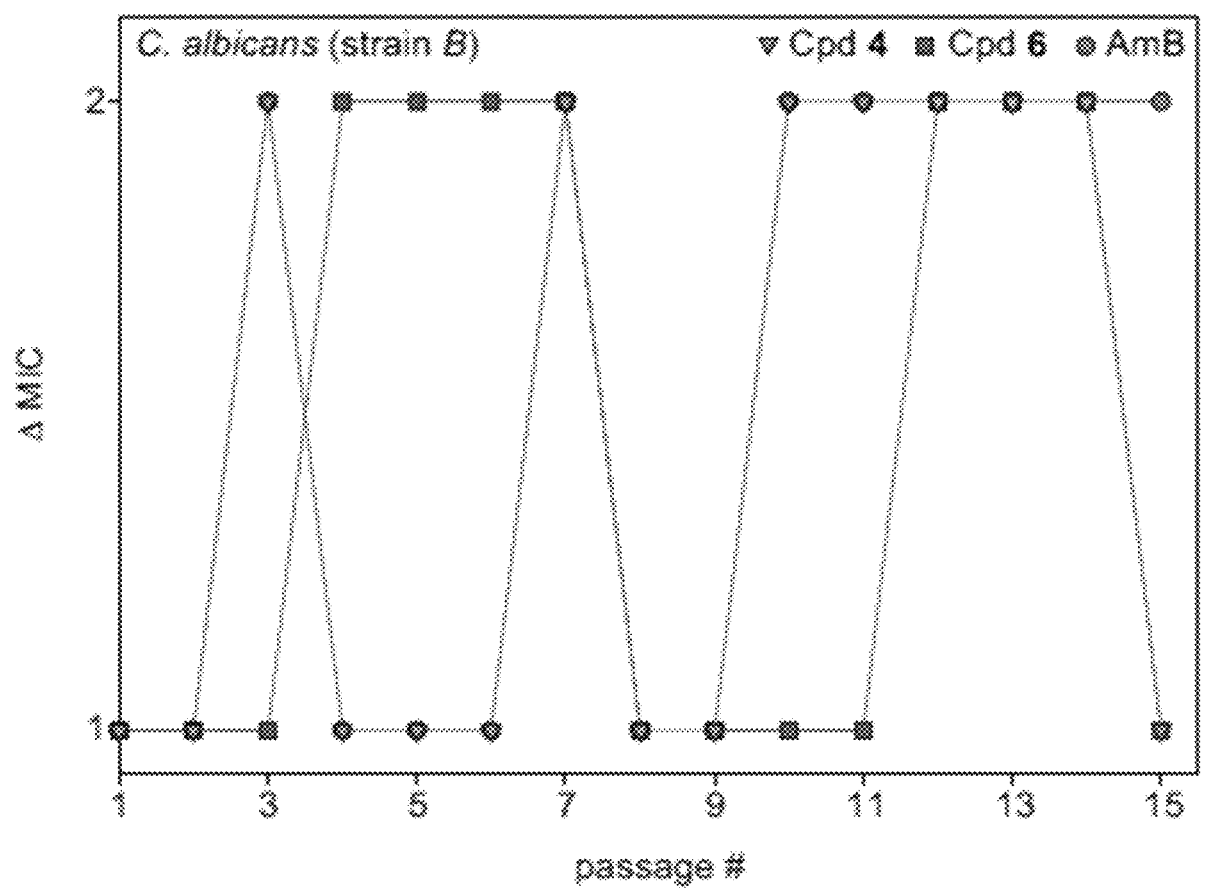
FIG. 10A shows Changes in MIC values of C. albicans ATCC 10231 (strain B), treated with compound 4 (triangle), compound 6 (square), and AmB (circle) over 15 serial passages.
Figure 10B:
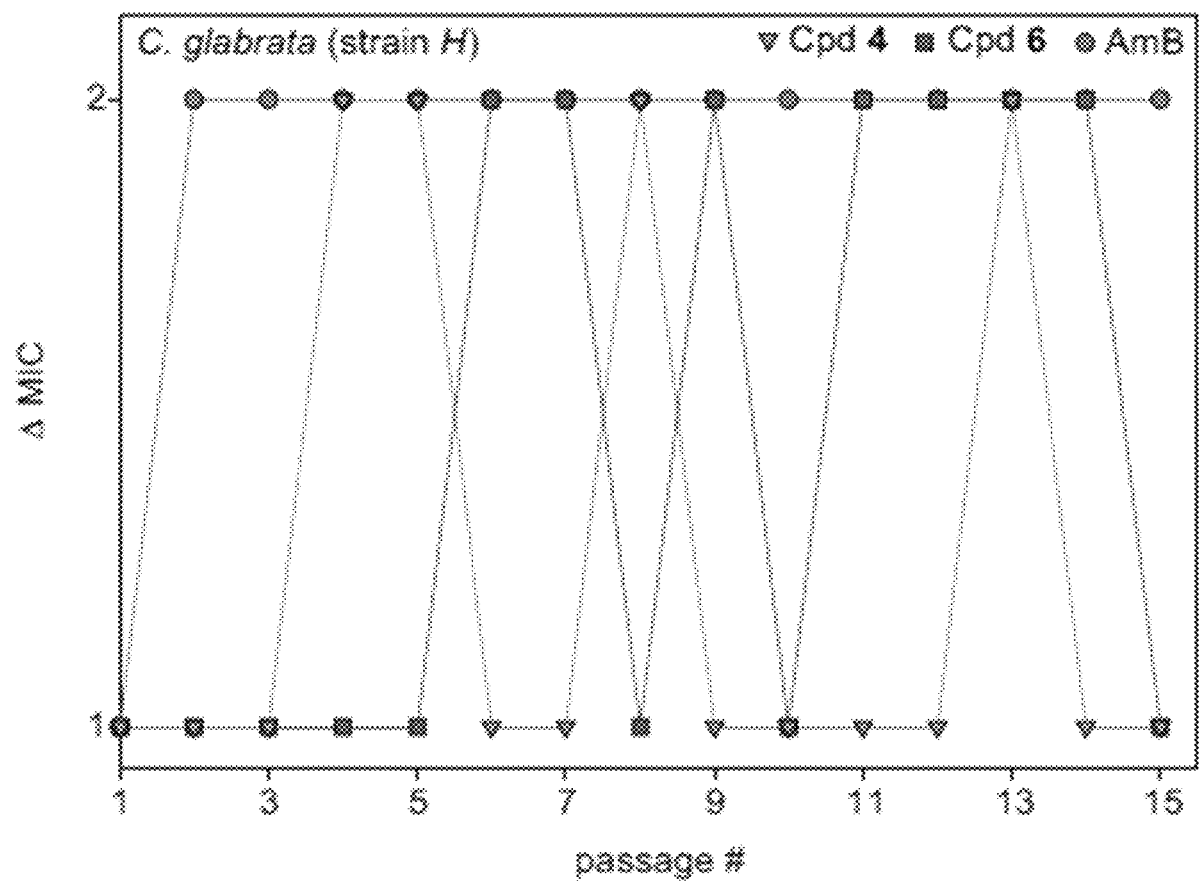
FIG. 10B shows Changes in MIC values of C. glabrata ATCC 2001 (strain H) treated with compound 4 (triangle), compound 6 (square), and AmB (circle) over 15 serial passages.

Development of fungal resistance for compounds 4 and 6. Fungal drug resistance can be caused by mutation of the target protein (observed with azoles and echinocandins),[70,71] overexpression of the target protein (observed with azoles),[72,73] the use of efflux pumps (observed with azoles),[74-78] or increased filamentation to decrease drug uptake (observed with AmB).[79,80] In order to assess the potential for the development of fungal resistance, we determined MIC values of compounds 4 and 6 as well as AmB as a control over fifteen serial passages with *C. albicans* (strain B) and *C. glabrata* (strain H) (FIG. 10A-B). There were no significant changes in MIC values for the compounds in the present invention. The gold complexes are likely to display different mechanisms of action in fungi that can circumvent resistance pathways.

CONCLUSIONS

In summary, linear gold(I) phosphine complexes were synthesized and three corresponding square-planar gold(I) complexes and explored their antifungal activity. Two square-planar complexes, 4 and 6, displayed excellent antifungal activity against a panel of twenty-one *Candida* strains which included *C. albicans, C. glabrata, C. krusei, C. parapsilosis,* and *C. auris* as well as four *C. neoformans*. Furthermore, these square-planar complexes displayed good activity against four filamentous strains of *Aspergillus* spp., and *Fusarium* spp. In addition, compounds 4 and 6 displayed good activity against *Candida* spp. biofilms. When tested against mammalian cells, the gold complexes displayed limited improvement in selectivity index over the FDA-approved drugs AmB and auranofin. Finally, by development of resistance studies of compounds 4 and 6 in *Candida* spp., it was found that *Candida* spp. have a low chance of developing resistance to these gold complexes. Future studies will work to decrease the toxic effect to mammalian cells and to substantiate the mechanism of action of the gold complexes in fungi.

Compounds

Chemistry

Materials and instrumentation. Tetrahydrothiophene (THT) was from Sigma-Aldrich and used without further purification or drying. Tetrachloroauric acid (HAuCl$_4$·3H$_2$O) was purchased from Oakwood and used as received. THT and HAuCl$_4$·3H$_2$O were used to prepare AuCl(THT) as previously reported.[44] All phosphorus ligands used: 1,2-bi s(diphenylphosphino)benzene, 1,2-bis [(2S,5S)-2,5-dimethylphospholano]benzene, and 1,2-bis [(2R,5R)-2,5-dimethylphospholano]benzene were purchased from Sigma-Aldrich and used as received. ACS grade solvents were purchased from Pharmco-Aaper and used without further purification or drying. Deuterated solvents were purchased from Cambridge Isotope Laboratories and used as received. Silica gel for column chromatography (Silicycle, P/N: R10030B SiliaFlash® F60, Size: 40-63 μm, Canada) was purchased from Silicycle. Aluminum backed silica-gel plates (20 ×20 cm$^2$) were purchased from Silicycle (TLA-R10011B-323) and utilized for analytical thin-layer chromatography (TLC).

All reactions were insensitive to air or moisture, as a result, they were carried out under standard atmospheric conditions without air-sensitive techniques or drying agents. Reactions were carried out in round-bottom flasks or scintillation vials equipped with Teflon-coated magnetic stir bars for stirring non-homogenous reaction mixtures. Reactions were monitored by NMR and TLC, and the TLC plates visualized under short-wavelength light (254 nm) or stained with iodine on Silica. All compound purification was performed using silica-gel chromatography, employing CombiFlash® Rf+ Lumen, Teledyne ISCO. Filtrations were carried out using medium-porosity ceramic funnels. Removal of solvents in vacuo was performed using a Büchi rotary evaporator and further drying was achieved by Schlenk line at ~120 mTorr using a dynamic vacuum pump.

$^1$H, $^{13}$C ($^1$H-decoupled), and $^{31}$P ($^1$H-decoupled) NMR spectra were recorded on a Varian Unity 400 MHz NMR spectrometer with a Spectro Spin superconducting magnet at the University of Kentucky NMR facility in the Department of Chemistry. Chemical shifts in $^1$H and $^{13}$C NMR spectra were internally referenced to solvent signals ($^1$H NMR: CDCl$_3$ at δ=7.26 ppm; $^{13}$C NMR: CDCl$_3$ at δ=77.16 ppm), and those in $^{31}$P NMR spectra, which were run in CDCl$_3$, were externally referenced to 85% H$_3$PO$_4$ in D$_2$O at δ=0 ppm.

High-resolution mass spectra (FIRMS) were obtained using a direct flow injection (injection volume=1 μL) method with ElectroSpray Ionization (ESI) on a Waters Q-TOF Premier instrument in the positive mode. The optimized conditions were as follows: capillary=3000 kV, cone=35, source temperature=120° C., and desolvation temperature=350° C. Mass spectrometry experiments and analysis were conducted at the Chemical Instrumentation Center at Boston University.

In addition to spectroscopic characterization, the purity of all compounds was assessed by RP-HPLC using an Agilent Technologies 1100 series HPLC instrument and an Agilent Phase Eclipse Plus C18 column (4.6 mm×100 mm; 3.5 μm particle size). All compounds were found to be ≥97% pure.

Synthesis and Characterization of Compounds 1-6

Synthesis of the known compounds [1,2-bis(diphenylphosphino)benzene]digold(I) (1)[45] and bis-[1,2-bis(diphenylphosphino)benzene]gold(1) (2)[46]

Under normal atmospheric conditions, in a 25 mL round bottom flask was placed AuCl(THT) (58.7 mg, 0.183 mmol). CHCl$_3$ (10.0 mL) was added and the solution (white suspension) was stirred at room temperature for 2-3 min. To the solution was added 1,2-bis(diphenylphosphino)benzene (80.2 mg, 0.180 mmol). The solution turned yellow instantly. The solution was stirred for about 1 h and monitored by TLC using 5:95/MeOH:CH$_2$Cl$_2$ as an eluent. Separation of compounds 1 and 2 was achieved via flash chromatography using CombiFlash® Rf+ Lumen with 5:95/ MeOH:CH$_2$Cl$_2$.

Characterization of compound 1: White solid (37 mg, 23%); R$_f$ 0.8 in 5:95/MeOH:CH$_2$Cl$_2$; $^1$H NMR (400 MHz, CDCl$_3$) δ 7.56-7.46 (m, 6H), 7.46-7.35 (m, 16H), 7.25-7.16 (m, 2H); $^{13}$C NMR (101 MHz, CDCl$_3$) δ 137.12, 137.05, 136.97, 134.81, 134.74, 134.67, 132.35, 131.90, 131.87, 131.84, 129.60, 129.54, 129.48, 128.91, 128.60, 128.28; $^{31}$P NMR (162 MHz, CDCl$_3$) δ 24.60; HRMS (ESI) (m/z): calcd. for C$_{30}$H$_{24}$Au$_2$Cl$_2$P$_2$ [M−Cl]$^+$: 875.0373, found: 875.0408 Δ=3.9998. Purity was demonstrated to be 97% by RP-HPLC: R$_f$=8.82 min using the following method: Flow rate: 1 mL/min; λ=260 nm; Eluent A=H$_2$O with 0.1% TFA; Eluent B=MeCN with 0.05% formic acid; Elution program:

0 to 100% B over 10 min followed by 100 to 0% B over 5 min and 4 additional min at 0% B.

Characterization of compound 2: Yellow solid (68 mg, 36%); $R_f$ 0.2 in 5:95/MeOH:CH$_2$Cl$_2$; $^1$H NMR (400 MHz, CDCl$_3$) δ 7.57-7.25 (m, 20H), 7.13-6.87 (m, 28H); $^{13}$C NMR (101 MHz, CDCl$_3$) δ 142.13, 134.52, 134.37, 132.56, 132.44, 132.37, 132.33, 132.29, 132.25, 132.21, 132.18, 131.72, 130.40, 129.13, 129.11, 129.08, 129.06, 129.03, 129.01, 128.89, 128.86, 128.74, $^{31}$P NMR (162 MHz, CDCl$_3$) δ 21.17; HRMS (ESI) (m/z): calcd. for C$_{60}$H$_{48}$AuClP$_4$ [M-Cl]$^+$: 1089.2372, found: 1089.2357 Δ=1.3771. Purity was demonstrated to be 100% by RP-HPLC: $R_t$=10.78 min using the following method: Flow rate: 1 mL/min; λ=260 nm; Eluent A=H$_2$O with 0.1% TFA; Eluent B=MeOH with 0.1% TFA; Elution program: 0 to 100% B over 5 min, stay at 100% B for 10 min, followed by 100 to 0% B over 4 min.

Synthesis of [1,2-bis[(2S,5S)-2,5-dimethylphospholano]benzene]digold(1) (3) and bis-[1,2-bis[(2S,5S)-2,5-dimethylphospholano]benzene]gold(I) (4)

Compounds 3 and 4 were synthesized and separated following the procedure described for the preparation of compounds 1 and 2 using AuCl(THT) (64.6 mg, 0.202 mmol) and 1,2-bis[(2S,5S)-2,5-dimethyl-1-phospholano]benzene (58.6 mg, 0.191 mmol).

Characterization of compound 3: White solid (47 mg, 32%); $R_f$ 0.8 in 5:95/MeOH:CH$_2$Cl$_2$; $^1$H NMR (400 MHz, CDCl$_3$) δ 7.73-7.64 (m, 4H), 3.60 (sextet, J=7.6 Hz, 2H), 2.99-2.85 (m, 2H), 2.53-2.38 (m, 2H), 2.30-2.13 (m, 2H), 1.92-1.77 (m, 2H), 1.57-1.44 (m, 2H), 1.37 (dd, J=20.6, 6.7 Hz, 6H), 1.06 (dd, J=17.2, 7.2 Hz, 6H); $^{13}$C NMR (101 MHz, CDCl$_3$) δ 134.45, 134.39, 134.33, 132.19, 131.61, 131.58, 131.56, 37.20, 37.03, 37.01, 36.97, 36.84, 36.79, 36.61, 35.56, 35.54, 33.99, 33.92, 33.85, 19.59, 19.56, 19.52, 19.47, 19.42; $^{31}$P NMR (162 MHz, CDCl$_3$) δ 43.96; HRMS (ESI) (m/z): calcd. for C$_{18}$H$_{28}$Au2Cl$_2$P$_2$ [M-Cl]$^+$: 735.0686, found: 735.0671 Δ=2.0406. Purity was demonstrated to be 97% by RP-HPLC: $R_t$=7.94 min using the following method: Flow rate: 1 mL/min; =260 nm; Eluent A=H$_2$O with 0.1% TFA; Eluent B=MeCN with 0.05% formic acid; Elution program: 0 to 100% B over 10 min followed by 100 to 0% B over 5 min and 4 additional min at 0% B.

Characterization of compound 4: Yellow solid (44 mg, 27%); $R_f$ 0.4 in 5:95/MeOH:CH$_2$Cl$_2$; $^1$H NMR (400 MHz, CDCl$_3$) δ 7.75-7.67 (m, 4H), 7.60-7.54 (m, 4H), 2.71-2.46 (m, 8H), 2.35-2.13 (m, 8H), 1.87-1.72 (m, 4H), 1.62-1.49 (m, 4H), 1.19 (td, J=10.6, 6.9 Hz, 12H), 0.81-0.71 (m, 12H); $^{13}$C NMR (101 MHz, CDCl$_3$) δ 142.52, 142.36, 142.20, 133.34, 133.31, 133.29, 130.67, 40.56, 40.48, 40.40, 37.71, 37.65, 37.59, 36.06, 35.84, 21.47, 21.41, 21.36, 14.49; $_{31}$P NMR (162 MHz, CDCl$_3$) δ 38.34; HRMS (ESI) (m/z): calcd. for C$_{36}$H$_{56}$AuClP$_4$ [M-Cl]$^+$: 809.2998, found: 809.3016 Δ=2.2241. Purity was demonstrated to be 98% by RP-HPLC: $R_t$=10.81 min using the following method: Flow rate: 1 mL/min; λ=260 nm; Eluent A=H$_2$O with 0.1% TFA; Eluent B=MeCN with 0.05% formic acid; Elution program: 0 to 100% B over 10 min followed by 100 to 0% B over 5 min and 4 additional min at 0% B.

Synthesis of the known compounds[1,2-bis[(2R,5R)-2,5-dimethylphospholano] benzene]digold(1) (5)[81] and of bis-[1,2-bis[(2R,5R)-2,5-dimethylfphospholano]benzene]gold(1) (6)

Compounds 5 and 6 were synthesized and separated following the procedure described for the preparation of compounds 1 and 2 using AuCl(THT) (61.9 mg, 0.193 mmol) and 1,2-bis[(2R,5R)-2,5-dimethylphospholano]benzene (60.1 mg, 0.196 mmol).

Characterization of compound 5: White powder (35 mg, 35%); $R_f$ 0.8 in 5:95/MeOH:CH$_2$Cl$_2$; $^1$H NMR (400 MHz, CDCl$_3$) δ 7.73-7.64 (m, 4H), 3.61 (sextet, J=7.7 Hz, 2H), 2.99-2.86 (m, 2H), 2.54-2.38 (m, 2H), 2.30-2.12 (m, 2H), 1.92-1.76 (m, 2H), 1.56-1.44 (m, 2H), 1.37 (dd, J=20.6, 6.8 Hz, 6H), 1.06 (dd, J=17.2, 7.2 Hz, 6H); $^{13}$C NMR (101 MHz, CDCl$_3$) δ 134.62, 134.56, 134.49, 131.75, 131.72, 131.70, 37.37, 37.20, 37.19, 37.16, 37.02, 36.99, 36.81, 35.73, 35.71, 35.69, 34.17, 34.10, 34.03, 19.73, 19.71, 19.68, 19.63, 19.57; $^{31}$P NMR (162 MHz, CDCl$_3$) δ 43.96; HRMS (ESI) (m/z): calcd. for C$_{18}$H$_{28}$Au$_2$Cl$_2$P$_2$ [M−Cl]$^+$: 735.0686, found: 735.0697 Δ=1.4965. Purity was demonstrated to be 97% by RP-HPLC: $R_t$=7.86 min using the following method: Flow rate: 1 mL/min; =260 nm; Eluent A=H$_2$O with 0.1% TFA; Eluent B=MeCN with 0.05% formic acid; Elution program: 0 to 100% B over 10 min followed by 100 to 0% B over 5 min and 4 additional min at 0% B.

Characterization of compound 6: Yellow powder (71 mg, 37%); $R_f$ 0.2 in 5:95/MeOH:CH$_2$Cl$_2$; $^1$H NMR (400 MHz, CDCl$_3$) δ 7.74-7.66 (m, 4H), 7.60-7.53 (m, 4H), 2.71-2.44 (m, 8H), 2.35-2.13 (m, 8H), 1.86-1.72 (m, 4H), 1.61-1.48 (m, 4H), 1.18 (td, J=10.5, 6.8 Hz, 12H), 0.80-0.71 (m, 12H); $^{13}$C NMR (101 MHz, CDCl$_3$) δ 142.34, 133.32, 133.29, 133.27, 130.66, 40.54, 40.46, 40.39, 37.69, 37.63, 37.56, 36.04, 35.82, 21.45, 21.39, 21.34, 14.47; $^{31}$P NMR (162 MHz, CDCl$_3$) δ 38.24; HRMS (ESI) (m/z): calcd. for C$_{36}$H$_{56}$AuClP$_4$ [M−Cl]$^+$: 809.2998, found: 809.3025 Δ=3.3362. Purity was demonstrated to be 97% by RP-HPLC: $R_t$=10.81 min using the following method: Flow rate: 1 mL/min; λ=260 nm; Eluent A=H$_2$O with 0.1% TFA; Eluent B=MeCN with 0.05% formic acid; Elution program: 0 to 100% B over 10 min followed by 100 to 0% B over 5 min and 4 additional min at 0% B.

X-ray crystallography of compounds 3-6. The single crystal of compound 3 was grown at 4° C. by vapor diffusion of Et$_2$O into a CH$_2$Cl$_2$ solution and compounds 4, 5, and 6 were grown at room temperature by vapor diffusion of Et$_2$O into CDCl$_3$ solutions. Suitable crystals were selected by microscopic examination through crossed polarizers, mounted on a fine glass fibre in polyisobutene oil, and cooled to 90 K under a stream of nitrogen. A Bruker D8 Venture diffractometer with graded-multilayer focused MoKα X-rays (λ=0.710731 Å) was used to collect the diffraction data from the crystals. The raw data were integrated, scaled, merged and corrected for Lorentz-polarization effects using the APEX3 package.[82,83] Space group determination and structure solution and refinement were carried out with SHELXT, and SHELXL,[84,85] respectively. All non-hydrogen atoms were refined with anisotropic displacement parameters. Hydrogen atoms were placed at calculated positions and refined using a riding model with their isotropic displacement parameters (Uiso) set to either 1.2Uiso or 1.5Uiso of the atom to which they were attached. The structures, deposited in the Cambridge Structural Database (deposition number=1889869 (3), 1889576 (4), 1889577 (5), and 1916580 (6)), were checked for missed higher symmetry, twinning, and overall quality with PLATON,[86] an R-tensor,[87] and finally validated using CheckCIF.[86] The X-ray structures of compounds 3-6 are presented in FIGS. 2A-D and the corresponding structure refinement data in Table 5.

TABLE 5

Crystal Data and Structure Refinement for compounds 3-6

| | Compound 3 | Compound 4 |
|---|---|---|
| Empirical formula | $C_{18}H_{28}Au_2Cl_2P_2$ | $C_{37}H_{27}AuCl_4P_4$[a] |
| Molecular weight | 771.18 | 964.47 |
| Temperature | 90.0(2) K | 220(2) K |
| Wavelength | 0.71073 Å | 0.71073 Å |
| Crystal system, space group | Orthorhombic, $P2_12_12_1$ | Orthorhombic, $P2_12_12_1$ |
| Unit cell dimensions | a = 16.3388(9) Å, α = 90° | a = 12.6939(5) Å, α = 90° |
| | b = 16.3413(9) Å, β = 90° | b = 16.5334(8) Å, β = 90° |
| | c = 16.4154(8) Å, γ = 90° | c = 20.1529(8) Å, γ = 90° |
| Volume | 4382.9(4) Å$^3$ | 4229.6(3) Å$^3$ |
| Z, Calculated density | 8, 2.337 Mg/m$^3$ | 4, 1.515 Mg/m$^3$ |
| Absorption coefficient | 13.763 mm$^{-2}$ | 3.907 mm$^{-2}$ |
| F(000) | 2864 | 1944 |
| Crystal size | 0.100 × 0.080 × 0.040 mm | 0.140 × 0.100 × 0.070 mm |
| Theta range for data collection | 2.777 to 27.506° | 3.110 to 28.819° |
| Limiting indices | −21 ≤ h ≤ 21, −21 ≤ k ≤ 21, −21 ≤ l ≤ 21 | −17 ≤ h ≤ 17, −22 ≤ k ≤ 22, −27 ≤ l ≤ 27 |
| Reflections collected / unique | 64860 / 10048 [R(int) = 0.0440] | 98447 / 11027 [R(int) = 0.0479] |
| Completeness to theta = 25,242 | 99.8% | 99.7% |
| Absorption correction | Semi-empirical from equivalents | Semi-empirical from equivalents |
| Max. and min. transmission | 0.746 and 0.431 | 0.746 and 0.609 |
| Refinement method | Full-matrix least-squares on $F^2$ | Full-matrix least-squares on $F^2$ |
| Data / restraints / parameters | 10048 / 386 / 442 | 11027 / 488 / 456 |
| Goodness-of-fit on $F^2$ | 1.069 | 1.112 |
| Final R indices [1 > 2σ(1)] | $R_1$ = 0.0213, $wR_2$ = 0.0409 | $R_1$ = 0.0262, $wR_2$ = 0.0571 |
| R indices (all data) | $R_1$ = 0.0246, $wR_2$ = 0.0417 | $R_1$ = 0.0332, $wR_2$ = 0.0594 |
| Absolute structure parameter | 0.007(3) | 0.016(5) |
| Extinction coefficient | 0.000064(19) | 0.00047(11) |
| Largest diff. peak and hole | 1.971 and −1.017 e. Å$^{-3}$ | 0.816 and −0.573 e. Å$^{-3}$ |

| | Compound 5 | Compound 6 |
|---|---|---|
| Empirical formula | $C_{18}H_{28}Au_2Cl_2P_2$ | $C_{37}H_{27}AuCl_4P_4$[a] |
| Molecular weight | 771.18 | 964.47 |
| Temperature | 180(2) K | 220(2) K |
| Wavelength | 0.71073 Å | 0.71073 Å |
| Crystal system, space group | Orthorhombic, $P2_12_12_1$ | Orthorhombic, $P2_12_12_1$ |
| Unit cell dimensions | a = 16.1576(3) Å, α = 90° | a = 12.7646(3) Å, α = 90° |
| | b = 16.3885(9) Å, β = 90° | b = 16.4972(3) Å, β = 90° |
| | c = 16.7778(4) Å, γ = 90° | c = 20.0823(5) Å, γ = 90° |
| Volume | 4442.74(16) Å$^3$ | 4228.93(16) Å$^3$ |
| Z, Calculated density | 8, 2.306 Mg/m$^3$ | 4, 1.515 Mg/m$^3$ |
| Absorption coefficient | 13.577 mm$^{-2}$ | 3.908 mm$^{-1}$ |
| F(000) | 2864 | 1944 |
| Crystal size | 0.200 × 0.200 × 0.160 mm | 0.120 × 0.090 × 0.090 mm |
| Theta range for data collection | 2.728 to 27.492° | 2.861 to 27.505° |
| Limiting indices | −20 ≤ h ≤ 20, −21 ≤ k ≤ 21, −21 ≤ l ≤ 21 | −16 ≤ h ≤ 16, −21 ≤ k ≤ 21, −26 ≤ l ≤ 26 |
| Reflections collected / unique | 74012 / 10159 [R(int) = 0.0314] | 78808 / 9679 [R(int) = 0.0411] |
| Completeness to theta = 25,242 | 99.8% | 99.7% |
| Absorption correction | Semi-empirical from equivalents | Semi-empirical from equivalents |
| Max. and min. transmission | 0.491 and 0.284 | 0.746 and 0.665 |
| Refinement method | Full-matrix least-squares on $F^2$ | Full-matrix least-squares on $F^2$ |
| Data / restraints / parameters | 10459 / 36 / 442 | 9679 / 488 / 454 |
| Goodness-of-fit on $F^2$ | 1.048 | 1.060 |
| Final R indices [1 > 2σ(1)] | $R_1$ = 0.0149, $wR_2$ = 0.0309 | $R_1$ = 0.0298, $wR_2$ = 0.0660 |
| R indices (all data) | $R_1$ = 0.0160, $wR_2$ = 0.0312 | $R_1$ = 0.0346, $wR_2$ = 0.0681 |
| Absolute structure parameter | 0.009(2) | 0.008(3) |
| Extinction coefficient | 0.000049(2) | N/A |
| Largest diff. peak and hole | 1.007 and −1.056 e. Å$^{-3}$ | 1.138 and −0.676 e. Å$^{-3}$ |

[a] The empirical formula includes a molecule of $CHCl_3$.

Biochemistry and Microbiology

Biochemical/biological reagents and instrumentation. The American Type Culture Collection (ATCC) *Candida albicans* strains, including 10231 (strain B), MYA-2876 (strain E), and 64124 (strain F), were a generous gift from Dr. Jon Y. Takemoto (Utah State University, Logan, Utah, USA). The rest of the *C. albicans* strains, including MYA-1003 (strain A), MYA-1237 (strain C), MYA-2310 (strain D), 90819 (strain G), and as well as the non-*albicans Candida* fungi *C. glabrata* ATCC 2001 (strain H), *C. krusei* ATCC 6258 (strain I), *C. parapsilosis* ATCC 22019 (strain and *Cryptococcus neoformans* ATCC MYA-85 (strain M) were purchased from the American Type Culture Collection (ATCC, Manassas, Va., USA). A panel of *Candida auris* strains were acquired from the CDC & FDA Antibiotic Resistance Isolate Bank (CDC, Atlanta, Ga., USA), which included *C. auris* AR Bank #0381-0390 (strains K, L, and I-VIII). *C. neoformans* clinical isolates CN1-CN3 (strains N-P) were generously provided by Dr. Nathan Wiederhold (University of Texas, San Antonio, Tex., USA). The filamentous fungi *Aspergillus nidulans* ATCC 38163 (strain Q) and *Fusarium graminearum* 053 (strain T) were kind gifts from Prof. Jon S. Thorson (University of Kentucky, Lexington, Ky.) and Prof. Lisa Vaillancourt (University of Kentucky, Lexington, Ky., USA), while the *Aspergillus terreus* ATCC MYA-3633 (strain R) and *Aspergillus flavus* ATCC MYA-3631 (strain S) were purchased from the ATCC. Yeast strains were cultured at 35° C. in yeast extract peptone dextrose (YEPD) broth, *Aspergillus* spp. strains were cultured on potato dextrose agar (PDA, catalog #110130, EMD Millipore, Billerica, Mass., USA) at 28° C. before the spores were harvested. All fungal experiments were carried out in RPMI 1640 medium (catalog #R6504, Sigma-Aldrich, St. Louis, Mo., USA) buffered to pH 7.0 with 0.165 M MOPS buffer (Sigma-Aldrich, St. Louis, Mo., USA).

For cytotoxicity assays, the human embryonic kidney cell line (HEK-293) was purchased from the ATCC. The human bronchial epithelial cell line (BEAS-2B), the human lung carcinoma cell line (A549), and the mouse macrophage cell line (J774A.1) were generous gifts from Prof. David K. Orren (University of Kentucky, Lexington, Ky.), Prof. Markos Leggas (University of Kentucky, Lexington, Ky.), and Prof. David J. Feola (University of Kentucky, Lexington, Ky.), respectively. A549, HEK-293, and BEAS-2B cells were cultured in Dulbecco's Modified Eagle's Medium (DMEM, catalog #VWRL0100, VWR, Chicago, Ill.) supplemented with 10% fetal bovine serum (FBS; from ATCC) and 1% penicillin/streptomycin (from ATCC) at 37° C. with 5% $CO_2$. The J774A.1 cells were cultured in DMEM (catalog #30-2002, ATCC, Manassas, Va.), which was also supplemented with FBS and antibiotics and grown at 37° C. with 5% $CO_2$.

Instrumentation for fungal assays with yeast were the V-1200 spectrophotometer (VWR, Radnor, Pa., USA) and the SpectraMax M5 plate reader (Molecular Devices, Sunnyvale, Calif., USA) for biofilm, cytotoxicity, and hemolysis assays. For the whole cell uptake assay, Inductively Coupled Plasma Optical Emission Spectroscopy (ICP-OES, Agilent, Santa Clara, Calif., USA). The known antifungal drugs, amphotericin B (AmB, VWR, Chicago, Ill., USA), caspofungin (CAS, Sigma-Aldrich, St. Louis, Mo., USA), fluconazole (FLC, AK Scientific, Union City, Calif., USA), voriconazole (VRC, AK Scientific, Union City, Calif., USA), and the antirheumatic drug, auranofin (Santa Cruz Biotechnology, Dallas, Tex., USA) were used as positive controls.

Determination of minimum inhibitory concentration (MIC) values of compounds 1-6. The individual minimum inhibitory concentration (MIC) values of compounds 1-6 were measured for each fungal strain. The MIC values were determined using the broth microdilution method[88] in sterile 96-well plates. Concentrations of compound tested were 0.06-31.3 µg/mL. For testing, compounds were dissolved in DMSO at a concentration of 5 mg/mL allowing the highest concentration of DMSO to be 0.63% in the assay. Serial two-fold dilutions of compound were made horizontally across the plate in 100 µL of RPMI 1640 medium. For yeast, the overnight culture was diluted into RPMI 1640 (25 µL of a fungal stock with $OD_{600}$ of 0.12-0.15 into 10 mL of RPMI 1640 medium, resulting in final inoculum size around 1-5× $10^3$ CFU/mL) and added to the plate (100 µL per well), making a final volume of 200 µL total per well. Similarly, for *Aspergillus* spp. and *F. graminearum* 053, spores were diluted in RPMI 1640 to $5×10^5$ spores/mL then 100 µL of stock was seeded in each well.[89] The MIC-0 value of each compound was determined by visual inspection, MIC-2 values were measured via optical density reading at 600 nm. For *Candida* spp., plates were incubated for 48 h at 35° C., for *Cryptococcus* spp. and *Aspergillus* spp, were incubated for 72 h at 35° C., and *F. graminearum* 053 was incubated at room temperature for 5 days. MIC values for CAS were read at 24 h (Tables 1 and 2).

Time-kill assays for compounds 4 and 6. To assess the time-dependent inhibition of compounds 4 and 6 against four yeast strains, *C. albicans* ATCC 10231 (strain B), *C. glabrata* ATCC 2001 (strain H), *C. auris* AR Bank #0384 (strain K), and *C. auris* AR Bank #0390 (strain L) we performed time-kill assays. The protocol for time-kill assays followed methods previously described with minor modifications.[34,90] Overnight cultures were grown in YEPD medium at 35° C. with shaking at 200 rpm. The overnight cultures were diluted in RPMI 1640 medium to an $OD_{600}$ of 0.125 (~$×10^6$ CFU/mL). Then, 200 µL of cells were added to 4.8 mL of RPMI 1640 medium in sterile culture tubes to afford a fungal cell concentration ~$1×10^5$ CFU/mL. Compounds were then added to the fungal cells. The treatment conditions included sterile control (negative control), growth control, compound 4 at $1^x$ MIC, 4 at $2^x$ MIC, 6 at $1^x$ MIC, 6 at $2^x$ MIC, as well as AmB at $1^x$ MIC as a positive control. Treated fungal cultures were incubated in the culture tubes at 35° C. with 200 rpm shaking for 24 h. Samples were aliquoted from the different treatments at regular time points (0, 3, 6, 9, 12, and 24 h) and plated in duplicate onto PDA plates. For each time point, cultures were vortexed, 100 µL of culture was aspirated, and 10-fold serial dilutions were made in sterile dd$H_2O$. From the appropriate dilutions, 100 µL of fungal suspension was spread on agar plates and incubated at 35° C. for 48 h before colony counts were determined. Only plates containing between 30 and 300 colonies were counted, making 30 CFU/mL the limit of detection. At 24 h, 50 µL of sterile 2 mM resazurin in phosphate buffered saline (PBS) was added to the treatments and incubated at 35° C. with 200 rpm shaking for 2 h in the dark for visual inspection. As resazurin (blue-purple) is metabolized by the cells to produce resorufin (pink-orange), the addition of resazurin is used as a qualitative measure to confirm the relative growth of the fungal cells in the different treatment conditions (FIG. 3A-D).

Prevention of biofilm formation and disruption of pre-formed biofilm assays for compounds 4 and 6. To evaluate the ability of the gold complexes to prevent formation of biofilms and also their ability to disrupt pre-formed biofilms, we conducted assays for compounds 4 and 6 against sessile yeast cells for four representative yeast strains, *C. albicans* ATCC 10231 (strain B), *C. glabrata* ATCC 2001 (stain H), *C. auris* AR Bank #0384 (strain K), and *C. auris* AR Bank #0390 (strain L). All biofilm assays were performed in 96-well plates using XTT [2,3-bis(2-methoxy-4-nitro-5-sulfophenyl)-2H-tetrazolium-5-carboxanilide] to measure the viability of the biofilm as previously described.[91,92] An overnight culture of yeast was grown at 35° C. in YEPD medium with shaking at 200 rpm before dilution in RPMI 1640 medium to an $OD_{600}$ between 0.12 and 0.15. For biofilm prevention assays, serial dilutions of compounds were made in 100 μL of RPMI as in the MIC assays and 100 μL of fungal suspension with $OD_{600}$ of 0.12-0.15 was added. For assays with a pre-formed biofilm, 100 μL of fungal cells were aliquoted in a 96-well plate, leaving one column empty for the sterile control. After 24 h incubation at 37° C., visible biofilms had formed in the well. The biofilm was washed three times with 100 μL of PBS. After washing, RPMI 1640 medium and compound were added to the plate, in a similar fashion to that described for the MIC values. All compounds were tested in the concentration range of 0.06-31.3 μg/mL and AmB and auranofin were included as controls. Plates were incubated at 37° C. for 24 h. Finally, the plates were washed three times with PBS before adding 100 μL of XTT dye. The XTT was prepared by dissolving XTT at 0.5 mg/mL concentration in sterile PBS. Before adding to a plate, 1 μL of 10 mM menadione in acetone was added to 10 mL of the 0.5 mg/mL solution of XTT. After addition of XTT (containing menadione), the plates were incubated for 3 h at 37° C. in the dark. 80 μL of liquid from each well was transferred to a new plate and then with the plate reader for absorbance at 450 nm. For these experiments, we determined the sessile MIC ($SMIC_{90}$), which is defined as the compound concentration required to inhibit the metabolic activity of biofilm by 90% compared to the growth control (Table 3). The plates used to determine the SMIC90 values are provided in FIG. 7A-D (prevention of biofilm formation) and FIG. 8A-D (disruption of pre-formed biofilm). Each assay was performed in duplicate.

Mammalian cytotoxicity assays for compounds 4 and 6. To examine whether the compounds are safe for human cells, cytotoxicity assays were done against four mammalian cell lines: HEK-293, A549, BEAS-2B, and J774A.1 cells. Compounds 4 and 6 as well as auranofin were tested against each cell line to measure their cytotoxic effect by using a resazurin cell viability assay as previously described with minor modifications.[35,93] The assays were done in 96-well plates and cell counts were made using a hemacytometer. HEK-293 and J774A.1 cells were plated at $1\times10^4$ cells/mL while A549 and BEAS-2B were plated at $3\times10^3$ cells/mL. Compounds were tested in concentrations ranging from 0.06 to 15.6 μg/mL with final concentration of DMSO at 0.5% (FIG. 4A-D). It is important to note that testing xenobiotics at sub-$IC_{50}$ concentrations can result in increase in cell growth, resulting in >100% cell survival in the treatment groups.[94-98] In instances where >100% cell survival was observed, we displayed the data as 100% cell survival in FIG. 4A-D. We are providing the data with observed % in FIG. 9A-D. All assays were done in quadruplicate.

Measurement of hemolysis for compounds 4 and 6. To extend on the cytotoxicity results, compounds 4 and 6 along with auranofin and AmB, were tested for their ability to lyse red blood cells (RBCs). Both human and murine RBCs were provided in a citrate-treated tube on ice and the hemolysis assay was done as previously described with minor modifications and in similar fashion to cytotoxicity assays.[39,99,100] The RBCs were washed three times in PBS by resuspending 0.5 mL of RBCs in 5 mL PBS and pelleting at 1,000 rpm for 7 min. The RBCs were resuspended in PBS to achieve a cell concentration of on the order of $10^7$ cells/mL. Compounds were dissolved at concentration of 3.14 mg/mL (200×) in DMSO. Serial double dilutions were made in DMSO. A 1:100 dilution of compound in PBS was added to 100 of RBCs in a 96-well plate (total volume of 200 μL). Compounds were tested in the range of 0.06-15.6 μg/mL in quadruplicate with 0.5% DMSO and ~$5\times10^6$ RBCs per tube. The RBCs were also treated with 1% Triton-X® (positive control) and PBS (negative control). The RBCs were treated for 30 min at 37° C. and the absorbance was read at 595 nm. Hemolysis is visually observed by a decrease in optical density of the wells (turbid, dark red to transparent pink). Percent hemolysis (FIG. 5A-B) was calculated using this equation after subtraction of the background absorbance (positive control):

$$\% \text{ Hemolysis} = \frac{\text{absorbance of sample}}{\text{absorbance of } RBC + PBS \text{ (negative control)}} \times 100$$

Whole cell uptake assay for compounds 4 and 6. To gain insight into the mechanism of action of these compounds, we measured the uptake of the gold-containing compounds into the yeast cells. Compounds 4 and 6 were each tested with *C. albicans* ATCC 10231 (strain B) and *C. glabrata* ATCC 2001 (strain H) in independent triplicates following protocols for whole cell uptake assays as previously described with minor modifications.[42,101,102] A single colony was used to inoculate 3 mL of YEPD, which was grown overnight at 35° C. with 200 rpm shaking. Overnight culture was diluted into 100 mL of YEPD to an $OD_{600}$ of ~0.075 and grown at 35° C. with 200 rpm shaking for 4-6 h until the culture reached an $OD_{600}$ of ~0.3 indicating logarithmic phase growth. The cells were pelleted by centrifugation at 500×g for 5 min at room temperature and diluted in RPMI to $10^8$ cells/mL in RPMI 1640 medium as determined by counting with a hemacytometer. 1 mL of fungal suspension was aliquoted into a 12 mL culture tube. Treatment conditions included 10 μM compound, growth control (no compound), medium with compound (no cells), and 10 μM (8.5 μL) compound for ICP-OES analysis (100% signal). Each treatment was tested in duplicate at 35° C. with 200 rpm shaking, After 30 min of treatment, cells were pelleted by centrifugation at 3,000 rpm (~1,000×g) for 5 min. Cell pellets were washed twice with 1 mL of ice-cold PBS. Cell pellets were digested in 0.5 mL of concentrated HCl and added to 4.5 mL of dd$H_2O$ (10% final concentration of HCl). Samples were analyzed for gold content using ICP-OES. Data presented (FIG. 6) shows values for 10 μM compound after subtraction of values for media with compound.

Development of fungal resistance for compounds 4 and 6. To assess the rate at which fungal strains can develop resistance to the gold compounds, fungal cells were repeatedly exposed to sub-inhibitory amounts of compound and the MIC values for each sub-culture were monitored. The procedure for the development of resistance assay was modified for fungal cells following the reported method.[99] MIC assays were done as described above for compounds 4, 6, and AmB against *C. albicans* ATCC 10231 (strain B) and *C. glabrata* ATCC 2001 (strain H). Overnight cultures were inoculated from fungal cells exposed to ½ the MIC concentration for each compound. This was repeated for 15 sub-cultures (FIG. 10A-B).

Additional Information:

Crystal data and structure refinement for compound 3-6 (Table 5); $^1$H, $^{13}$C, $^{31}$P, HPLC traces, and HRMS spectra for compounds 1-6; images of 96-well plates from biofilm assays (FIGS. 7A-D to FIG. 9A-D); cytotoxicity graphs display raw data before being normalized to 100% (FIG. 9A-D); and plot for development of resistance assay (FIG. 10A-B). Molecular formula strings are also available.

It will be understood that various details of the presently disclosed subject matter can be changed without departing from the scope of the subject matter disclosed herein. Furthermore, the foregoing description is for the purpose of illustration only, and not for the purpose of limitation.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Bongomin, F.; Gago, S.; Oladele, R. O.; Denning, D. W. Global and multi-national prevalence of fungal diseases-estimate precision. *J. Fungi (Basel)* 2017, 3, 57.
2. Brown, G. D.; Denning, D. W.; Gow, N. A.; Levitz, S. M.; Netea, M. G.; White, T. C. Hidden killers: Human fungal infections. *Sci. Transl. Med.* 2012, 4, 165rv13.
3. Lockhart, S. R.; Iqbal, N.; Cleveland, A. A.; Farley, M. M.; Harrison, L. H.; Bolden, C. B.; Baughman, W.; Stein, B.; Hollick, R.; Park, B. J.; Chiller, T. Species identification and antifungal susceptibility testing of *Candida* bloodstream isolates from population-based surveillance studies in two U.S. cities from 2008 to 2011. *J. Clin. Microbiol.* 2012, 50, 3435-3442.
4. Bassetti, M.; Bouza, E. Invasive mould infections in the ICU setting: Complexities and solutions. *J. Antimicrob. Chemother.* 2017, 72, i39-i47.
5. Arendrup, M. C.; Perlin, D. S. Echinocandin resistance: An emerging clinical problem? *Curr. Opin. Infect. Dis.* 2014, 27, 484-492.
6. Jeffery-Smith, A.; Taori, S. K.; Schelenz, S.; Jeffery, K.; Johnson, E. M.; Borman, A.; *Candida auris* Incident Management Team; Manuel, R.; Brown, C. S. *Candida auris*: A review of the literature. *Clin. Microbiol. Rev.* 2018, 31, e00029-17.
7. Sarma, S.; Upadhyay, S. Current perspective on emergence, diagnosis and drug resistance in *Candida auris*. *Infect. Drug Resist.* 2017, 10, 155-165.
8. Richtel, M. To fight deadly *Candida auris*, New York State proposes new tactics. May 23, 2019. *The New York Times* 2019.
9. Richtel, M. *Candida auris*: The fungus nobody wants to talk about. Apr. 8, 2019. *The New York Times* 2019.
10. Richtel, M.; Jacobs, A. A mysterious infection spanning the globe in a climate of secrecy. Apr. 6, 2019. *The New York Times* 2019.
11. Yu, Z.; Gunn, L.; Wall, P.; Fanning, S. Antimicrobial resistance and its association with tolerance to heavy metals in agriculture production. *Food Microbiol.* 2017, 64, 23-32.
12. Lazarevic, T.; Rilak, A.; Bugarcic, Z. D. Platinum, palladium, gold and ruthenium complexes as anticancer agents: Current clinical uses, cytotoxicity studies and future perspectives. *Eur. J. Med. Chem.* 2017, 142, 8-31.
13. Ndagi, U.; Mhlongo, N.; Soliman, M. E. Metal complexes in cancer therapy—an update from drug design perspective. *Drug Des. Devel. Ther.* 2017, 11, 599-616.
14. Mjos, K. D.; Orvig, C. Metallodrugs in medicinal inorganic chemistry. *Chem. Rev.* 2014, 114, 4540-4563.
15. Berners-Price, S. J.; Mirabelli, C. K.; Johnson, R. K.; Mattern, M. R.; McCabe, F. L.; Faucette, L. F.; Sung, C. M.; Mong, S. M.; Sadler, P. J.; Crooke, S. T. In vivo antitumor activity and in vitro cytotoxic properties of bis[1,2-bis(diphenylphosphino)ethane]gold(I) chloride. *Cancer Res.* 1986, 46, 5486-5493.
16. Ssemaganda, A.; Low, L. M.; Verhoeft, K. R.; Wambuzi, M.; Kawoozo, B.; Nabasumba, S. B.; Mpendo, J.; Bagaya, B. S.; Kiwanuka, N.; Stanisic, D. I.; Berners-Price, S. J.; Good, M. F. Gold(I) phosphine compounds as parasite attenuating agents for malaria vaccine and drug development. *Metallomics* 2018, 10, 444-454.
17. Glisic, B. D.; Djuran, M. I. Gold complexes as antimicrobial agents: An overview of different biological activities in relation to the oxidation state of the gold ion and the ligand structure. *Dalton Trans* 2014, 43, 5950-5969.
18. Madeira, J. M.; Gibson, D. L.; Kean, W. F.; Klegeris, A. The biological activity of auranofin: Implications for novel treatment of diseases. *Inflammopharmacology* 2012, 20, 297-306.
19. Fuchs, B. B.; RajaMuthiah, R.; Souza, A. C.; Eatemadpour, S.; Rossoni, R. D.; Santos, D. A.; Junqueira, J. C.; Rice, L. B.; Mylonakis, E. Inhibition of bacterial and fungal pathogens by the orphaned drug auranofin. *Future Med. Chem.* 2016, 8, 117-132.
20. Aguinagalde, L.; Diez-Martinez, R.; Yuste, J.; Royo, I.; Gil, C.; Lasa, I.; Martin-Fontecha, M.; Marin-Ramos, N. I.; Ardanuy, C.; Linares, J.; Garcia, P.; Garcia, E.; Sanchez-Puelles, J. M. Auranofin efficacy against MDR *Streptococcus pneumoniae* and *Staphylococcus aureus* infections. *J. Antimicrob. Chemother.* 2015, 70, 2608-2617.
21. AbdelKhalek, A.; Abutaleb, N. S.; Elmagarmid, K. A.; Seleem, M. N. Repurposing auranofin as an intestinal decolonizing agent for vancomycin-resistant *enterococci*. *Sci. Rep.* 2018, 8, 8353.
22. Owings, J. P.; McNair, N. N.; Mui, Y. F.; Gustafsson, T. N.; Holmgren, A.; Contel, M.; Goldberg, J. B.; Mead, J. R. Auranofin and N-heterocyclic carbene gold-analogs are potent inhibitors of the bacteria *Helicobacter pylori*. *FEMS Microbiol. Lett.* 2016, 363, fnw148.
23. Siles, S. A.; Srinivasan, A.; Pierce, C. G.; Lopez-Ribot, J. L.; Ramasubramanian, A. K. High-throughput screening of a collection of known pharmacologically active small compounds for identification of *Candida albicans* biofilm inhibitors. *Antimicrob. Agents Chemother.* 2013, 57, 3681-3687.
24. Wiederhold, N. P.; Patterson, T. F.; Srinivasan, A.; Chaturvedi, A. K.; Fothergill, A. W.; Wormley, F. L.; Ramasubramanian, A. K.; Lopez-Ribot, J. L. Repurposing auranofin as an antifungal: In vitro activity against a variety of medically important fungi. *Virulence* 2017, 8, 138-142.
25. Stylianou, M.; Kulesskiy, E.; Lopes, J. P.; Granlund, M.; Wennerberg, K.; Urban, C. F. Antifungal application of nonantifungal drugs. *Antimicrob. Agents Chemother.* 2014, 58, 1055-1062.
26. Thangamani, S.; Maland, M.; Mohammad, H.; Pascuzzi, P. E.; Avramova, L.; Koehler, C. M.; Hazbun, T. R.; Seleem, M. N. Repurposing approach identifies auranofin with broad spectrum antifungal activity that targets Mia40-Erv1 pathway. *Front. Cell Infect. Microbiol.* 2017, 7, 4.
27. Diaz, R. S.; Shytaj, I. L.; Giron, L. B.; Obermaier, B.; Libera, E. D., Jr.; Galinskas, J.; Dias, D.; Hunter, J.; Janini, M.; Gosuen, G.; Ferreira, P. A.; Sucupira, M. C.; Maricato, J.; Fackler, O.; Lusic, M.; Savarino, A.; SPARC working group. Potential impact of the antirheumatic agent auranofin on proviral HIV-1 DNA in individuals under intensified antiretroviral therapy: Results from a randomized clinical trial. *Int. J. Antimicrob. Agents* 2019.
28. Capparelli, E. V.; Bricker-Ford, R.; Rogers, M. J.; McKerrow, J. H.; Reed, S. L. Phase I clinical trial results of auranofin, a novel antiparasitic agent. *Antimicrob. Agents Chemother.* 2017, 61.
29. Harbut, M. B.; Vilcheze, C.; Luo, X.; Hensler, M. E.; Guo, H.; Yang, B.; Chatterjee, A. K.; Nizet, V.; Jacobs, W. R., Jr.; Schultz, P. G.; Wang, F. Auranofin exerts broad-spectrum bactericidal activities by targeting thiol-redox homeostasis. *Proc. Natl. Acad. Sci., U.S.A* 2015, 112, 4453-4458.
30. Gandin, V.; Fernandes, A. P. Metal- and semimetal-containing inhibitors of thioredoxin reductase as anticancer agents. *Molecules* 2015, 20, 12732-12756.
31. Thamban Chandrika, N.; Shrestha, S. K.; Ngo, H. X.; Howard, K. C.; Garneau-Tsodikova, S. Novel fluconazole derivatives with promising antifungal activity. *Bioorg. Med. Chem.* 2018, 26, 573-580.
32. Thamban Chandrika, N.; Shrestha, S. K.; Ngo, H. X.; Tsodikov, O. V.; Howard, K. C.; Garneau-Tsodikova, S. Alkylated piperazines and piperazine-azole hybrids as antifungal agents. *J. Med. Chem.* 2018, 61, 158-173.
33. Shrestha, S. K.; Garzan, A.; Garneau-Tsodikova, S. Novel alkylated azoles as potent antifungals. *Eur. J. Med. Chem.* 2017, 133, 309-318.
34. Holbrook, S. Y. L.; Garzan, A.; Dennis, E. K.; Shrestha, S. K.; Garneau-Tsodikova, S. Repurposing antipsychotic drugs into antifungal agents: Synergistic combinations of azoles and bromperidol derivatives in the treatment of various fungal infections. *Eur. J. Med. Chem.* 2017, 139, 12-21.
35. Shrestha, S. K.; Fosso, M. Y.; Garneau-Tsodikova, S. A combination approach to treating fungal infections. *Sci. Rep.* 2015, 5, 17070.
36. Dennis, E. K.; Garneau-Tsodikova, S. Synergistic combinations of azoles and antihistamines against *Candida* species in vitro. *Med. Mycol.* 2018, myy088.
37. Thamban Chandrika, N.; Dennis, E. K.; Shrestha, S. K.; Ngo, H. X.; Green, K. D.; Kwiatkowski, S.; Deaciuc, A. G.; Dwoskin, L. P.; Watt, D. S.; Garneau-Tsodikova, S. N,N'-Diaryl-bishydrazones in a biphenyl platform: Broad spectrum antifungal agents. *Eur. J. Med. Chem.* 2019, 164, 273-281.
38. Fosso, M. Y.; Shrestha, S. K.; Thamban Chandrika, N.; Dennis, E. K.; Green, K. D.; Garneau-Tsodikova, S. Differential effects of linkers on the activity of amphiphilic tobramycin antifungals. *Molecules* 2018, 23.
39. Ngo, H. X.; Shrestha, S. K.; Garneau-Tsodikova, S. Identification of ebsulfur analogues with broad-spectrum antifungal activity. *ChemMedChem* 2016, 11, 1507-1516.
40. Thamban Chandrika, N.; Shrestha, S. K.; Ngo, H. X.; Garneau-Tsodikova, S. Synthesis and investigation of novel benzimidazole derivatives as antifungal agents. *Bioorg. Med. Chem.* 2016, 24, 3680-3686.
41. Shrestha, S. K.; Kril, L. M.; Green, K. D.; Kwiatkowski, S.; Sviripa, V. M.; Nickell, J. R.; Dwoskin, L. P.; Watt, D. S.; Garneau-Tsodikova, S. Bis(N-amidinohydrazones) and N-(amidino)-N'-aryl-bishydrazones: New classes of antibacterial/antifungal agents. *Bioorg. Med. Chem.* 2017, 25, 58-66.
42. Gukathasan, S.; Parkin, S.; Awuah, S. G. Cyclometalated gold(III) complexes bearing DACH ligands. *Inorg. Chem.* 2019, 58, 9326-9340.
43. Kim, J. H.; Reeder, E.; Parkin, S.; Awuah, S. G. Gold(I/III)-phosphine complexes as potent antiproliferative agents. *Sci. Rep.* 2019, 9, 12335.
44. Uson, R.; Laguna, A.; Laguna, M.; Briggs, D. A.; Murray, H. H.; Fackler Jr, J. P. (*Tetrahydrothiophene)gold (I) and gold(III) complexes*. Wiley: 1989; Vol. 26.
45. Mohamed, A. A.; Krause Bauer, J. A.; Bruce, A. E.; Bruce, M. R. [Mu-o-phenylenebis(diphenylphosphine)-kappa$^2$P:P']bis[chlorogold(I)], dppbz(AuCl)$_2$. *Acta Crystallogr. C* 2003, 59, m84-86.
46. Osawa, M.; Kawata, I.; Igawa, S.; Tsuboyama, A.; Hashizume, D.; Hoshino, M. Phosphorescence color alteration by changing counter anions on tetrahedral gold (I) complexes; intra- and interligand it—it interactions. *Eur. J. Inorg. Chem.* 2009, 3708-3711.
47. CDC & FDA Antibiotic Resistance Isolate Bank. Atlanta (Ga.): CDC.
48. Costerton, J. W.; Stewart, P. S.; Greenberg, E. P. Bacterial biofilms: A common cause of persistent infections. *Science* 1999, 284, 1318-1322.
49. Ciofu, O.; Rojo-Molinero, E.; Macia, M. D.; Oliver, A. Antibiotic treatment of biofilm infections. *APMIS* 2017, 125, 304-319.
50. Percival, S. L.; Suleman, L.; Vuotto, C.; Donelli, G. Healthcare-associated infections, medical devices and biofilms: Risk, tolerance and control. *J. Med. Microbiol.* 2015, 64, 323334.
51. Costa-Orlandi, C. B.; Sardi, J. C. O.; Pitangui, N. S.; de Oliveira, H. C.; Scorzoni, L.; Galeane, M. C.; Medina-Alarcon, K. P.; Melo, W.; Marcelino, M. Y.; Braz, J. D.; Fusco-Almeida, A. M.; Mendes-Giannini, M. J. S. Fungal biofilms and polymicrobial diseases. *J. Fungi (Basel)* 2017, 3, e22.
52. Turan, H.; Demirbilek, M. Biofilm-forming capacity of blood-borne *Candida albicans* strains and effects of antifungal agents. *Rev. Argent. Microbiol.* 2018, 50, 62-69.
53. Kojic, E. M.; Darouiche, R. O. *Candida* infections of medical devices. *Clin. Microbiol. Rev.* 2004, 17, 255-267.
54. Nett, J.; Lincoln, L.; Marchillo, K.; Massey, R.; Holoyda, K.; Hoff, B.; VanHandel, M.; Andes, D. Putative role of beta-1,3 glucans in *Candida albicans* biofilm resistance. *Antimicrob. Agents Chemother.* 2007, 51, 510-520.
55. Ramage, G.; Bachmann, S.; Patterson, T. F.; Wickes, B. L.; Lopez-Ribot, J. L. Investigation of multidrug efflux pumps in relation to fluconazole resistance in *Candida albicans* biofilms. *J. Antimicrob. Chemother.* 2002, 49, 973-980.
56. Fiori, B.; Posteraro, B.; Torelli, R.; Tumbarello, M.; Perlin, D. S.; Fadda, G.; Sanguinetti, M. In vitro activities of anidulafungin and other antifungal agents against biofilms formed by clinical isolates of different *Candida* and *Aspergillus* species. *Antimicrob. Agents Chemother.* 2011, 55, 3031-3035.
57. Dogan, I. S.; Sarac, S.; Sari, S.; Kart, D.; Essiz Gokhan, S.; Vural, I.; Dalkara, S. New azole derivatives showing antimicrobial effects and their mechanism of antifungal activity by molecular modeling studies. *Eur. J. Med. Chem.* 2017, 130, 124-138.
58. Thamban Chandrika, N.; Shrestha, S. K.; Ranjan, N.; Sharma, A.; Arya, D. P.; Garneau-Tsodikova, S. New Application of neomycin B-bisbenzimidazole hybrids as antifungal agents. *ACS Infect. Dis.* 2018, 4, 196-207.
59. Hasan, F.; Xess, I.; Wang, X.; Jain, N.; Fries, B. C. Biofilm formation in clinical *Candida* isolates and its association with virulence. *Microbes Infect.* 2009, 11, 753-761.
60. Rodriguez-Cerdeira, C.; Gregorio, M. C.; Molares-Vila, A.; Lopez-Barcenas, A.; Fabbrocini, G.; Bardhi, B.; Sinani, A.; Sanchez-Blanco, E.; Arenas-Guzman, R.; Hernandez-Castro, R. Biofilms and vulvovaginal candidiasis. *Colloids Surf. B Biointerfaces* 2019, 174, 110-125.
61. Nett, J. E.; D, R. A. Fungal biofilms: In vivo models for discovery of anti-biofilm drugs. *Microbiol. Spectr.* 2015, 3, e30.
62. Pongracz, J.; Benedek, K.; Juhasz, E.; Ivan, M.; Kristof, K. In vitro biofilm production of *Candida* bloodstream isolates: Any association with clinical characteristics? *J. Med. Microbiol.* 2016, 65, 272-277.
63. Shin, J. H.; Kee, S. J.; Shin, M. G.; Kim, S. H.; Shin, D. H.; Lee, S. K.; Suh, S. P.; Ryang, D. W. Biofilm production by isolates of *Candida* species recovered from non-neutropenic patients: Comparison of bloodstream isolates with isolates from other sources. *J. Clin. Microbiol.* 2002, 40, 1244-1248.
64. Tumbarello, M.; Posteraro, B.; Trecarichi, E. M.; Fiori, B.; Rossi, M.; Porta, R.; de Gaetano Donati, K.; La Sorda, M.; Spanu, T.; Fadda, G.; Cauda, R.; Sanguinetti, M. Biofilm production by *Candida* species and inadequate antifungal therapy as predictors of mortality for patients with candidemia. *J. Clin. Microbiol.* 2007, 45, 1843-1850.
65. Wang, Y.; Liu, M.; Cao, R.; Zhang, W.; Yin, M.; Xiao, X.; Liu, Q.; Huang, N. A soluble bis-chelated gold(I) diphosphine compound with strong anticancer activity and low toxicity. *J. Med. Chem.* 2013, 56, 1455-1466.
66. Jeswani, G.; Alexander, A.; Saraf, S.; Saraf, S.; Qureshi, A.; Ajazuddin. Recent approaches for reducing hemolytic activity of chemotherapeutic agents. *J. Control. Release* 2015, 211, 10-21.
67. Radwan, M. A.; AlQuadeib, B. T.; Siller, L.; Wright, M. C.; Horrocks, B. Oral administration of amphotericin B nanoparticles: Antifungal activity, bioavailability and toxicity in rats. *Drug Deliv.* 2017, 24, 40-50.
68. Uchida, M.; Sun, Y.; McDermott, G.; Knoechel, C.; Le Gros, M. A.; Parkinson, D.; Drubin, D. G.; Larabell, C. A. Quantitative analysis of yeast internal architecture using soft X-ray tomography. *Yeast* 2011, 28, 227-236.
69. Fujioka, A.; Terai, K.; Itoh, R. E.; Aoki, K.; Nakamura, T.; Kuroda, S.; Nishida, E.; Matsuda, M. Dynamics of the Ras/ERK MAPK cascade as monitored by fluorescent probes. *J. Biol. Chem.* 2006, 281, 8917-8926.
70. Mane, A.; Vidhate, P.; Kusro, C.; Waman, V.; Saxena, V.; Kulkarni-Kale, U.; Risbud, A. Molecular mechanisms associated with fluconazole resistance in clinical *Candida albicans* isolates from India. *Mycoses* 2016, 59, 93-100.
71. Hargrove, T. Y.; Friggeri, L.; Wawrzak, Z.; Qi, A.; Hoekstra, W. J.; Schotzinger, R. J.; York, J. D.; Guengerich, F. P.; Lepesheva, G. I. Structural analyses of *Candida albicans* sterol 14alpha-demethylase complexed with azole drugs address the molecular basis of azole-mediated inhibition of fungal sterol biosynthesis. *J. Biol. Chem.* 2017, 292, 6728-6743.
72. Franz, R.; Kelly, S. L.; Lamb, D. C.; Kelly, D. E.; Ruhnke, M.; Morschhauser, J. Multiple molecular mechanisms contribute to a stepwise development of fluconazole resistance in clinical *Candida albicans* strains. *Antimicrob. Agents Chemother.* 1998, 42, 3065-3072.
73. Feng, W.; Yang, J.; Xi, Z.; Qiao, Z.; Lv, Y.; Wang, Y.; Ma, Y.; Wang, Y.; Cen, W. Mutations and/or overexpressions of ERG4 and ERG11 genes in clinical azoles-resistant isolates of *Candida albicans*. *Microb. Drug Resist.* 2017, 23, 563-570.
74. Flowers, S. A.; Colon, B.; Whaley, S. G.; Schuler, M. A.; Rogers, P. D. Contribution of clinically derived mutations in ERG11 to azole resistance in *Candida albicans*. *Antimicrob. Agents Chemother.* 2015, 59, 450-460.
75. Goldman, G. H.; da Silva Ferreira, M. E.; dos Reis Marques, E.; Savoldi, M.; Perlin, D.; Park, S.; Godoy Martinez, P. C.; Goldman, M. H.; Colombo, A. L. Evaluation of fluconazole resistance mechanisms in *Candida albicans* clinical isolates from HIV-infected patients in Brazil. *Diagn. Microbiol. Infect. Dis.* 2004, 50, 25-32.
76. Teo, J. Q.; Lee, S. J.; Tan, A. L.; Lim, R. S.; Cai, Y.; Lim, T. P.; Kwa, A. L. Molecular mechanisms of azole resistance in *Candida* bloodstream isolates. *BMC Infect. Dis.* 2019, 19, 63.
77. Rosana, Y.; Yasmon, A.; Lestari, D. C. Overexpression and mutation as a genetic mechanism of fluconazole resistance in *Candida albicans* isolated from human immunodeficiency virus patients in Indonesia. *J. Med. Microbiol.* 2015, 64, 1046-1052.
78. Siikala, E.; Rautemaa, R.; Richardson, M.; Saxen, H.; Bowyer, P.; Sanglard, D. Persistent *Candida albicans* colonization and molecular mechanisms of azole resistance in autoimmune polyendocrinopathy-candidiasis-ectodermal dystrophy (APECED) patients. *J. Antimicrob. Chemother.* 2010, 65, 2505-2513.
79. Mesa-Arango, A. C.; Rueda, C.; Roman, E.; Quintin, J.; Tenon, M. C.; Luque, D.; Netea, M. G.; Pla, J.; Zaragoza, O. Cell wall changes in amphotericin B-resistant strains from *Candida tropicalis* and relationship with the immune responses elicited by the host. *Antimicrob. Agents Chemother.* 2016, 60, 2326-2335.
80. Hebeka, E. K.; Solotorovsky, M. Development of resistance to polyene antibiotics in *Candida albicans*. *J. Bacteriol.* 1965, 89, 1533-1539.
81. Gonzalez-Arellano, C.; Corma, A.; Iglesias, M.; Sanchez, F. Enantioselective hydrogenation of alkenes and imines by a gold catalyst. *Chem. Commun.* 2005, 3451-3453.
82. Krause, L.; Herbst-Irmer, R.; Sheldrick, G. M.; Stalke, D. Comparison of silver and molybdenum microfocus X-ray sources for single-crystal structure determination. *J. Appl. Crystallogr.* 2015, 48, 3-10.
83. Bruker-AXS (2016). APEX3 Bruker-AXS Inc., Madison, Wis., USA. 2016.
84. Sheldrick, G. M. Crystal structure refinement with SHELXL. *Acta Crystallogr. C Struct. Chem.* 2015, 71, 3-8.
85. Sheldrick, G. M. SHELXT—integrated space-group and crystal-structure determination. *Acta Crystallogr. A Found. Adv.* 2015, 71, 3-8.
86. Spek, A. L. Structure validation in chemical crystallography. *Acta Crystallogr. D Biol. Crystallogr.* 2009, 65, 148-155.
87. Parkin, S. Expansion of scalar validation criteria to three dimensions: The R tensor. *Acta Crystallogr. A* 2000, 56, 157-162.
88. Clinical and Laboratory Standards Institute. *Reference method for broth dilution antifungal susceptibility testing of yeasts—Approved standard.* CLSI document M27-A3. Wayne, Pa. 2008.

89. Clinical and Laboratory Standards Institute. *Reference method for broth dilution antifungal susceptibility testing of filamentous fungi—2nd Edition: CLSI document M38-A2.* Wayne, Pa. 2008.
90. Klepser, M. E.; Malone, D.; Lewis, R. E.; Ernst, E. J.; Pfaller, M. A. Evaluation of voriconazole pharmacodynamics using time-kill methodology. *Antimicrob. Agents Chemother.* 2000, 44, 1917-1920.
91. Pierce, C. G.; Uppuluri, P.; Tristan, A. R.; Wormley, F. L., Jr.; Mowat, E.; Ramage, G.; Lopez-Ribot, J. L. A simple and reproducible 96-well plate-based method for the formation of fungal biofilms and its application to antifungal susceptibility testing. *Nat. Protoc.* 2008, 3, 1494-1500.
92. Nett, J. E.; Cain, M. T.; Crawford, K.; Andes, D. R. Optimizing a *Candida* biofilm microtiter plate model for measurement of antifungal susceptibility by tetrazolium salt assay. *J. Clin. Microbiol.* 2011, 49, 1426-1433.
93. Lafleur, M. D.; Sun, L.; Lister, I.; Keating, J.; Nantel, A.; Long, L.; Ghannoum, M.; North, J.; Lee, R. E.; Coleman, K.; Dahl, T.; Lewis, K. Potentiation of azole antifungals by 2-adamantanamine. *Antimicrob. Agents Chemother.* 2013, 57, 3585-3592.
94. Quave, C. L.; Estevez-Carmona, M.; Compadre, C. M.; Hobby, G.; Hendrickson, H.; Beenken, K. E.; Smeltzer, M. S. Ellagic acid derivatives from *Rubus* ulmifolius inhibit *Staphylococcus aureus* biofilm formation and improve response to antibiotics. *PLoS One* 2012, 7, e28737.
95. Hall, B. S.; Bot, C.; Wilkinson, S. R. Nifurtimox activation by trypanosomal type I nitroreductases generates cytotoxic nitrile metabolites. *J. Biol. Chem.* 2011, 286, 1308813095.
96. Xu, W.; Zhu, X.; Tan, T.; Li, W.; Shan, A. Design of embedded-hybrid antimicrobial peptides with enhanced cell selectivity and anti-biofilm activity. *PLoS One* 2014, 9, e98935.
97. Shrestha, S. K.; Fosso, M. Y.; Green, K. D.; Garneau-Tsodikova, S. Amphiphilic tobramycin analogues as antibacterial and antifungal agents. *Antimicrob. Agents Chemother.* 2015, 59, 4861-4869.
98. Fosso, M. Y.; Shrestha, S. K.; Green, K. D.; Garneau-Tsodikova, S. Synthesis and bioactivities of kanamycin B-derived cationic amphiphiles. *J. Med. Chem.* 2015, 58, 91249132.
99. Dartois, V.; Sanchez-Quesada, J.; Cabezas, E.; Chi, E.; Dubbelde, C.; Dunn, C.; Granja, J.; Gritzen, C.; Weinberger, D.; Ghadiri, M. R.; Parr, T. R., Jr. Systemic antibacterial activity of novel synthetic cyclic peptides. *Antimicrob. Agents Chemother.* 2005, 49, 3302-3310.
100. Evans, B. C.; Nelson, C. E.; Yu, S. S.; Beavers, K. R.; Kim, A. J.; Li, H.; Nelson, H. M.; Giorgio, T. D.; Duvall, C. L. Ex vivo red blood cell hemolysis assay for the evaluation of pH-responsive endosomolytic agents for cytosolic delivery of biomacromolecular drugs. *J. Vis. Exp.* 2013, e50166.
101. Paderu, P.; Park, S.; Perlin, D. S. Caspofungin uptake is mediated by a high-affinity transporter in *Candida albicans. Antimicrob. Agents Chemother.* 2004, 48, 3845-3849.
102. Zhang, W.; Cao, Y.; Gong, J.; Bao, X.; Chen, G.; Liu, W. Identification of residues important for substrate uptake in a glucose transporter from the filamentous fungus *Trichoderma reesei. Sci. Rep.* 2015, 5, 13829.

The invention claimed is:

1. A method for killing fungus comprising: contacting the fungus with an effective amount of a compound selected from the group consisting of:

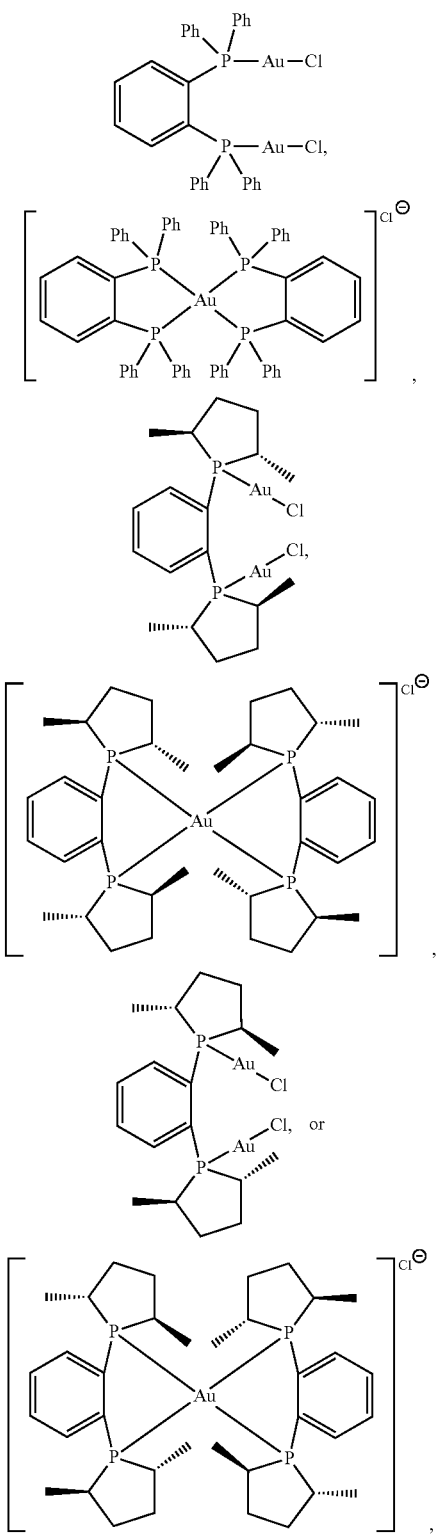

or a pharmaceutically acceptable salt thereof.

2. The method of claim 1, wherein the fungus is of the genus *Candida*.

3. The method of claim 1, wherein the fungus is of the genus *Cryptococcus*.

4. The method of claim 1, wherein the fungus is of the genus *Aspergillus*.

5. The method of claim 1, wherein the fungus is of the genus *Fusarium*.

6. The method of claim 1 wherein the effective amount is between about 0.12 µg/mL to about 31.3 µg/mL.

7. The method of claim 1, wherein the fungus is in a subject.

8. The method of claim 7 wherein the subject is a mammal.

9. The method of claim 8, wherein the effective amount is an amount less than about 8 mg/kg.

10. A method of preventing or disrupting a fungal biofilm comprising: contacting a surface with an effective amount of a compound selected from the group consisting of:

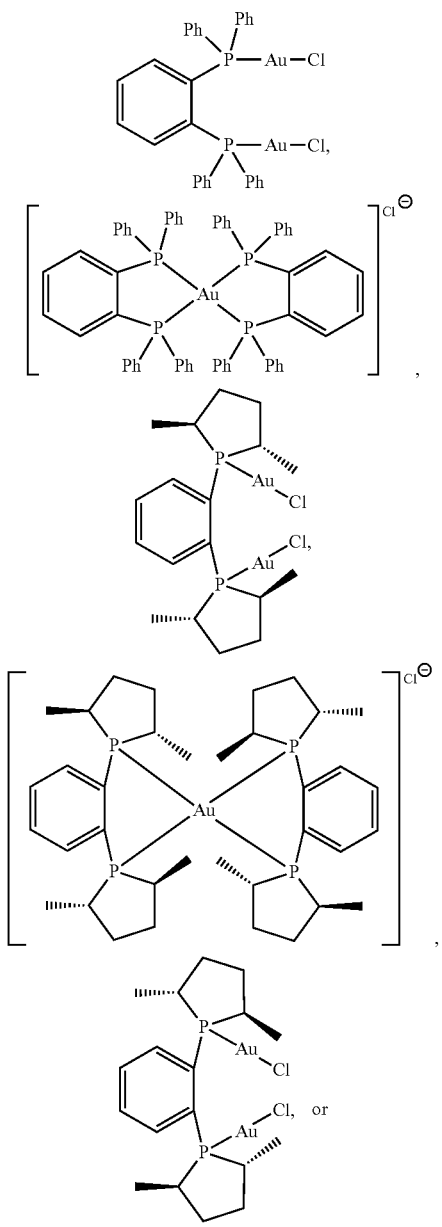

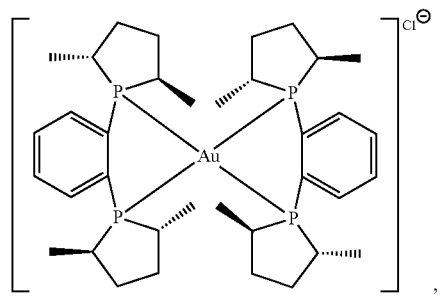

or a pharmaceutically acceptable salt thereof; and wherein the surface is at risk of forming a biofilm or has a pre-formed biofilm.

11. The method of claim 10, wherein the compound is selected from the group consisting of:

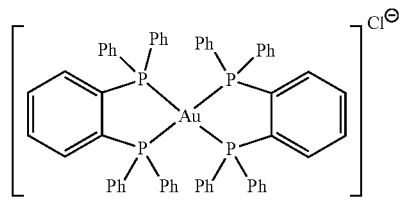

12. The method of claim 10, wherein the effective amount is between about 0.12 µg/mL to about 31.3 µg/mL.

13. The method of claim 10, wherein the contact occurs for about 3 hours.

14. The method of claim 10, wherein the compound is selected from the group consisting of:

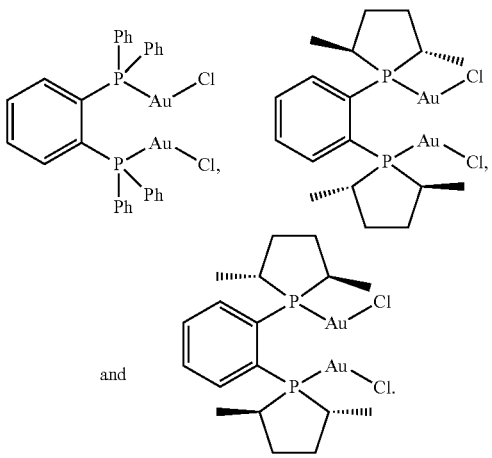

15. The method of claim 1, wherein the compound is selected from the group consisting of:

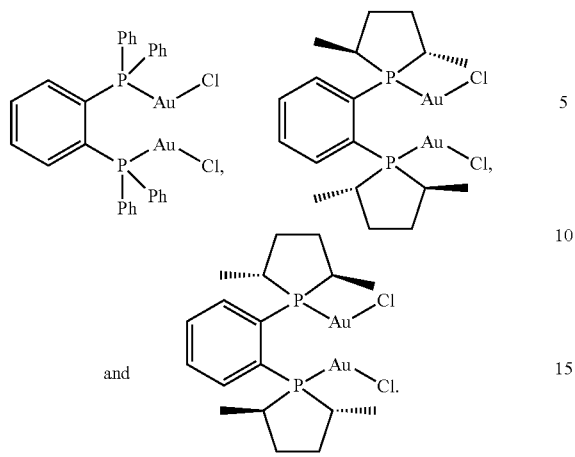
and
16. The method of claim 1, wherein the compound is selected from the group consisting of:
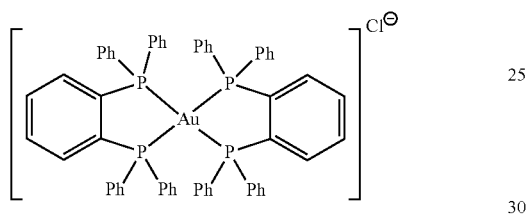
* * * * *